United States Patent [19]

Wang et al.

[11] Patent Number: 5,680,478
[45] Date of Patent: Oct. 21, 1997

[54] METHOD AND APPARATUS FOR CHARACTER RECOGNITION

[75] Inventors: Shin-Ywan Wang, Tustin; Mehrzad R. Vaezi; Christopher Allen Sherrick, both of Irvine, all of Calif.

[73] Assignee: Canon Kabushiki Kaisha, Tokyo, Japan

[21] Appl. No.: 265,833

[22] Filed: Jun. 27, 1994

Related U.S. Application Data

[62] Division of Ser. No. 873,012, Apr. 24, 1992.

[51] Int. Cl.$^6$ .................................................. G06K 9/34
[52] U.S. Cl. .................. 382/176; 382/171; 382/174; 382/180; 382/226; 382/178
[58] Field of Search .................................. 382/9, 13, 18, 382/22, 36, 37, 54, 56, 170, 171, 176, 177, 178, 194, 191, 226, 180; 395/148

[56] References Cited

U.S. PATENT DOCUMENTS

| | | | |
|---|---|---|---|
| 4,933,984 | 6/1990 | Nakano et al. | 382/61 |
| 5,048,107 | 9/1991 | Tachikawa | 382/48 |
| 5,065,442 | 11/1991 | Kugai | 382/48 |
| 5,075,895 | 12/1991 | Bessho | 382/61 |
| 5,091,964 | 2/1992 | Shimomura | 382/9 |
| 5,093,868 | 3/1992 | Tanaka et al. | 382/9 |
| 5,101,439 | 3/1992 | Kiang | 382/9 |
| 5,101,448 | 3/1992 | Kawachiya et al. | 382/61 |
| 5,129,012 | 7/1992 | Abe | 382/16 |
| 5,307,422 | 4/1994 | Wang | 382/9 |
| 5,313,526 | 5/1994 | Cheong | 382/9 |
| 5,335,290 | 8/1994 | Cullen, et al. | 382/9 |
| 5,351,314 | 9/1994 | Vaezi | 382/54 |

FOREIGN PATENT DOCUMENTS

| | | | |
|---|---|---|---|
| 8635091 | 4/1992 | Australia | G06K 9/34 |
| 0325417 | 7/1989 | European Pat. Off. | G06F 15/62 |
| 496531 | 7/1992 | European Pat. Off. | G06K 9/20 |
| 4-90083 | 3/1992 | Japan | G06K 9/32 |
| WO 80/02761 | 12/1980 | WIPO | G06K 9/34 |
| WO 92/06448 | 4/1992 | WIPO | G06K 9/34 |

OTHER PUBLICATIONS

Yamada, et al., "Document Image Processing Based on Enhanced Border Following Algorithm", IEEE Proceedings of the 10th International Conference on Pattern Recognition, vol. 2, Jun. 21, 1990, pp. 231–236.

Mizuno, et al., "Document Recognition System With Layout Structure Generator", NEC Research And development, vol. 32, No. 3, Jul. 1991, pp. 430–437.

(List continued on next page.)

*Primary Examiner*—Jose L. Couso
*Assistant Examiner*—Matthew C. Bella
*Attorney, Agent, or Firm*—Fitzpatrick, Cella, Harper & Scinto

[57] ABSTRACT

A character recognition system or the like in which character identities are stored in accordance with a hierarchical order established during processing to separate text image areas from non-text image areas. To separate text image areas from non-text image areas, blocks of pixels are selected from pixel image data by outlining contours of connected components in the pixel image data, determining whether the outlined connected components include text units or non-text units, selectively connecting text units widthwisely to form text lines, and selectively connecting text lines vertically to form text blocks. After blocks of pixels have been so selected, text blocks are segmented into lines of pixel image data, and characters are cut from the lines of pixel image data so obtained. If desired, the characters may be cut by a two-step cutting process in which non-touching and non-overlapping characters are first cut out, and touching characters are then cut out. The cut-out characters are then recognized, and the characters are stored in accordance with an order established during the block selecting process.

196 Claims, 29 Drawing Sheets

Microfiche Appendix Included
(4 Microfiche, 228 Pages)

OTHER PUBLICATIONS

Pizano, et al., "A Business Form Recognition System", COMPSAC91 Proceedings, The Fifteenth Annual International Computer Software & Applications Conference, Sep. 13, 1991, pp. 626–632.

"Line Segmentation Method For Documents In European Languages", IBM Technical Disclosure Bulletin, vol. 33, No. 1B, Jun. 1990, pp. 207–210.

Stuart C. Hinds, et al., "A Document Skew Detection Method Using Run-Length Encoding And The Hough Transform", IEEE, May 1990, pp. 464–468.

James L. Fisher, et al., "A Rule-Based System For Document Image Segmentation", IEEE, May 1990, pp. 567–572.

Philip J. Bones, et al., "Segmentation Of Documentation Images", SPIE vol. 1258 Image Communications and Workstations (1990), pp. 78–88.

Isao Masuda, et al., "Approach to Smart Document Reader System", IEEE 1985, pp. 550–557.

Hiroshi Makino, "Representation And Segmentation of Document Images", IEEE, 1983, pp. 291–296.

W. Doster, "A Step Towards Intelligent Document Input To Computers", et al., IEEE, 1983, pp. 515–516.

Teruo Akiyama, et al., "Automated Entry System For Printed Documents", Pattern Recognition, vol. 23, No. 11, 1990, pp. 1141–1154.

Qin Luo, et al., "A Structure Recognition Method for Japanese Newspapers", Symposium on Document Analysis and Information Retrieval, Mar. 1992 pp. 217–234.

L.A. Fletcher, et al., "A Robust Algorithm For Text String Separation From Mixed Text/Graphics Images", IEEE Transactions On Pattern Analysis and Machine Intelligence, vol. 10, No. 6, Nov. 1988, pp. 910–918.

Osamu Iwaki, et al., "A Segmentation Method Based On Office Document Hierarchical Structure", Proceedings of the 1987 IEEE International Conference on Systems, Man, and Cybernetics, vol. 2, pp. 759–763.

K. Y. Wong, et al., "Document Analysis System", IBM J. Res. Develop., vol. 26, No. 6, Nov. 1982, pp. 647–656.

M. Okamoto, et al., "A Hybrid Page Segmentation Method", Proceedings of the Second International Conference on Document Analysis and Recognition, Oct. 1993, pp. 743–748.

D.J. Ittner, "Automatic Inference of Textline Orientation", Proceedings, Second Annual Symposium on Document Analysis & Information Retrieval, Apr. 1993, pp. 123–133.

F. Wahl, "A New Distance Mapping and Its Use for Shape Measurement on Binary Patterns", Computer Vision, Graphics And Image Processing, vol. 23, pp. 218–226, 1983.

Tsujimoto, et al., "Understanding Multi-articled Documents," 10th Int'l Conf. on Pattern Recognition, IEEE, vol. 1, Jun. 16–21, 1990, p. 551–556.

FIG. I

| FIG. 4(a) |
| FIG. 4(b) |
| FIG. 4(c) |

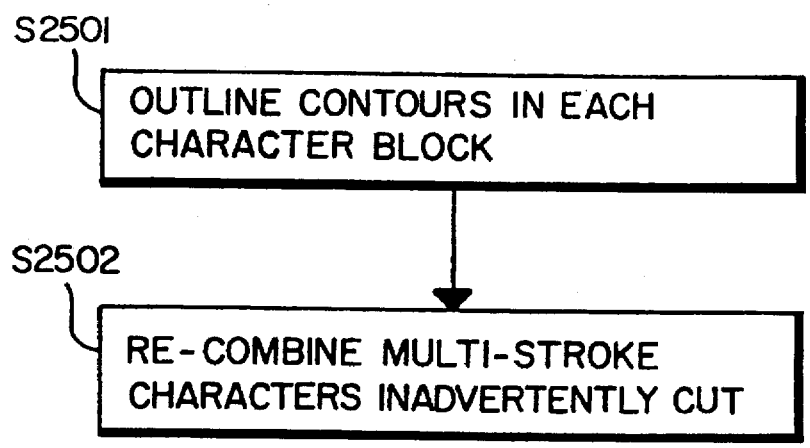
FIG. 25
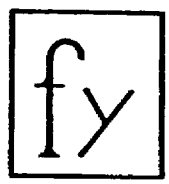
FIG. 26(a)
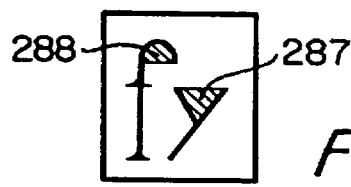
FIG. 26(b)
FIG. 26(c)

FIG. 26(d)

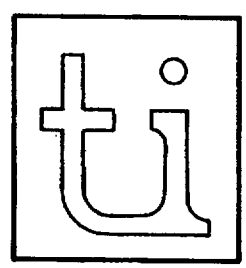
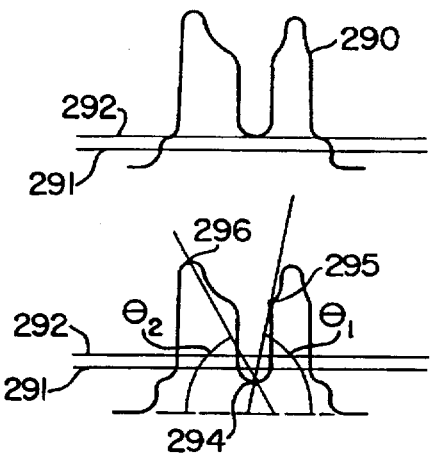
FIG.29(a)
FIG.29(b)
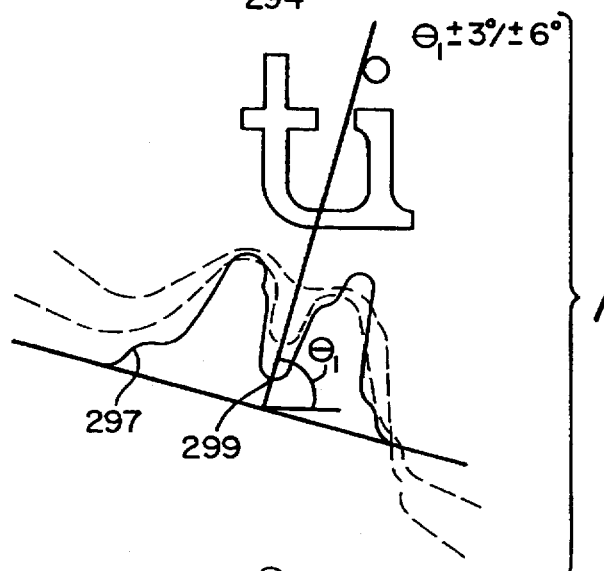
FIG.29(c)
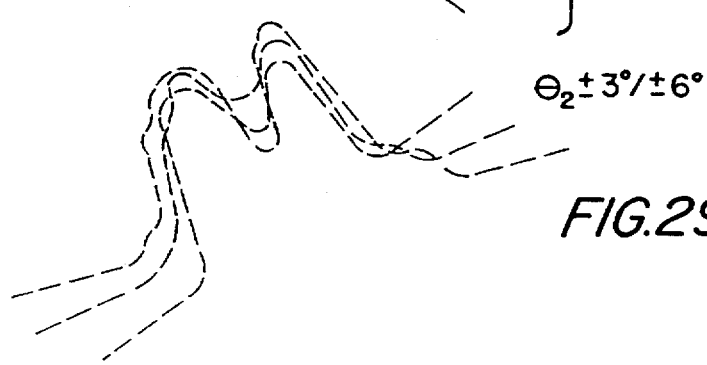
FIG.29(d)

METHOD AND APPARATUS FOR CHARACTER RECOGNITION

This application is a division of application Ser. No. 07/873,012 filed Apr. 24, 1992.

BACKGROUND OF THE INVENTION

This application is being filed with a microfiche appendix of computer program listings consisting of four (4) fiche having 215 frames.

A portion of the disclosure of this patent document contains material which is subject to copyright protection. The copyright owner has no objection to the facsimile reproduction by anyone of the document or the patent disclosure, as it appears in the Patent and Trademark Office patent file or records, but otherwise reserves all copyright rights whatsoever.

2. Field of The Invention

The present invention relates to a method and apparatus for character recognition, and particularly to such a method and apparatus in which, prior to recognition, blocks of image data are classified and selected based on the characteristics of the image data. For example, blocks of image data may be selected and classified based on whether the image data is text image data or non-text image data such as halftone (or grey-scale) images, line drawings, frames or the like.

The present invention further relates to a method and apparatus in which lines of text are identified and segmented from text blocks and in which individual characters within lines of text are identified and cut from other characters in the lines in preparation for recognition processing.

2. Description of the Related Art

In recent years, it has become possible to analyze images of text data so as to recognize individual characters in the text data and form a computer readable file of character codes corresponding to the recognized characters. Such files can then be manipulated in word-processing or data-processing programs. Such systems, which are hereinafter referred to as "character recognition systems", are advantageous because they eliminate the need to re-type or otherwise re-enter text data. For example, it is possible to character-recognize a document which has been transmitted by facsimile or reproduced from microfilm or by a photocopier so as to form computer text files that contain character codes (e.g., ASCII) of the characters and numerals in the document thereby to permit further word-processing or data-processing of the document without the need to re-type or re-enter the document.

Documents to be character-recognized often contain many different types of image data, not all of which can be recognized. For example, while it is possible currently to recognize text image data, it is not now possible to recognize non-text image data. Typically, documents to be character-recognized include blocks of text image data, and blocks of non-text image data such as halftone images, line drawings, lines and the like. In addition, the documents may include tables or tabularly arranged data which may or may not be framed. Accordingly, before character recognition processing, it is necessary for individual blocks in the document to be classified in accordance with the type of image data in the blocks and for text-type blocks to be selected from the image data.

FIG. 32 shows a page of a representative document. In FIG. 32, a document page 401 is arranged in a two-column format. The page includes title blocks 402 which include text information of large font size suitable for titles, text blocks 404, which include lines of text data, graphics block 405 which includes graphic images which are not text, table block 406 which includes a table of text or numerical information, and caption blocks 407 which include small sized text data and which are captions associated with blocks of graphic or tabular information. Each block of information is to be classified in accordance with the type of information contained therein and the blocks are then segmented based on that classification.

Previously, to detect text-type blocks of image data, it has been considered to smear the pixel image data horizontally and vertically by extending blackened pixels in the image data both horizontally and vertically into one or more adjacent white pixels. Smearing techniques like these are unsatisfactory because they rely on foreknowledge of characteristics of the text-type image data (for example, font size) so as to be able to choose smearing parameters properly. Moreover, small changes in smearing parameters can produce large changes in selection results. Smearing techniques are also not always able to preserve the internal structure of the original document. For example, smearing can cause a two-column original to be smeared into a single column. Such a situation is unsatisfactory because it jumbles the order in which text data is stored making it impossible to reconstruct the original text accurately. Moreover, it has been found that smearing techniques sometimes smear text-type data into non-text-type data and cause the entire region to be erroneously interpreted as text-type data.

After block selection, character recognition processing proceeds character-by-character through the document whereby each individual character in the document is subjected to recognition processing so as to obtain a computer code corresponding to the character. Obtaining individual characters from character blocks proceeds in two general steps.

In the first step, individual lines in each text block, such as title block 202, text blocks 204 and caption blocks 207, are segmented from other lines in the text block. Typically, line segmentation is performed by obtaining horizontal projections of pixel density in each block and inspecting the density projections to identify gaps between lines. Thus, as shown in FIG. 33(a), text block 404 includes text lines 411 between which are located gaps 412. A horizontal projection of pixel density 414 is obtained by summing the number of black pixels located in each row of block 404. Text lines correspond to non-zero areas in density projection 414 while gaps between text lines correspond to zero-valued areas in projection 414. Text lines 411 are segmented from each other in accordance with the density projection.

In the second step, individual characters in segmented text lines are cut from other characters in the text line. Thus, as shown in FIG. 34(a), text line 411 includes individual characters 415. To cut each character from other characters in the text line, a vertical projection of pixel density 416 is obtained by summing black pixels vertically in each column of line segment 411. Characters 415 correspond to non-zero areas of density projection 416 while gaps between characters correspond to zero areas of density projection 416. Individual characters are cut from other characters in the line segment accordingly.

Difficulties have been encountered in the foregoing process. For example, it is commonplace for a document to be fed obliquely past an image scanner so that it is stored in pixel memory at a slant angle $\theta_s$ as shown in FIG. 33(b). In this case, it is not always possible to segment lines because the text from a first line 418 overlaps text from a second line 419 as shown at 420. Accordingly, a horizontal projection of pixel density 421 includes only non-zero values and it is not possible to locate gaps between lines because there are no zero values.

To overcome this difficulty, it has been considered to divide a text block 404 into plural columns 422 and 424 in FIG. 33(c) and to obtain independent horizontal projections for each such column. Thus, as shown in FIG. 33(c), a horizontal projection 422a corresponds to column 422 and a horizontal projection 424a corresponds to column 424. As long as text lines in each column do not overlap, as depicted in FIG. 33(c), it is possible to identify text lines in each column.

Although only two columns are shown in FIG. 33(c), typically five to ten columns are employed so as to guarantee that individual lines can be segmented from other lines in the block even if the test is slanted up to some maximum slant angle θs max. However, since horizontal pixel projections must be obtained for each column, and since each horizontal pixel projection so obtained must be processed separately, line segmentation processing can be quite time consuming. In addition, time is often wasted because, in an effort to accommodate the maximum slant angle θs max, all columns must be processed for all documents even though the slant angle for most documents is small and only one or a few columns would be needed.

Another difficulty encountered with the two step process described above occurs in the second step where individual characters are cut from other characters in line segments. While the processing described above with respect to FIG. 34(a) is satisfactory when there are vertical spaces between characters, the processing is unsatisfactory when the characters overlap vertically or when two or more characters are touching. Such a situation is commonplace for italic fonts or when image quality is degraded through repeated photocopying or through facsimile transmission. Thus, as shown in FIG. 34(b), for italics text the characters "f" and "y" in the word "Satisfy" overlap vertically and the vertical projection of pixel density 425 does not have a zero value between those characters. Accordingly, it is not possible to cut the characters "f" and "y". In addition, the characters "t" and "i" touch and it is not possible to cut between these two characters as well.

SUMMARY OF THE INVENTION

It is an object of the present invention to overcome the foregoing difficulties.

In one aspect, the invention is a method and apparatus for selecting blocks of pixels from pixel image data in which contours of connected components in the pixel image data, rectangles are formed around each connected component so outlined, rectangles are selectably connected widthwisely based on size and proximity to other rectangles to form lines, and lines are selectably connected vertically based on size and proximity to other lines to form blocks. Before connecting, the rectangles may be classified as text or non-text units based on size of the rectangles, with only text units being connected. Frames and lines may be detected, as well as halftone images and line drawings. Tables may be detected by tracing white contours within the interior of non-text units, calculating the fill rate of the white contours, and recombining non-grid-arranged white contours. Tables are designated based on the number of white contours, the level of the filling rate, and the degree of recombination. Non-text units between otherwise adjacent text units form boundaries between the text units and prevent vertical combination of text lines into text blocks. Classifications such as text, table, frame, line, etc., may be appended to each unit, and a hierarchical tree structure of the text and non-text units is maintained so as to aid in reconstructing a page from the pixel image data.

In another aspect, the invention is a method and apparatus for recognizing characters in pixel image data in which blocks of pixels from the pixel image data are selected by outlining contours of connected components in the pixel image data, determining whether the outlined connected components include text units or non-text units, selectably connecting text units widthwisely to form text blocks, and selectively forming text lines vertically to form text blocks. Text blocks are segmented into lines of pixel image data and characters from the segmented line are cut from other characters in the line. The cut characters are recognized and the recognized characters stored in accordance with a hierarchical tree structure established when selecting the blocks of pixels from the pixel image data. Pre-processing may be employed so as to enhance image quality or so as to compress the pixel image data and thereby speed processing, and post-processing may be employed when storing recognized characters so as to detect and correct any errors made during recognition. Frames and lines may be detected as well as halftone images and line drawings. Tables may be detected by tracing white contours within the interior of non-text units, by calculating the fill rate of the white contours, and by recombining non-grid-arranged white contours. Tables are designated based on the number of white contours, the level of the white contour filling rate, and the degree of recombination. Classifications such as text, table, frame, line, etc., may be appended to each unit, and a hierarchical tree structure may be formed when the blocks of pixels are selected from the pixel image data so as to assist in storing characters recognized during recognition.

In another aspect, the invention is a method and apparatus for identifying the position of a line in pixel image data that is dividable into columns in which a horizontal projection of image density across at least one widthwisely extending column of image data is obtained, the number of columns across which image density is projected is increased based on the horizontal projection so obtained, and the position of lines in the digital image data is identified based on the horizontal projection. Closely spaced regions in the horizontal projection of image density may be connected, and the positions of lines in adjacent columns may be inspected to determine whether the lines overlap and thereby comprise a single sloped line segment.

In another aspect, the invention is a method and apparatus for cutting character images from a line segment of pixel image data in which non-touching and non-overlapping characters are first cut from the line segment, following which touching characters are then cut from the line segment. An intermediate cutting layer may be provided in which non-touching but overlapping characters are cut from the line segment, and the intermediate cutting layer may be performed by outlining contours of pixel data. Recombination of cut character data may be performed based on a determination that inadvertent cuts have been made. The second cutting layer may be performed based on statistical data concerning the character set, or it may be performed based on rotated projection profiles of pixel image data in the line segment so as to obtain an oblique cutting angle at a position corresponding to a minimum in the rotated projection. Non-touching and non-overlapping characters may be cut by sparsely stepping through the line segment.

In another aspect, the invention is a method and apparatus for cutting between touching characters in a line segment of character pixel data in which a vertical projection profile of pixel data is obtained for the line segment, an angle is calculated between a minimum in the vertical projection profile to an adjacent maximum therein, a rotated projection profile is calculated based on the angle calculated from the vertical projection profile, and the line segment is cut at an angle corresponding to the rotated projection profile and at a position corresponding to a minimum in the rotated projection profile. The minimum in the vertical projection profile may be calculated based on a hysteresis comparison with plural thresholds, and more than one rotated projection profile may be made at angles in the neighborhood of the angle calculated from the vertical projection profile.

In another aspect, the invention is a method and apparatus for recognizing characters in pixel image data in which text and non-text blocks of pixels are selected from the pixel image data, the text blocks are segmented into lines of pixel data by adaptively dividing the text blocks into column based on a horizontal projection of pixel density across the columns, characters are cut from the segmented lines, the characters being cut in a first cutting layer by which non-touching and non-overlapping characters are cut and additional cutting layers by which touching characters are cut, the cut characters are recognized, and the recognized characters are stored in accordance with an order established when the text and non-text blocks of pixels were selected. Pre-processing may be employed so as to enhance the pixel image data or to compress the pixel image data, and post-processing may be employed so as to identify and correct errors made in recognizing characters. The first cutting layer may include sparsely stepping through the line segment, and the additional cutting layer may be selectable in accordance with whether the characteristics of the characters in the pixel image data are known. If the characteristics of the characters in the pixel image data are known, then the additional cutting layer may be based on the statistics of the known character set, while if the characteristics of the characters are not known, then touching characters may be cut based on rotated projections of pixel density calculated at angles determined from a vertical projection of pixel density.

This brief summary of the invention has been provided so that the nature of the invention may be understood quickly. A more complete understanding of the invention may be obtained by reference to the following detailed description in connection with the appended drawings.

BRIEF DESCRIPTION OF THE DRAWINGS

FIG. 25 is a flow chart showing layer 2 character cutting in all-spacing mode (e.g., proportional-spaced) according to FIG. 20, and FIGS. 26(a) through 26(d) are views for explaining layer 2 character cutting.

DETAILED DESCRIPTION OF THE PREFERRED EMBODIMENT

The present invention can be embodied in a variety of devices where character recognition processing is desired, such as image processing or image reproducing apparatuses including photocopiers, facsimile machines, video or still-video cameras, laser beam printers and the like. In such devices, images that include character images may be processed or reproduced such that the character images are character-recognition-processed. If desired, standardized character sets or fonts may be substituted for recognized character images, and the standard characters may be retransmitted or reproduced rather than the original character image. The invention can also be embodied in general purpose computers and office equipment, such as personal computers, word-processing or data-processing equipment and integrated office automation equipment which combines a number of business equipment tools in a single integrated package.

Figure 1:
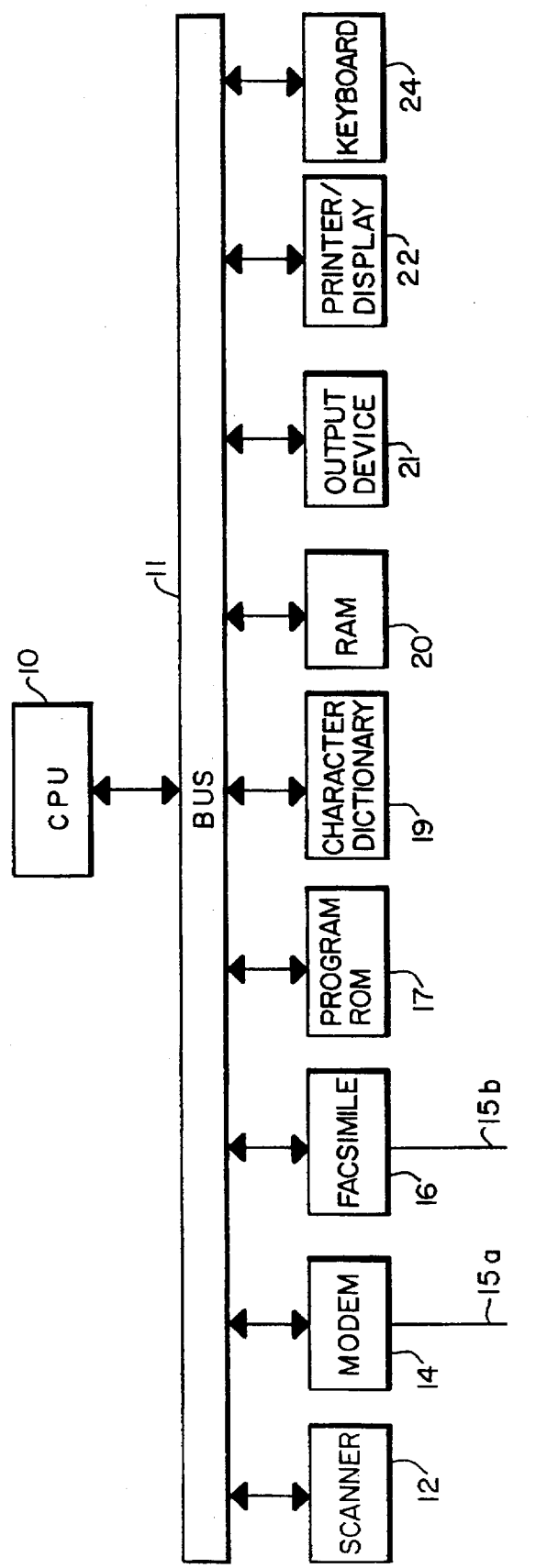
FIG. 1 is a block diagram of an apparatus of the present invention.

FIG. 1 is a block diagram of an embodiment of the invention in the form of integrated office automation equipment having scanning, facsimile, information transmission and reception, and information processing capabilities, the latter optionally including word-processing and data-processing capabilities.

In the apparatus shown in FIG. 1, images may be input by facsimile transmission to the apparatus, by scanning an original document into the apparatus, or by remote reception via a modem, or the like. With the invention, it is possible to recognize the characters in the image, to create a computer text file of recognized characters, and to employ word-processing, spreadsheet-processing or other information processing capabilities of the apparatus to modify the text file. The modified text file (or the unmodified text file) may subsequently be retransmitted or otherwise output, for example, by employing speech synthesis technology to "speak" the text file to a speaker or over ordinary voice telephone.

In FIG. 1, a central processing unit ("CPU") 10, such as a programmable microprocessor, is connected to a bus 11. Also connected to the bus are a scanner 12 for scanning an image pixel-by-pixel into image memory (for example RAM 20, described below), a modem 14 for sending and receiving digital data in analog form over telephone line 15a, and a facsimile device 16 (optionally including a telephone, not shown) for transmitting and receiving image data on telephone line 15b. Telephone lines 15a and 15b may be the same line or they may be coordinated through an unshown network control unit. Further connected to bus 11 are a read only memory ("ROM") 17 for storing one or more computer programs for execution by CPU 10, a character dictionary 19 for storing a dictionary of characters against which input characters are compared during recognition processing, a random access memory ("RAM") 20 for storing input image data, processed image data, information concerning the structure of images and the like, an output device 21 (such as a disk memory or a speech synthesis device with a speaker and/or voice telephone line interface) to which the identity of characters recognized during character recognition processing is output, a printer/display 22 for displaying images processed by the apparatus, and a keyboard 24 for allowing operator control of the apparatus.

Although the devices connected to bus 11 are incorporated into an integrated office automation tool, it is understood that some or all of these devices can alternatively be provided on a stand-alone basis.

Scanner 12, modem 14 and facsimile 16 constitute alternative forms of input means for inputting image data into the apparatus. In the case of scanner 12, original documents are scanned line-by-line and pixel-by-pixel and under the control of CPU 10 the pixels of image data are stored in bit map memory format in image memory in RAM 20. In the case of modem 14, image data is received in analog form over telephone line 15a and converted into digital pixel form by modem 14 whereupon the digital pixel data is stored in image memory in RAM 20. In the case of facsimile 16, image data is received in compressed or coded form, such as modified-Huffman run length coding, over telephone line 15b. The compressed image data is uncompressed into digital image pixel data by means conventional in the art by facsimile 16 and CPU 10 stores the pixels of image data in bit map format in image memory in RAM 20. Other input means are, of course, possible and the image data may simply be retrieved from a mass storage medium such as disk memory or derived from a video or still-video camera.

Facsimile 16 and output device 21 constitute alternative forms of output means for outputting character-recognized image data from the apparatus. In the case of facsimile 16, images of characters that have been recognition-processed according to the invention may be replaced by standard character sets or fonts, and transmitted from the apparatus. This allows, for example, to receive an image including character images, to character-recognize the character images, and to replace the recognized characters with standardized character fonts prior to re-transmission, thereby to improve the quality of degraded images.

Modem 14 and output device 21 are alternative means for outputting and storing the identity of characters recognized in image data, for example, in ASCII code. The characters identities may be stored in the apparatus (such as in a disk memory) or may be output for transmission to a remote location via modem 14. Means may also be provided for reformatting the characters identities such as a conversion from ASCII to facsimile-compatible format, so as to allow transmission to a remote facsimile machine through modem 14 without the need for activating facsimile 16.

Printer/display 22 are means for monitoring the progress of character recognition processing according to the invention as well as for outputting and forming a permanent record for any of the character recognition steps. Keyboard 24 provides operator control over operation of the FIG. 1 apparatus.

Figure 2:
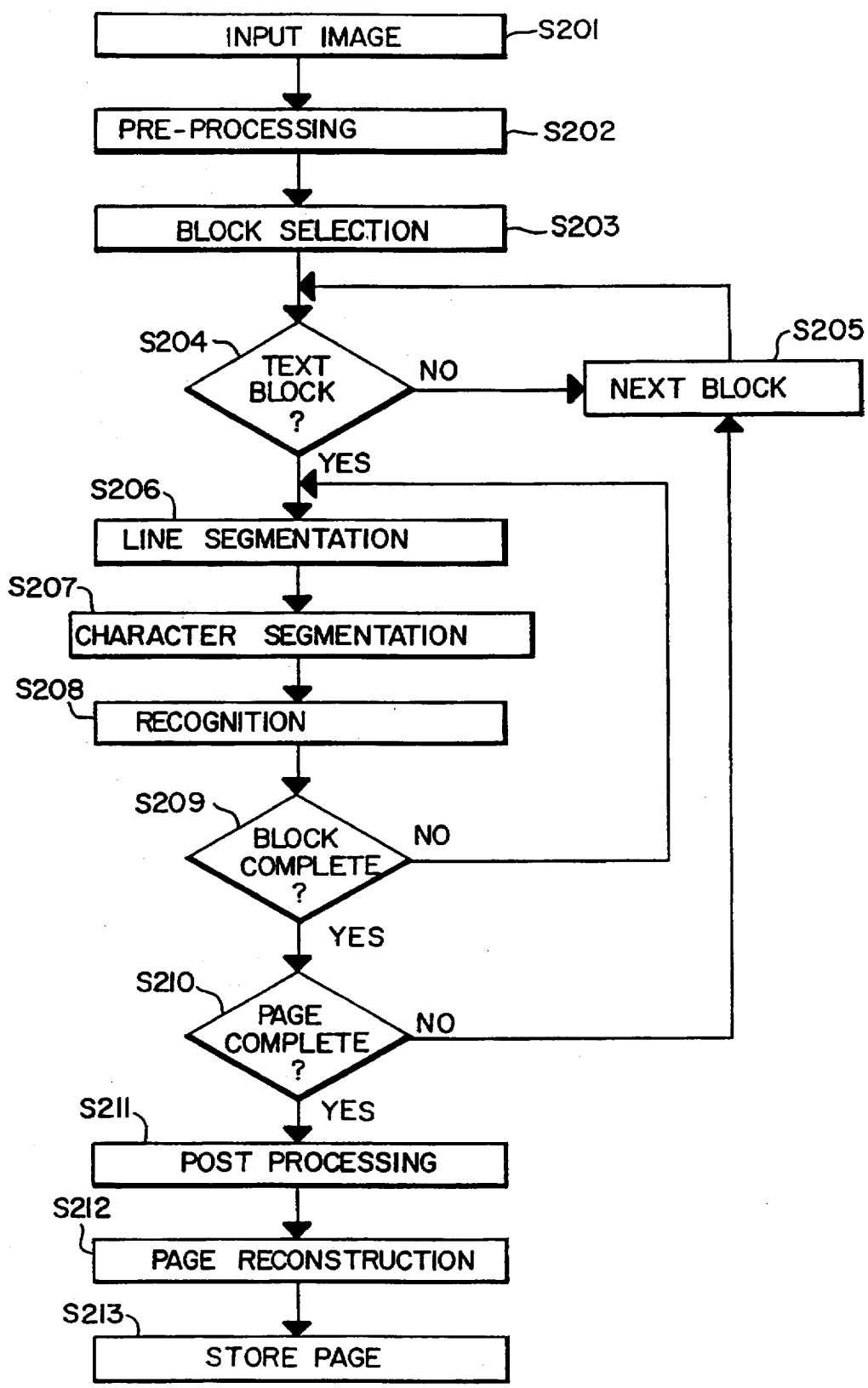
FIG. 2 is a flow chart showing character recognition processing.

FIG. 2 is a flow chart showing character recognition processing according to the invention. The process steps shown in FIG. 2 are executed by CPU 10 in accordance with a computer program stored in program ROM 17.

In step S201, pixel image data is input into the apparatus and is stored in RAM 17. Image data is a pixel-by-pixel representation of the image. Preferably, the pixel data is binary pixel data, that is, black and white image data. But it is possible for the image data to be half-tone image data in which each pixel is represented by one of plural grey scale levels, or for the image data to be color image data in which each pixel is represented by a multibit word which encodes the color for the pixel. In such cases, or in any other case where the pixel data is not binary pixel data, then threshold-processing should be performed so as to convert the non-binary pixel data into binary pixel data prior to storage in RAM 20.

Preferably, the pixel image data input in step S201 is representative of a portrait image, that is, an image which reads from the upper left hand corner to the lower right hand corner. If the image is not so configured, for example, if it is a landscape image, then the pixel image data may be translated so that it is representative of a portrait-type image. The translation may be performed in accordance with an operator-input instruction via keyboard 24 to translate the image data.

In step S202, the image data is pre-processed. Typically, a pre-processing filter is employed so as to enhance the image data such as by improving degraded characters and images. A suitable image enhancement technique is described in co-pending application Ser. No. 07/771,220, filed Oct. 4, 1991 and assigned in common herewith.

If desired in step S202, the number of pixels in the pixel image data may be reduced, or compressed, so as to increase the speed of recognition processing at the possible cost of reduced accuracy. For example, it may be desired to average pixel values for an m×n block of pixels ("m" and "n" may be different) and to substitute a single pixel whose value is the average value for the m×n block.

In step S203, block selection is performed so as to characterize the type of image data in each segment of the image and to designate and identify blocks of information such as text information, graphics information, line image information, picture information, etc. In addition, block selection of step S203 includes derivation of a hierarchical tree structure of the image so that the parts of the image may be reconstructed in the proper order as described in step S212 below. For example, the hierarchical tree structure includes information that permits two-column image data to be reconstructed with text from column 1 preceding text from column 2 so as to prevent text from column 1 reading across into text from column 2. Block selection according to step S203 is described more fully below.

A first block of information is selected from the image stored in RAM 20 and step S204 determines whether it is a text block in accordance with the block identities determined in block selection step S203. If the first block is not a text block then flow proceeds to step S205 in which the next block is selected whereupon flow returns to step S204.

If in step S204 the block is a text block then flow advances to step S206 in which the text block is subjected to line segmentation. In line segmentation, individual lines of text in the text block are segmented from other lines of text in the text block and the lines so segmented are serially processed as described more fully below.

In step S207, each character in a line is cut or segmented from other characters in the line so as to provide individual characters to the recognition processing routine, as described more fully below.

Recognition processing is performed for each character on a character-by-character basis in step S208 in which each character is compared by techniques known in the art to the standard characters stored in character dictionary 19. The entries in character dictionary 19 are ordinarily only for single characters, but because some character sequences are difficult to cut between (e.g., "fi") and because single characters are sometimes cut inadvertently (e.g., "j"), the character dictionary can contain other entries as well. Specifically, the dictionary may include entries for pairs of touching characters that are difficult to cut. Likewise, the character dictionary may contain entries for portions of characters that are frequently cut inadvertently.

On the basis of the comparison, an identity is selected for the character image and the character identity so selected is stored in RAM 20 or output to output device 21. Optionally, the identified character is also displayed on printer/display 22.

Step S209 determines whether processing for the text block is complete. If processing is not yet complete, flow returns to step S206 (or, if appropriate, to step S207) for further line segmentation or character segmentation processing. When block processing is complete, flow advances to step S210 which determines whether processing for a page is complete. If processing for the page is not yet complete, then flow returns to step S205 in which the next block on the page is selected for processing.

When processing for the page is complete, flow advances from step S210 to step S211 in which post-processing is performed. Post-processing includes such techniques as context-checking and spell-checking whereby the identities of characters recognized in recognition step S208 may be modified in accordance with the context in which those characters occur (a holistic viewpoint) rather than on an individual character basis as was the case in step S208.

In step S212, the image data is reconstructed in accordance with the hierarchical tree structure defined in the block selection step S203. Page reconstruction permits the image data to be placed in its proper order whereby, for example, footnotes are separated from the main text, columns follow other columns rather than being merged together, and graphic or line drawing data may be inserted into the appropriate locations in the recognized character text of the page. Captions associated with such graphics images or line drawings may be inserted adjacent to those drawings. Other rules may be applied, and, for example, it is possible that physical reconstruction of the page is not desired but rather only to extract the text from a page. Rules may be defined by a user for page reconstruction in accordance with the information processing capabilities of the apparatus.

In step S213, the reconstructed page is stored, for example, on output device 21. Information processing such as spreadsheet or word-processing may then be performed in accordance with other application programs stored in ROM 17 and executed by CPU 10. The processed information (or the unprocessed information, if desired) may then be retransmitted by any of various means, e.g., by facsimile 16, modem 14, or over ordinary voice telephone by a speech synthesis device which "speaks" the computer text file.

Figure 3:
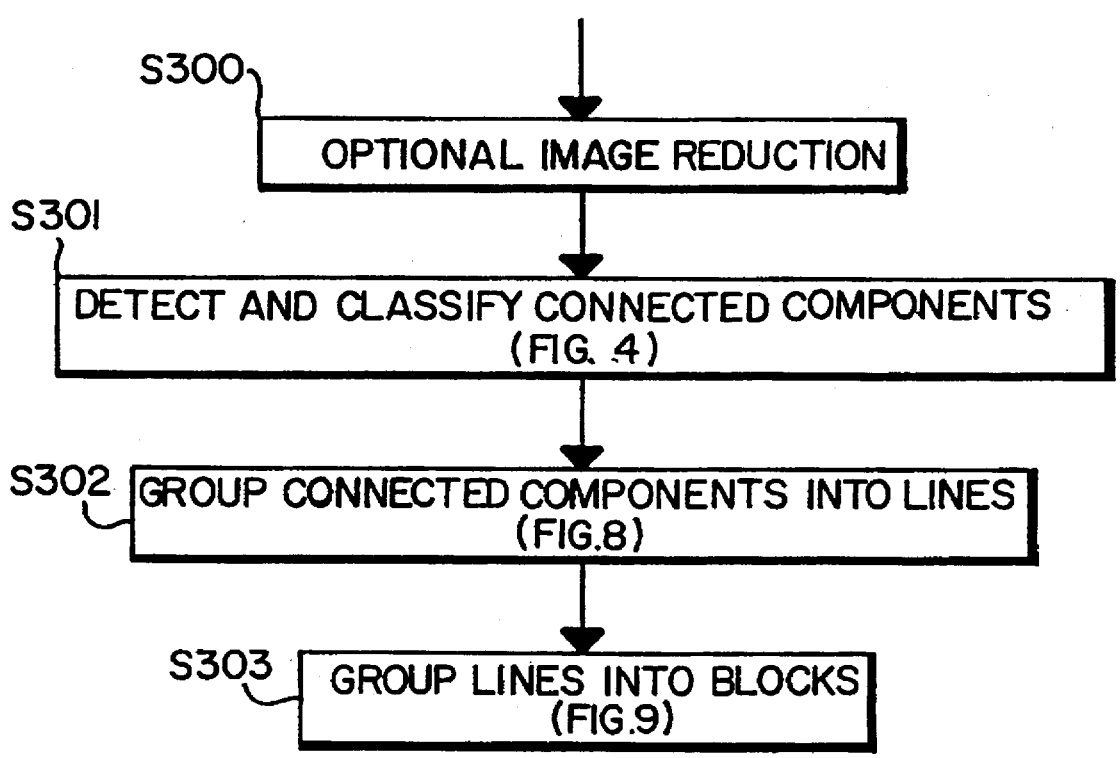
FIG. 3 is a flow chart showing block classification and selection according to the invention.

FIG. 3 is a generalized flow diagram for explaining block selection processing in step S203 in FIG. 2. It should be pointed out that block selection processing can be used apart from a character recognition system. For example, it is possible to use block selection processing in image reproducing equipment so as to cause a first method for image reproduction for one type of block and a second method for image reproduction for a second type of block.

In step S300, image data reduction may be performed if it is desired to increase block selection processing speed. If image data reduction is performed, then block selection is performed on the reduced image. However, so as not to affect character recognition processing in the remainder of FIG. 2 (i.e., steps S204 through S213), at the end of block selection processing, the selected blocks are applied against the unreduced pixel image data.

Image data reduction proceeds by evaluating the connectivity of black pixels in m×m blocks of pixels. For example, if there are two connected black pixels in a 3×3 pixel block, then the 3×3 block is reduced to a single black pixel. Conversely, if there are not two connected black pixels in the 3×3 pixel block, the 3×3 block is reduced to a single white pixel.

In step S301, the pixel image is analyzed to detect connected components and to classify the connected components in accordance with their size and their location relative to other connected component. A connected component is a group of black pixels that is completely surrounded by white pixels. Accordingly, a connected component is a group of black pixels that is separated completely from other groups of black pixels by at least one white pixel. As explained more fully below in connection with FIG. 4, step S301 involves detecting the connected components, and, based on size information and some statistical values obtained from the connected components, assigning classifications to each connected component. Initially, and as explained more fully below, each connected component is classified as either a text unit or a non-text unit. Non-text units are subjected to further analysis to determine whether they are framed data, halftone images, line drawings, tables or other tabular organizations of text data, or if they are unknown and therefore cannot be classified. A hierarchical tree structure is developed for each of the connected components so as to provide organizational data of the connected components and to facilitate reconstruction of the digital data as described above with respect to S212.

In step S302, connected components that are spaced closely in a horizontal direction are grouped into lines unless such grouping would cover a gap line mark. The tree structure developed in step S301 is used to ensure that text and non-text units are not mixed inappropriately. In addition, step S302 determines whether the text units are organized into columns by detecting a vertically-extending gap between columns and vertically-extending borders of non-text units. Column structure is maintained in the hierarchical tree structure which is updated appropriately (to be described below).

In step S303, lines that were grouped in step S302 are grouped vertically into blocks if they are spaced closely in the vertical direction. Non-text units are sorted vertically and are used as borders for the image page. Any text line units which are between two non-text units are processed separately from other text line units.

Also in step S303, any non-text units that could not be classified in step S301 are analyzed to determine whether they may be large font size titles. If they are determined to be titles, then the units are re-designated appropriately and the tree structure updated. Titles are of assistance in reconstructing the page in accordance with step S212.

Figure 4A:
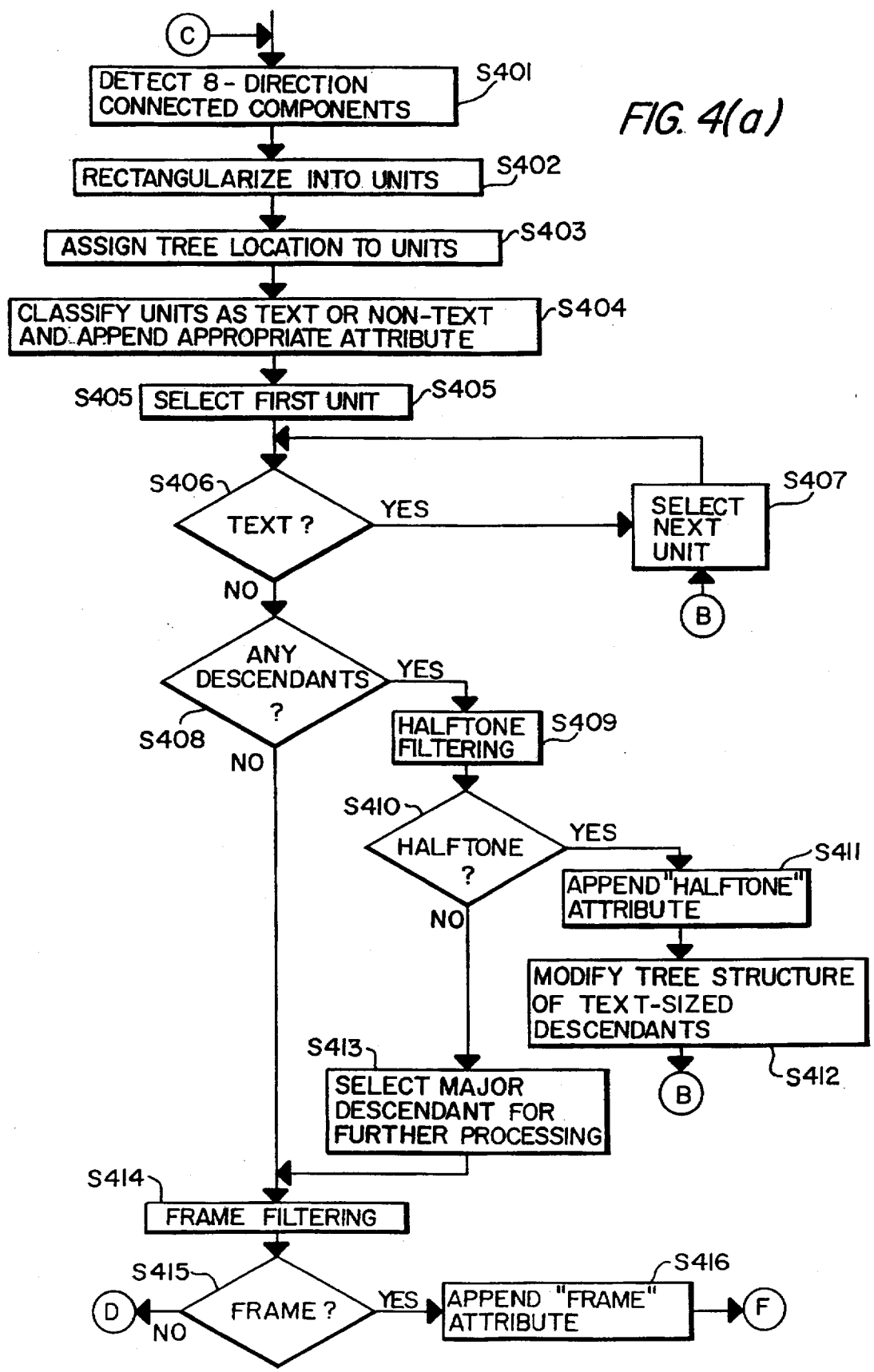
FIGS. 4(a), 4(b) and 4(c), is a flow chart showing how connected components in pixel image data are classified.
Figure 4B:
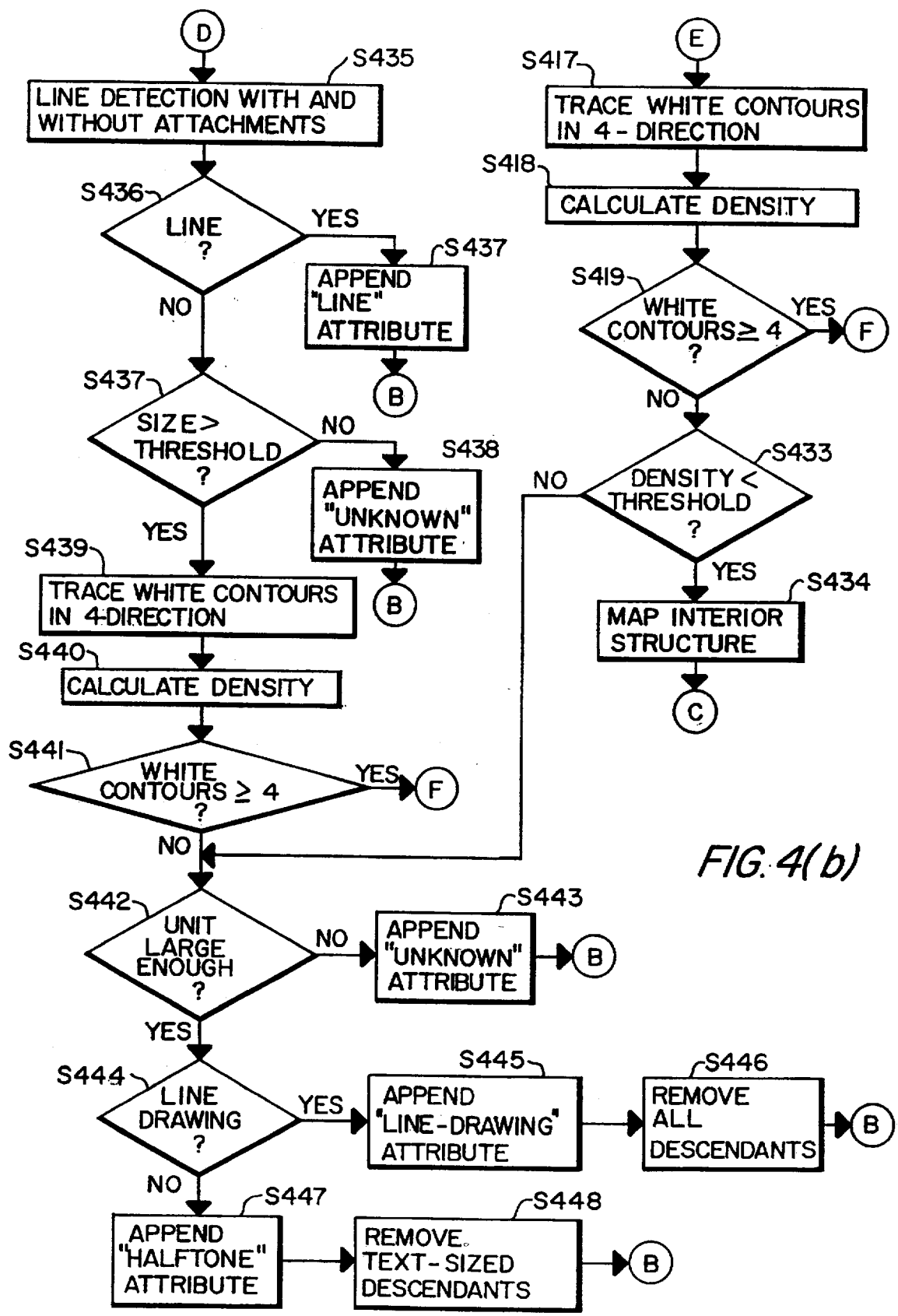
Figures 4, 4C:
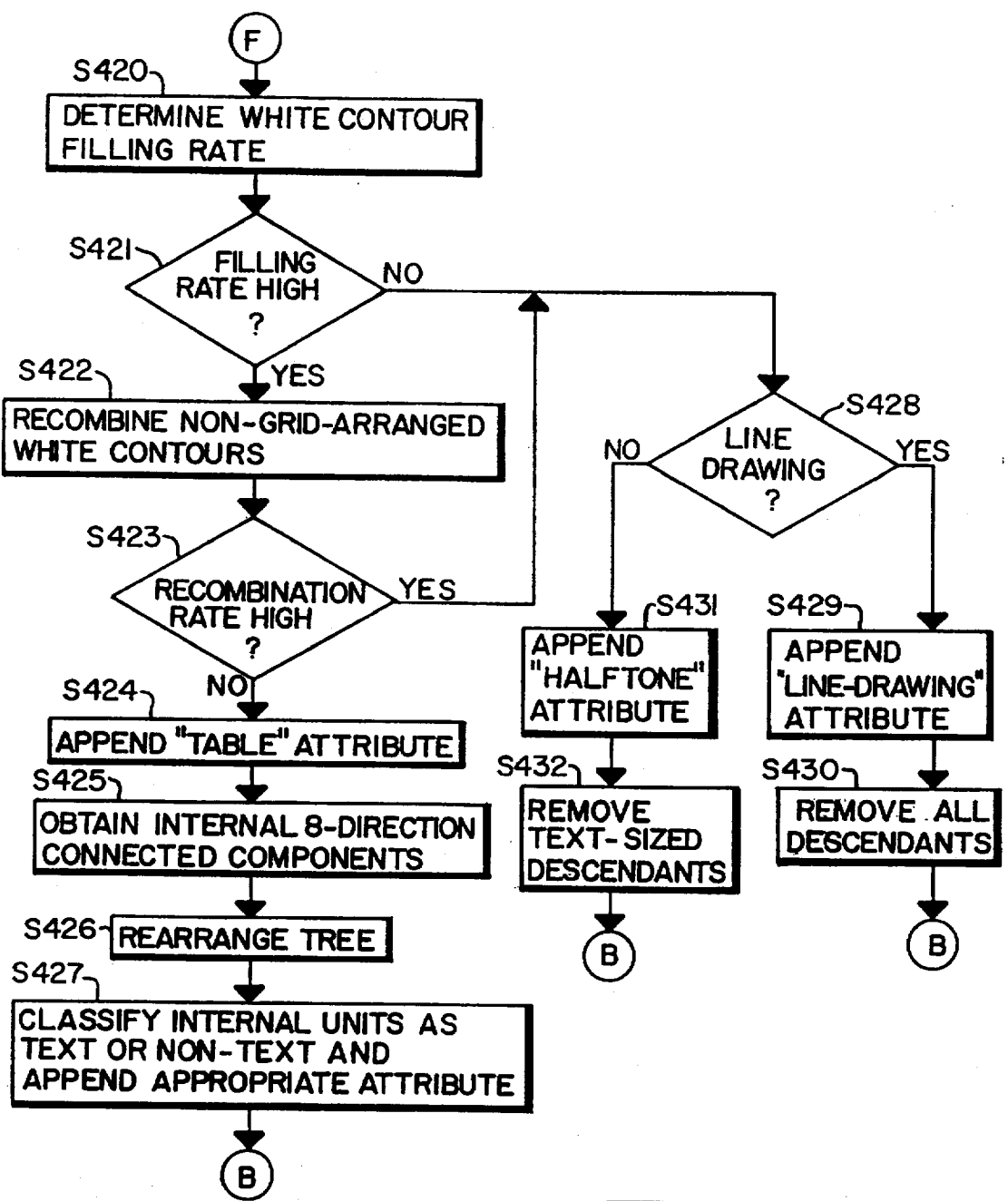
FIG. 4 comprising

FIG. 4, comprising FIGS. 4(a), 4(b) and 4(c), is a detailed flow chart for showing how connected components of pixel image data are detected and how those connected components are classified. The process steps shown in FIG. 4 are executed by CPU 10 in accordance with program steps stored in program ROM 17.

Figure 5A:
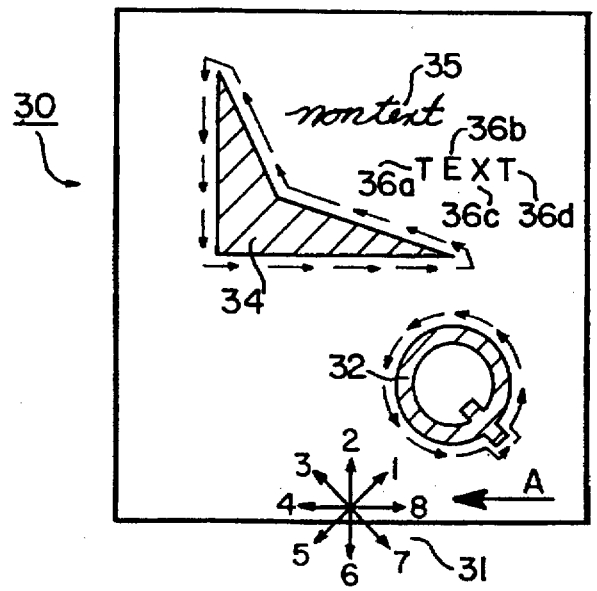
FIGS. 5(a) through 5(c) are views for explaining contour tracing.
Figure 5B:
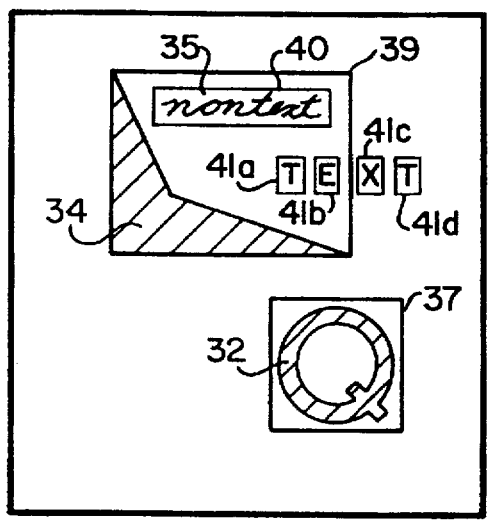

In step S401, the connected components in the pixel image data are detected by contour tracing. Contour tracing proceeds by scanning the image data as shown in FIG. 5(a). Scanning proceeds from the lower right hand portion of the image to the left as shown by arrow A and proceeds upwardly when the right hand border of the image has been encountered. Scanning may also proceed in other directions, for example, from upper left toward lower right. When a blackened pixel is encountered, adjacent pixels are inspected in the order shown in the starburst-like pattern shown at 31 to determine if a pixel adjacent the blackened pixel is also black. Because the starburst-like pattern 31 includes eight numbered vectors emanating from a common center, this contour tracing is hereinafter referred to as "8-direction" tracing. If an adjacent blackened pixel is located, processing proceeds as mentioned above until the exterior contour of the image has been traced. Thus, as shown in FIG. 5(b), scanning in the direction of arrow A has located point 32 which corresponds to the tail of letter "Q". Inspection of adjacent pixels proceeds in accordance with the starburst-like pattern 31 so that the exterior contour of the letter "Q" is traced. The interior portions of closed contours are not traced.

After one connected component is detected, and the contour thereof traced by 8-direction tracing, scanning advances until the next blackened pixel is located. Thus, for example, object 34 which may represent a completely blackened area is 8-direction traced. Similarly, non-text object 35, which is a handwritten word "non-text" is traced as are the individual letters in text objects 36 which are individual characters forming the word "text". Scanning shown in FIG. 5(a) continues until all connected components in the pixel data have been detected and the contours thereof 8-direction detected.

Flow then advances to step S402 in which each connected component is rectangularized. Specifically, the smallest possible circumscribing rectangle is drawn around each connected component. Thus, as shown in FIG. 5(b), a rectangle 37 is drawn around object 32, a rectangle 39 is drawn around object 34, a rectangle 40 is drawn around object 35, and rectangles 41a, 41b, 41c and 41d are drawn around text objects 36a, 36b, 36c and 36d, respectively.

Figure 5C:
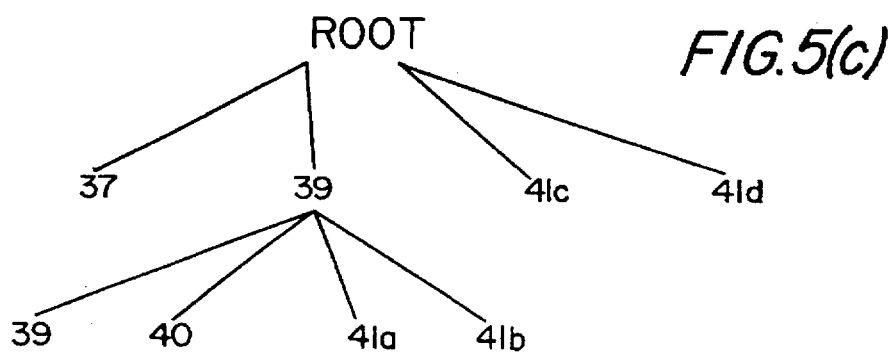

In step S403, a tree location is assigned to each rectangular unit. For the most part, the tree structure obtained in step S403 proceeds directly from the root of the tree for each object in the pixel image. This is because only the exterior contours of connected components are traced and interior portions of closed contours are not traced. Thus, as shown in FIG. 5(c), rectangle 37 which corresponds to connected component 32 proceeds directly from the root of the page. However, for those connected components whose rectangles lie entirely within the rectangle of another connected component, such as rectangle 40 which corresponds to non-text object 35 and rectangles 36a and 36b which correspond to text objects 36a and 36b, those connected components are designated as descendants from the enclosing connecting component (in this case component 34). In addition, for each connected component with at least one descendent, such as component 34, the component itself is designated as a "major descendant" from itself. Thus, as shown in FIG. 5(c), component 39 is included as a major descendant among the other descendants 40, 41a and 41b of component 39.

In step S404, each connected component at the first level on the tree is classified as either a text unit or a non-text unit. Classification proceeds in two steps. In the first step, the rectangle for the connected component is compared to predetermined size thresholds. If the height of the rectangle enclosing the connected component is higher than a first predetermined threshold that corresponds to the maximum expected font size, or if the width of the rectangle enclosing the connected contour is wider than the page width divided by an experimentally-determined constant ("5" has been found to yield satisfactory results), then the connected component is classified as a non-text unit and a "non-text" attribute is appended to the unit.

In the second step, all remaining units, that is, units not yet classified as non-text, are compared to thresholds that are determined adaptably based on the collective sizes of all remaining connected components. Specifically, the average height of all rectangles not yet designated as non-text are averaged. This average height is multiplied by a scalar (conveniently selected as "2") to obtained an adaptably determined threshold. Any unit larger than the adaptably determined threshold is presumed to be non-text and is classified accordingly, while any unit smaller than the adaptably determined threshold is presumed to be text. The units are classified accordingly and the appropriate attribute is appended. Both of these classifications are subject to refinement as set forth in the remainder of FIG. 4 and as described more fully below.

After each unit in the first level of the tree has been classified as text or non-text, all descendants of text units, including major descendants, are classified as text units. The classification of major descendants of non-text units is retained as non-text, but all other descendants of non-text units are classified as text units.

In step S405, the first unit is selected. If, in step S406, the unit is a text unit then flow advances to step S407 where the next unit is selected. Flow continues through steps S406 and S407 until a non-text unit is selected, whereupon flow advances to step S408.

In step S408, the non-text unit is inspected to determine whether there are any descendants from the unit. For example, as shown in FIG. 5(c), non-text unit 39 includes non-text major descendant 39 and text descendants 40, 41a and 41b.

If in step S408 there are any descendants then flow advances to step S409 where the unit is filtered to determine if the unit is a halftone (or grey-scale) unit. In halftone filtering, the descendants of the unit are inspected, and the number of descendants whose size is less than a "noise" size is determined. A "noise-sized" unit is a unit whose height is less than the smallest font size expected for the image data. If the number of descendants that are sized less than a noise size is greater than half of the total number of descendants, then the unit is determined to be a halftone image. Accordingly, in step S410, flow advances to step S411, wherein a "halftone" attribute is appended to the unit. Step S412 then checks for any embedded text in the halftone image. Specifically, the tree structure of each text-sized descendant of the halftone image modified so that the text-sized unit is no longer a descendant from the halftone image but rather is on the same level of the halftone image. This permits character-recognition, if such is deemed appropriate, of text-sized units in the halftone image. Flow then returns to step S407 in which the next unit is selected for processing.

If in step S409 halftone filtering determines that the unit is not a halftone image, then flow advances through step S410 into step S413 in which the major descendant from the unit is selected for further processing. Flow then advances to step S414.

Figure 6A:
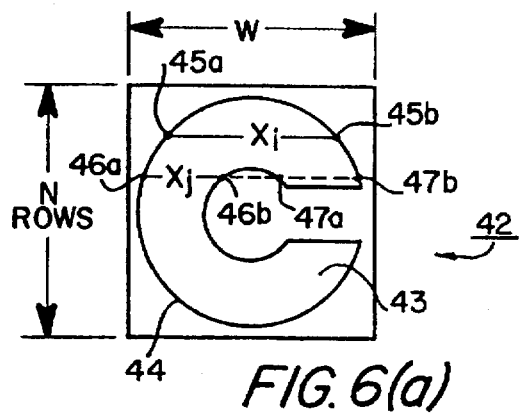
FIGS. 6(a) through 6(c) are views for explaining classification processing for non-text units.

If in step S408 the non-text unit is determined not to have any descendants, or if in step S413 the major descendant has been selected for further processing, then in step S414 the unit in question is subjected to frame filtering. Frame filtering is designed to determine whether the unit in question is a frame and involves detection of parallel horizontal lines and parallel vertical lines that are approximately the same width and/or height as the rectangle which circumscribes the unit. In particular, the connected component is inspected to determine, for each row in the pixel, the longest distance spanning the interior portion of the connected component in the unit. Thus, as shown in FIG. 6(a), non-text unit 42 includes connected component 43, the contour of which has been traced by 8-direction tracing as shown at 44. For row "i", the longest distance spanning the interior of the connected component is distance $x_i$ which is the distance from the left most border 45a of the contour to the right most border 45b. On the other hand, for row "j", there are two distances which span the interior of the connected component; the distance between points 46a and 46b on the border of the connected component and the distance between points 47a and 47b. Because the distance between points 46a and 46b is larger between the distance between points 47a and 47b, distance $x_j$ is the longest distance spanning the interior of the connected component for row j.

For each of the n rows in non-text unit 42 an "x" distance is derived and the following inequality is tested to determine whether the non-text unit is a frame:

$$\sum_{k=1}^{N} \frac{(X_k - W)^2}{N} < \text{threshold}$$

where $X_k$ is the longest distance spanning the interior of the connected component for the kth row (as described above), W is the width of the rectangular unit 42, N is the number of rows, and the threshold is pre-calculated so as to permit the detection of frames even if the frames are skewed or slanted in the image data. To permit a 1° skew or slant angle, a threshold of sin(1°) times L plus an offset which equals the average text height calculated in step S404 has been found to yield satisfactory results.

If the above inequality is satisfied, then the unit is determined to be frame data, and flow advances through step S415 to step S416 in which a "frame" attribute is appended to the unit. It should be noted at this point that more than one attribute can be appended to each unit. Thus, for example, it is possible for a frame to be designated as "frame-table" or "frame-halftone" or the like.

After step S416, flow then advances to consider the possibility that the framed data includes table or tabularly organized data. Thus, in step S417, the interior of the connected component is inspected to obtain white contours.

Figure 7A:
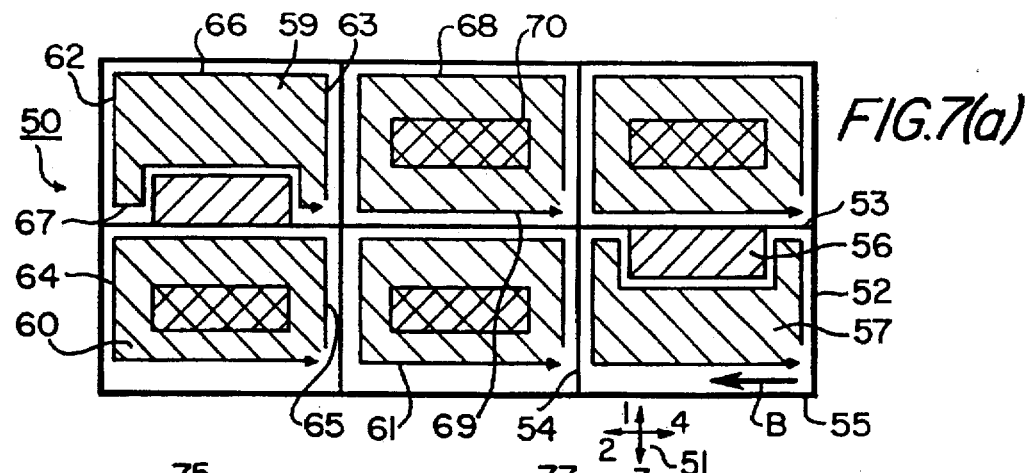
FIGS. 7(a) through 7(d) are views for explaining white contour processing.

White contours are similar to the contours detected in step S401 above, but white pixels are inspected rather than black pixels. Thus, as shown in FIG. 7(a), the interior of a non-text unit is scanned in the direction of arrow B from the bottom right hand portion of the interior of the non-text unit toward the upper left hand portion. When a first white pixel is encountered, adjacent pixels to the white pixel are inspected in the order shown in the starburst-like pattern 51. It is noted that the starburst-like pattern 51 includes numbered vectors numbered from 1 through 4. Accordingly, white contour tracing according to this step is hereinafter designated as "4-direction" white contour tracing. White contour tracing is continued in the 4-directions until all white contours enclosed by black pixels are traced. For example, white contour tracing follows pixels forming the interior contour of black pixel segments 52, 53, 54 and 55 as well as any other black pixels within the interior such as the black pixels designated generally at 56. After each white contour is located, scanning proceeds as above in the direction of arrow B until all white contours enclosed in the non-text object have been traced.

In step S418, the density of the non-text unit is calculated. Density is calculated by counting the number of black pixels within the connected component, and dividing the number of black pixels by the total number of pixels enclosed by the rectangle.

In step S419, the number of white contours found within the non-text unit are inspected. If the number of white contours is greater than or equal to 4, then there is a possibility that the non-text image is in fact a table or tabularly arranged series of text blocks. Accordingly, in step S420, the white contour filling rate is determined. The white contour filling rate is the degree to which white contours fill the area enclosed by the non-text image. Thus, as shown in FIG. 7(a), white contour filling rate includes cross-hatched areas such as 57 and 59 which are completely empty white spaces, as well as areas such as 60 and 61 which are white spaces in which black pixels are located. If the filling rate is high, then it is probable that the non-text image is a table or tabularly arranged sequence of text data. Accordingly, in step S421, the filling rate is inspected. If the filling rate is high, then it is probable that the non-text image is a table or tabularly arranged sequence of text data. To increase the confidence in this determination, the white contours are inspected to determine if they form a grid-like structure extending both horizontally and vertically. Specifically, in step S422 non-grid-arranged white contours are recombined if their boundaries do not extend horizontally and vertically across at least two contours. For example, as shown in FIG. 7(a), the left boundary 62 and right boundary 63 of white contour 59 extend vertically so as to coincide with the left boundary 64 and the right boundary 65 of white contour 60. Accordingly, since these white contours are arranged in a grid structure, these white contours are not recombined. Similarly, the upper boundary 66 and the lower boundary 67 of white contour 63 extend horizontally so as to coincide with the upper boundary 68 and lower boundary 69 of white contour 70. Accordingly, since these white contours are arranged in a grid-like structure, these white contours are not recombined.

Figure 7B:
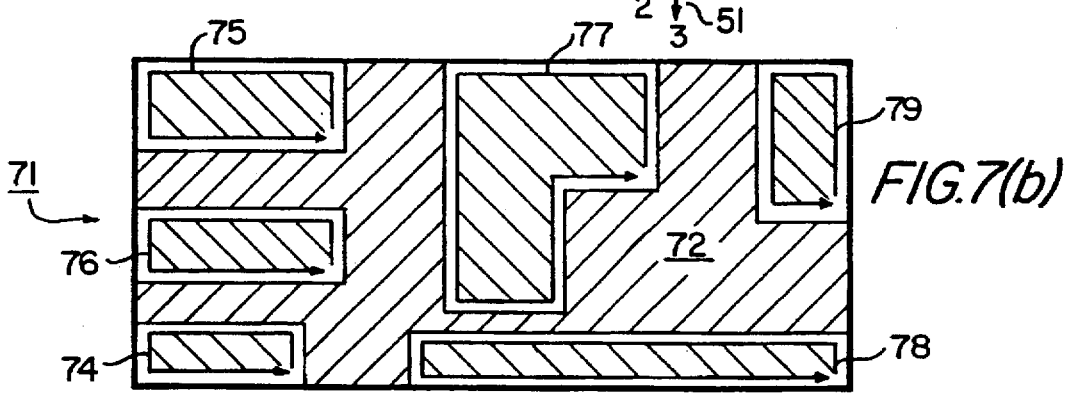
Figure 7C:
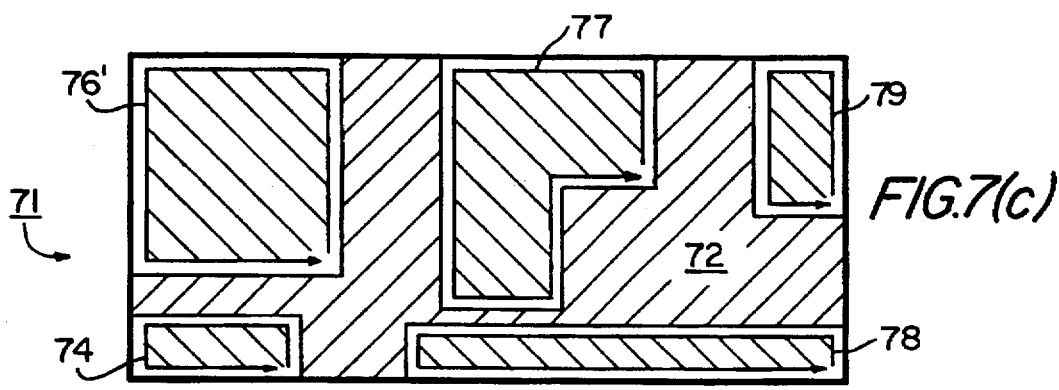
Figure 7D:
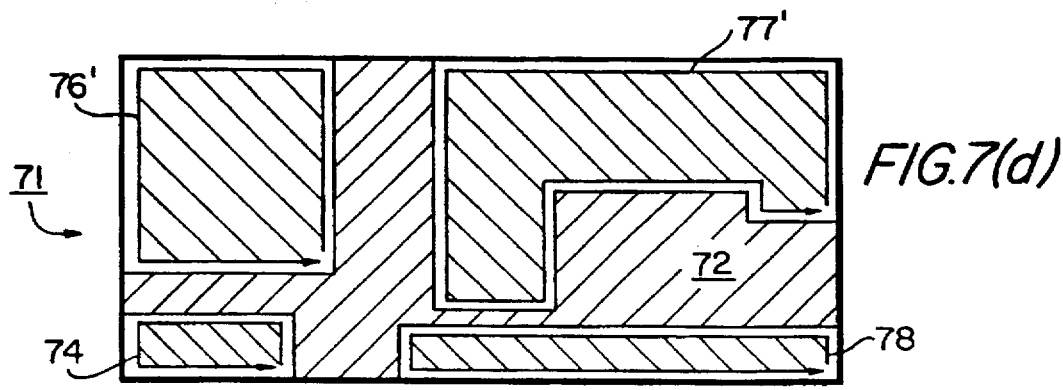

FIGS. 7(b) through 7(d) are figures for explaining a situation in which white contours are recombined. FIG. 7(b) shows a non-text unit 71 which may, for example, be formed through thresholding of a halftone image into a binary image as described above with respect to step S201. The non-text image 71 includes black area 72 as well as white areas 74, 75, 76, 77, 78 and 79. Presumably, the filling rate of these white areas is sufficiently high so that in step S421 flow has advanced to recombination step S422. First, as shown in FIG. 7(c), the upper and lower boundaries of white contour 75 are compared with the upper and lower boundaries of white contour 77. Since these upper and lower boundaries do not coincide, white contour 75 is combined with white contour 76, as shown in FIG. 7(c), to create combined white contour 76'.

In FIG. 7(d), the left and right boundaries of white contour 77 are compared to the left and right boundaries of white contour 78. Since these boundaries are not the same, white contours 77 and 79 are recombined into a single white contour 77'.

The process is repeated horizontally and vertically until no more recombinations occur.

Thus, as explained above, white contours for a table are not likely to recombine, whereas white contours for a non-table, for example, a halftone image or a line drawing, are more likely to recombine. Accordingly, in step S423, the recombination rate is inspected. If the recombination rate is high or if the number of white contours remaining after recombination is less than 4, then flow advances to step S428 in which the non-text unit is designated as a halftone image or a line drawing, as described more fully below.

If in step S423 the recombination rate is not high and at least 4 white contours remain, then flow advances to step S424 in which the non-text image is designated as a "table". In step S425, the interior of the newly-designated table is inspected so as to detect and classify connected components in 8-direction. In step S426, the hierarchical structure is updated in accordance with the new, internal connected components. In step S427, the internal connected components re-classified as text or non-text and the appropriate attribute is appended, as set forth above with respect to step S402 through step S404. Flow thereupon returns to step S407 in which the next unit is selected.

Reverting to steps S421 and S423, if in step S421, the filling rate is not high, or if in step S423, the recombination rate is high, then it is likely that the non-text framed unit is either a halftone image or a line drawing. Whether the unit is classified as a halftone image or as a line drawing is determined based on the average horizontal run length of black pixels in the unit, the average horizontal run length of white pixels in the unit, the ratio between white and black pixels, and the density. In general, very dark images are considered to be halftone images while light images are considered to be line drawings.

Specifically, if the average run length of white pixels is approximately equal to zero (i.e., a predominantly dark or speckled image), then if the density as calculated in step S418 indicates that the unit is more black than white (i.e., the density is greater than a first threshold equal to about ½) then the framed unit is determined to be a halftone. If the density is not greater than the first threshold, then the unit is determined to be a line drawing.

If the average run length of white pixels is not approximately equal to zero and if the average run length of white pixels is greater than the average run length of black pixels then the framed unit is determined to be a line drawing. But if the average run length of white pixels is not greater than the average run length of black pixels (i.e., that is, again, a predominantly dark image) then further testing is needed.

Specifically, if the number of black pixels is much less than the number of white pixels (i.e., the number of black pixels divided by the number of white pixels is greater than a second threshold equal to about 2) then the framed unit is determined to be a halftone unit. On the other hand, if the number of black pixels divided by the number of white pixels is not greater than the second threshold but if the density determined in step S418 is greater than the first threshold then the framed unit is determined to be a halftone image. Otherwise, the framed unit is determined to be a line drawing.

Accordingly, if in step S428 the framed unit is determined to be a line drawing, then flow advances to step S429 in which a "line drawing" attribute is appended and thence to step S430 in which all descendants are removed. Specifically, once a unit has been determined to be a line drawing, then no blocks are selected from the line drawing unit for possible character recognition. Thereafter, flow returns to step S407 in which the next unit is selected.

On the other hand, if in step S428 the framed unit is not determined to be a line drawing, then flow advances to step S431 in which a "halftone" attribute is appended and thence to step S432 in which text-sized descendants of the framed-halftone unit are removed. Text size is determined in accordance with the average unit height as set forth above in step S404. All descendants larger then text size descendants are allowed to remain as descendants from the framed-halftone unit. Flow then returns to step S407 in which the next unit is selected.

Reverting to step S419, if the number of white, contours is not greater than 4, then the framed unit is not considered to be a table. Accordingly, flow advances to step S433 in which the density calculated in step S418 is compared to a threshold equal to about 0.5. The threshold is selected based on the expectation that text units or line drawings inside a frame should occupy less than half the pixels. If the density is less than the threshold, then flow advances to step S434 in which the internal structure of the framed unit is mapped as set forth hereinabove, that is, flow reverts back to step S401 for the interior structure of the framed unit.

If in step S433, the density is not less than the predetermined threshold then flow advances to step S442 for a determination as to whether the framed unit can be classified as a line drawing or as a halftone image, or whether the frame cannot be classified (i.e., the frame is "unknown").

Reverting to step S415, if frame filtering in step S414 does not detect a frame within the non-text unit, then flow advances to step S435 to determine whether the non-text unit includes a line. Lines are useful non-text units for delineating text boundaries. But because text that is bounded by such lines often appears in close proximity to the lines, it is possible for the text to become attached to the line. Accordingly, line detection is designed to detect lines both with and without text attachments.

Figure 6B:
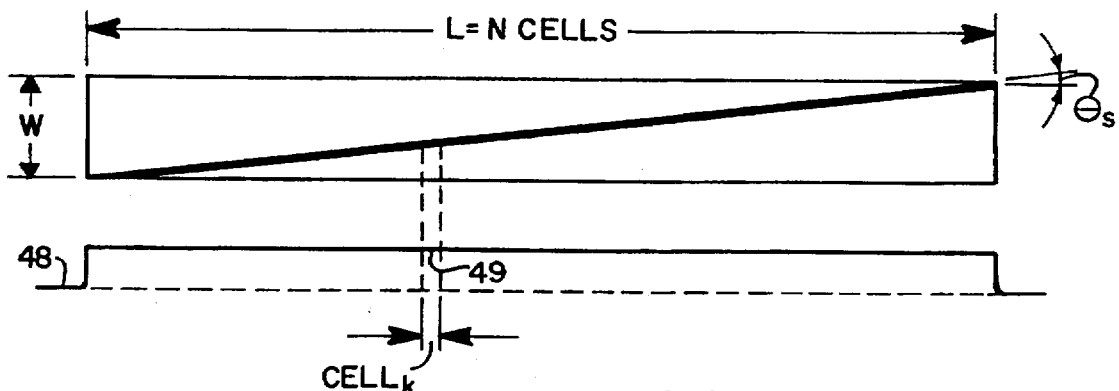

To detect a line without attachments, a histogram of the non-text unit is calculated in the lengthwise direction of the unit. As shown in FIG. 6(b), the histogram 48 of a line should show a fairly uniform distribution whose height is approximately equal to the width of the line. The width of the line is approximately equal to the width ("W") of the non-text unit; any difference is due to a slant angle $\theta_S$ which results if the original document is skewed when the pixel image is formed. Accordingly, to determine whether the non-text unit contains a line, the height 49 of each $cell_k$ in the histogram is compared with the width W of the non-text unit. The root mean square difference between these values is compared with a threshold as follows:

$$\sum_{k=1}^{N} \frac{(cell_k - W)^2}{N} < \text{threshold}$$

The threshold is calculated to permit a skew or a slant $\theta_S$ of the line within the non-text unit. For a 1° skew or slant, a threshold of $$\sum_{k=1}^{N} \left[ \frac{k\sin(1°)}{N} \right]^2$$

has been found to yield satisfactory results.

Figure 6C:
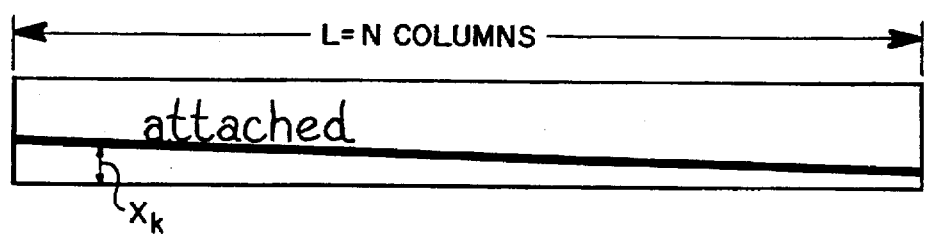

If a line without attachments is not found in accordance with the above inequality, then a determination is made as to whether the unit includes a line with attachments. To determine whether a line with attachments is included in the non-text unit, the text unit is inspected to determine whether a line extends lengthwisely along the border of the unit. Specifically, if a line extends lengthwisely through the unit then the border of the rectangle circumscribing the unit will lie very close to the line, as shown in FIG. 6(c). Accordingly, the uniformity with which the first black pixels lie within the border of the rectangle is inspected by calculating the sum of the squares of the distance in from the border. Thus, referring to FIG. 6(c), the following inequality is tested:

$$\sum_{k=1}^{N} \frac{X_i^2}{N} < \text{threshold}$$

If the sum of the squares is less than the predetermined threshold then a line unit with attachments is found. The same threshold as that given above for lines without attachments has been found to yield satisfactory results.

If in step S435 a line is detected, then flow advances through step S436 to step S437 where a "line" attribute is appended to the non-text unit. Flow then returns to step S407 in which the next unit is selected.

On the other hand, if a line is not detected in step S435, then flow advances through step S436 to step S437 in which the size of the non-text unit is inspected. If the size is not greater than a predetermined threshold, then the classification of the non-text unit cannot be determined. The threshold is set in dependence on the maximum font size; half the maximum font size yields satisfactory results. Accordingly, flow advances to step S438 in which a "unknown" attribute is appended to the non-text unit whereupon flow returns to step S407 where the next unit is selected.

If in step S437 the size is greater than a predetermined threshold, then flow advances to steps S439, S440 and S441 in which the internal white contours of the non-text unit are traced, the density of the non-text unit is calculated, and the number of white contours is inspected, as set forth above with respect to steps S417, S418 and S419, respectively.

If in step S441, the number of white contours is not greater than or equal to 4, then flow advances to step S442 where the size of the unit is calculated to determine whether it is large enough to constitute either a line drawing or a halftone image. This size determination is based on the height and width of he non-text unit as well as the maximum run length of black pixels. Specifically if the non-text unit's height and width are not greater than the maximum font size, then the non-text unit is not large enough to be either a halftone image or a line drawing, and flow advances to step S443 where an "unknown" attribute is appended. Likewise, if although the non-text unit's width is greater than the maximum font size but the maximum run length of black pixels is also not greater than maximum font size, then flow advances to step S443 in which the "unknown" attribute is appended. Flow thereupon returns to step S407 where a new unit is selected.

If in step S442 the non-text unit is large enough to be either a line drawing or a halftone image, then flow advances to step S444 which determines whether the non-text unit is a line drawing or a halftone image. Steps S444 through step S448 are similar in all respects to step S428 through step 432, respectively, and a description thereof is therefore omitted.

Figure 14:
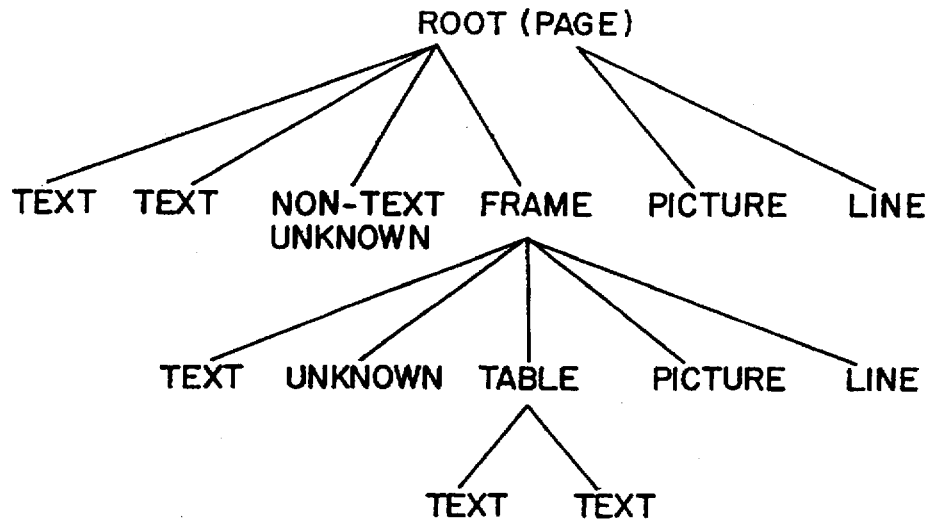
FIGS. 14 through 16 are representative hierarchical tree structures corresponding to FIGS. 11 through 13, respectively.

After all connected components in the pixel image have been detected and classified as described above with respect to FIG. 4 (step S301 in FIG. 3), a tree structure such as that shown in FIG. 14 is obtained. As shown there, the root of the tree corresponds to the page of pixel image data. Descending from the root are text blocks, non-text blocks whose contents are unknown, frames, pictures and lines. Descending from the frames are text blocks, unknown-non-text data, tables which in turn contain text blocks of pictures and lines.

Figure 10:
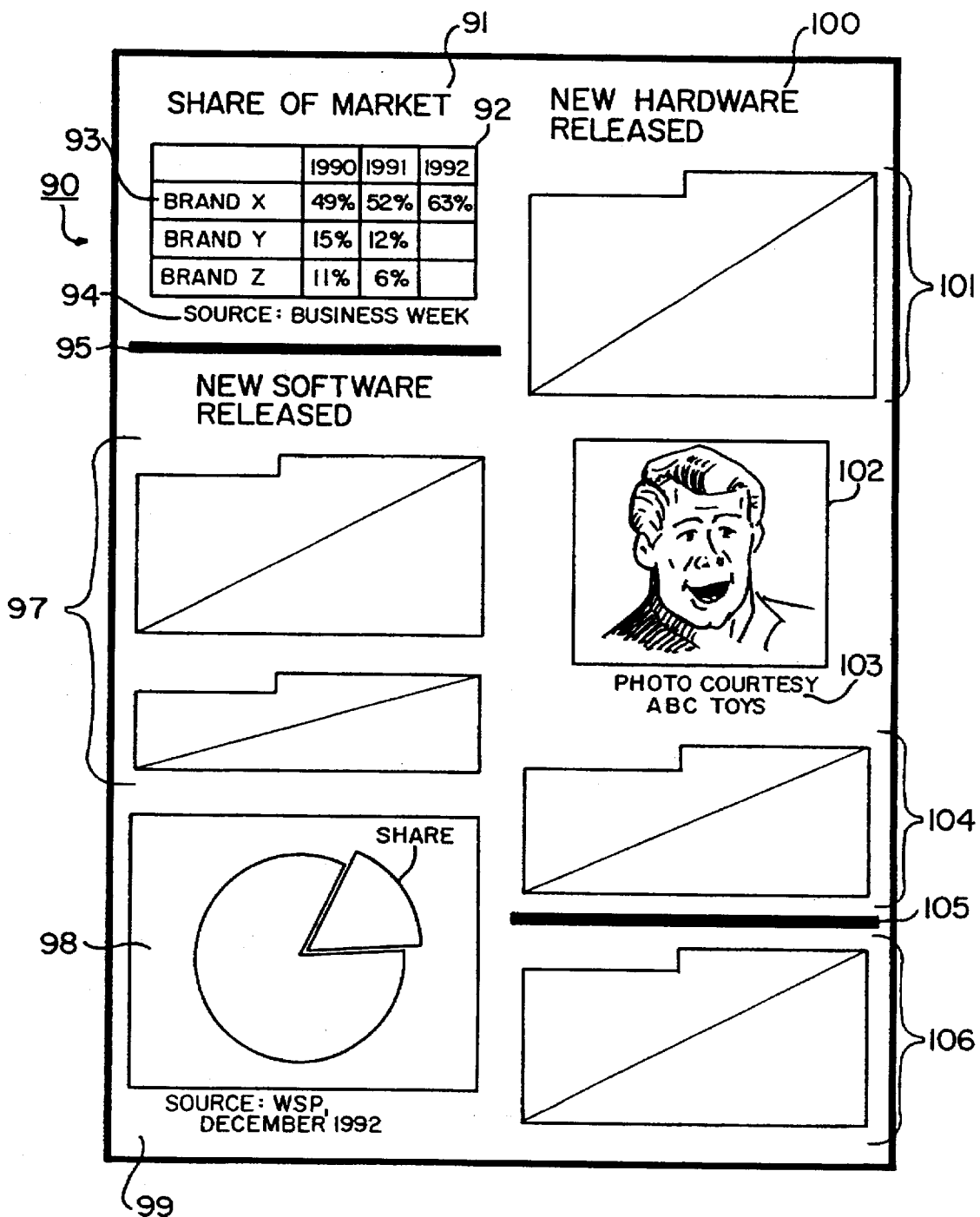
FIG. 10 is a view showing pixel data for a representative image.
Figure 11:
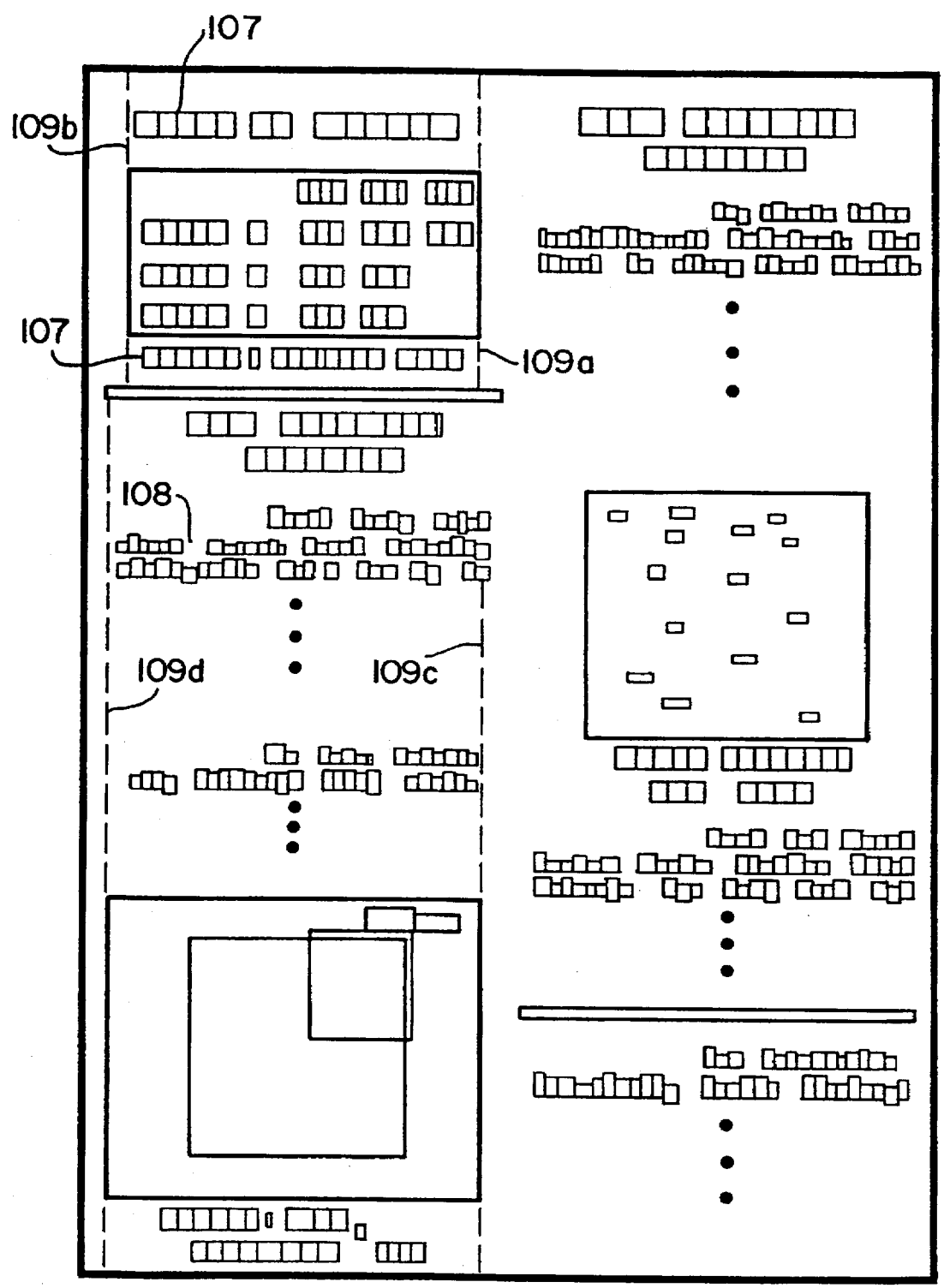
FIGS. 11 through 13 are views for explaining block classification and selection.

FIG. 10 shows a representative page 90 of pixel image data which includes large font size text 91, a table 92 which includes text data, for example, at 93, text data 94, a horizontal line 95, another title 96, text data in the form of two paragraphs at 97, a framed line drawing 98 having a caption 99a second column which begins with a title 100, continues with text data 101, a framed halftone image 102 having a caption 103, text data 104, a horizontal line 105 and a final paragraph of text data 106. FIG. 11 shows that same pixel image after processing in accordance with step S301. As shown there, connected components in pixel image data 90 have been encircled in rectangular blocks, and the interior of rectangular blocks have been investigated only if warranted in accordance with frame processing shown in steps S415 through step S434.

Figure 8:
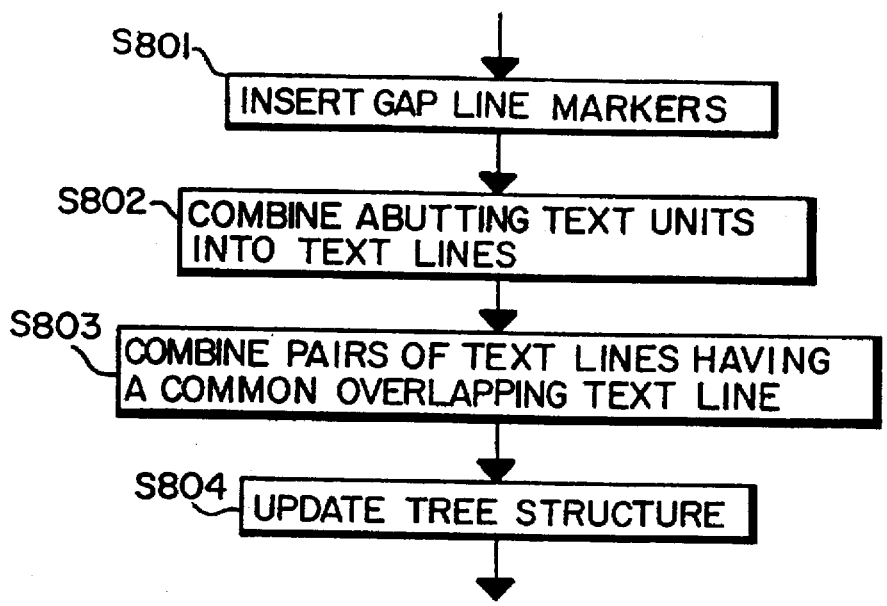
FIG. 8 is a flow chart showing how text units are selectably connected widthwisely based on size and proximity to other text units to form text lines.

In step S302, all text units from step S301, wherever located in the tree, are grouped horizontally. The grouping operation is based on the compactness of each text unit and on its neighbors. Vertically extending gaps, which may correspond to columns are detected and maintained. Detailed processing for step S302 is described as follows in connection with FIG. 8 in which the process steps illustrated in FIG. 8 are executed by CPU 10 in accordance with program steps stored in ROM 17.

In step S801 gap line markers are extended vertically from the left- and right-hand boundaries of non-text unit is intersected. Thus, as shown in FIG. 11, gap line markers 109a and 109b are extended vertically until they intersect a text or non-text unit, here unit 95. Likewise, gap line markers 109c and 109d are extended vertically until they intersect a text or non-text unit, in this case unit 95. Gap line markers are likewise extended vertically from the left and right borders of the remaining non-text units. Gap line markers are useful in determining the location of gaps, which may correspond to columns, in the pixel image data.

In step S802, text units such as text units 107 in FIG. 11 are a combined into a text line if such a combination would not cross a gap line marker and if they abut with another text unit or they are within a predetermined threshold from another text unit. A suitable threshold is the average text length determined in step S404 times an experimentally determined scalar ("1.2" has been found to yield satisfactory results). Before combining, however, the vertical extent of gaps between text units is inspected to determine whether there is a vertically extending gap that might be indicative of column structure. Specifically, as shown in FIG. 11, gap 108 exists between a pair of text units. The gap extends vertically for several lines of text image data and step S802 therefore maintains the gap even if the text units are located within the predetermined threshold of each other.

In step S803, pairs of text units that were not combined in step S802 are combined if they are both overlapped by a third text unit from an adjacent line, unless such a combination would cross a gap line marker. This step is effective to eliminate gaps that are not indicative of column structure but rather are merely due to a random arrangement of spaces in text lines. For example, in FIG. 11, while gap 108 is maintained in step S802, it is eliminated in step S803 because the text units in the upper line are both overlapped by a third text unit in the next adjacent lower line and because a gap line marker is not crossed.

In step S804, the tree structure is updated appropriately.

Figure 12:
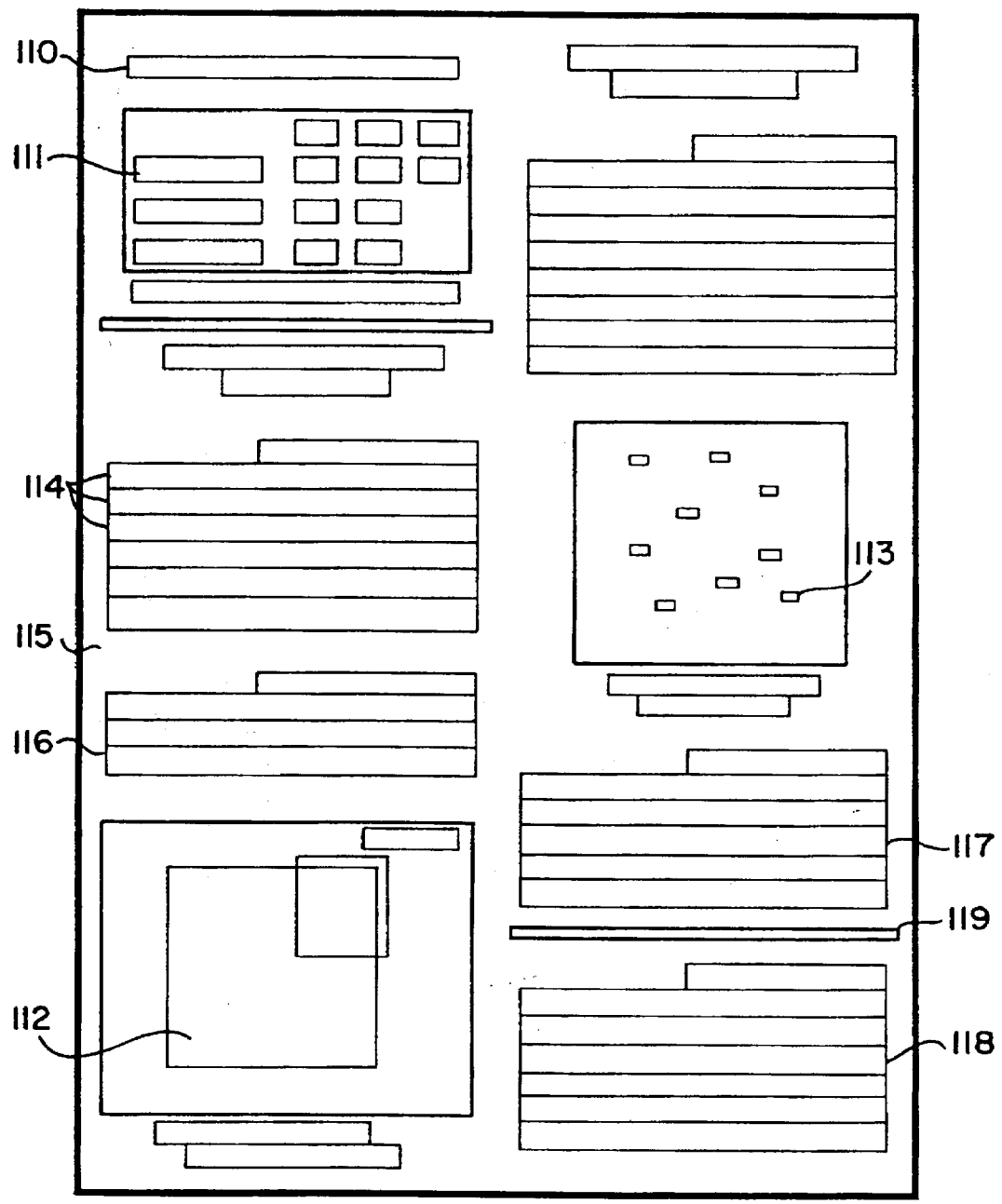
Figure 15:
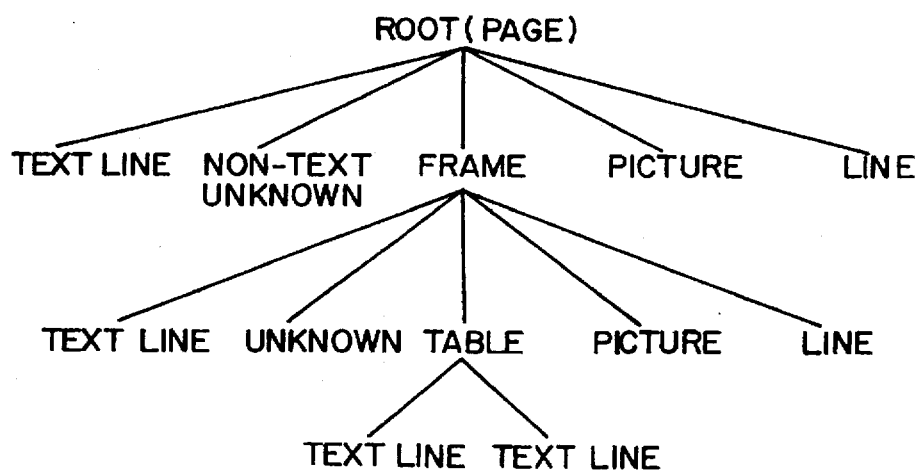

FIG. 12 is an illustration of the results of grouping processing shown in step S302 and FIG. 15 is an illustration to show how the tree structure has been altered by the grouping process of step S302. As shown in FIG. 12, abutting text units have been grouped together into text lines such as lines 110. In particular, text units have been combined into text lines wherever the text units are located in the tree structure, for example, as shown at 111 in which text units have been combined even though they fall under a frame-table branch of the tree structure. Note, however, that a regrouping does not occur across white contour boundaries as determined above in steps S417 and S439 so as to avoid grouping individual entries in a table into one contiguous text line. The gap between the left and right columns has been maintained. Non-text units have not been regrouped; thus, as shown at 112 and 113 non-text units have not been grouped even though they abut within a predetermined threshold of each other.

In FIG. 15, the tree structure has been altered to reflect the new groupings.

Figure 9:
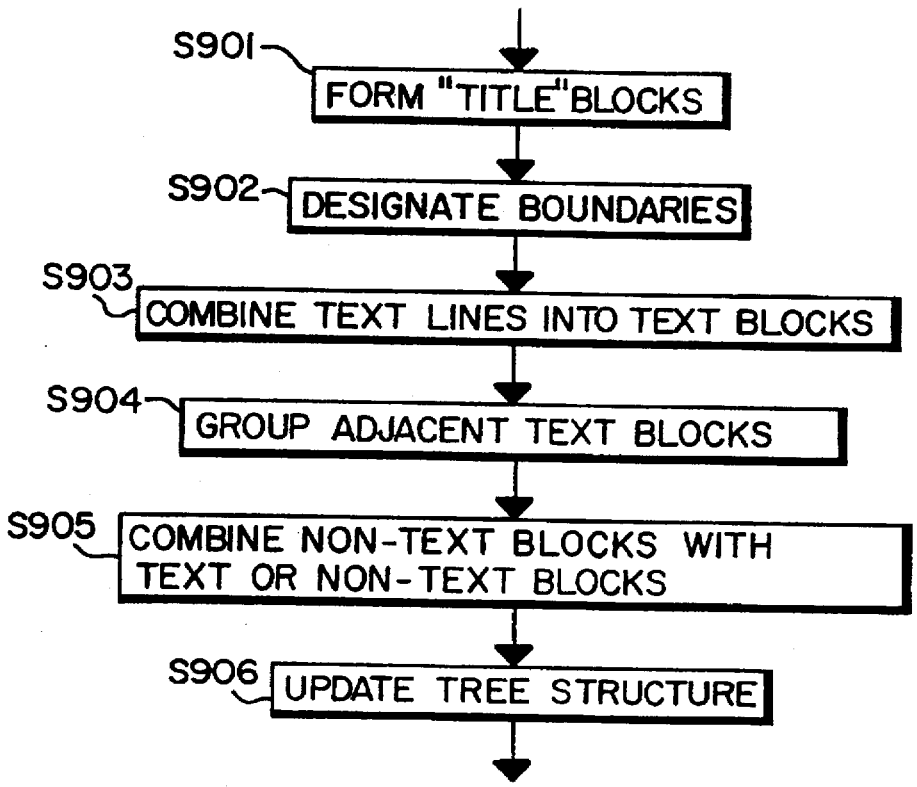
FIG. 9 is a flow chart showing how text lines are selectably connected vertically based on size and proximity to other text lines to form text blocks.

After text units have been grouped in text lines as described above with respect to FIG. 8 (step S302 in FIG. 3), text lines are grouped vertically into text blocks as shown in step S303 and described more fully in connection with FIG. 9. The grouping depends on the compactness of the text line units and the location of non-text line units. For example, intervening non-text lines serve as boundaries and prevent groupings of text lines on opposite sides of the line into a single text block. All text lines which fall between two consecutive non-text line units are processed at one time. In addition, step S303 considers whether some text units should be combined with non-text units (e.g., text captions associated with non-text images) or whether some non-text units should be combined with other non-text units (e.g., halftone images and related line drawings).

FIG. 9 is a detailed flow chart showing grouping of text lines to text blocks. In step S901, title blocks are formed from those non-text units which were classified in step S404 as non-text because although they were smaller than the maximum expected font size, they were larger than the average text size. For all such non-text units which are located adjacent similarly-sized non-text units, title blocks are formed by grouping such units together. A "title" attribute is appended to such groups. All remaining non-text blocks that cannot be so grouped are marked with a "picture-text" attribute. The tree structure is updated appropriately. Titles are helpful in page reconstruction (step S212).

In step S902, non-text units which fall between text lines are located and designated. These non-text units serve as boundaries between text blocks and prevent grouping text lines into a single text block.

In step S903, text lines are grouped vertically together into text blocks in a two-step process. In the first step, gaps between columns are detected, for example, by calculating a vertical histogram of pixel density. In the second step, text lines in each column are grouped if the vertical distance between each vertically consecutive text line is less than the text height calculated in step S404. Step S903 is effective to group into a single text block text lines which are from the same text paragraph such as lines 114 in FIG. 12.

In step S904, vertically and horizontally adjacent text blocks are grouped together as long as such blocks are not separated by a non-text unit and if such a grouping would not violate any gaps found in the histogram of step S903. Grouping of text blocks is based on the separation between such blocks being less than the predetermined threshold calculated in accordance with the vertical height found in step S404. Step S904 is effective to group together text blocks formed from the lines in paragraph 115 and the lines in paragraph 116 from FIG. 11, but it is not effective to group together text blocks formed from the lines is paragraphs 117 and 118 because such text blocks are separated by a non-text unit 119 (a line).

Step S905 determines whether some text blocks should be combined with non-text blocks or whether some non-text blocks should be combined with other non-text blocks. A text block can be combined with a non-text-title block, a non-text-halftone block, or a non-text-line-with-attachment block as follows:

(1) a text block is combined with a non-text-title block if the text block is horizontally close to the non-text-title block and overlaps it vertically; and (2) a text block is put inside a non-text-halftone image block if the text block is smaller (both horizontally and vertically) than a word-sized block and if the text block does not have an adjacent word-sized text block; and (3) for a text block which overlaps a non-text-line-with-attachment, the line-with-attachment, is converted to a text block since it is probably underlined text.

Some non-text blocks can be combined with other non-text blocks according to the following table:

|  | Halftone | Line Drawing | Text-Picture | Title |
|---|---|---|---|---|
| Halftone | Test #1 | No Combining | Always Combine | No Combining |
| Test-Picture | Test #1 | Test #2 | Test #2 | Test #3 |
| Line Drawing | Test #1 | Test #1 | No Combining | No Combining |
| Title | No Combining | No Combining | No Combining | Test #3 |

The tests listed in this table are as follows:

Test #1: Combine if one block falls completely inside the other;

Test #2: Combine if the width of the picture-text is smaller than the width of a word-sized block;

Test #3: Combine if the blocks are closely adjacent.

In step S906, attributes are appended as appropriate and the tree structure is updated based on the foregoing processing.

Figure 13:
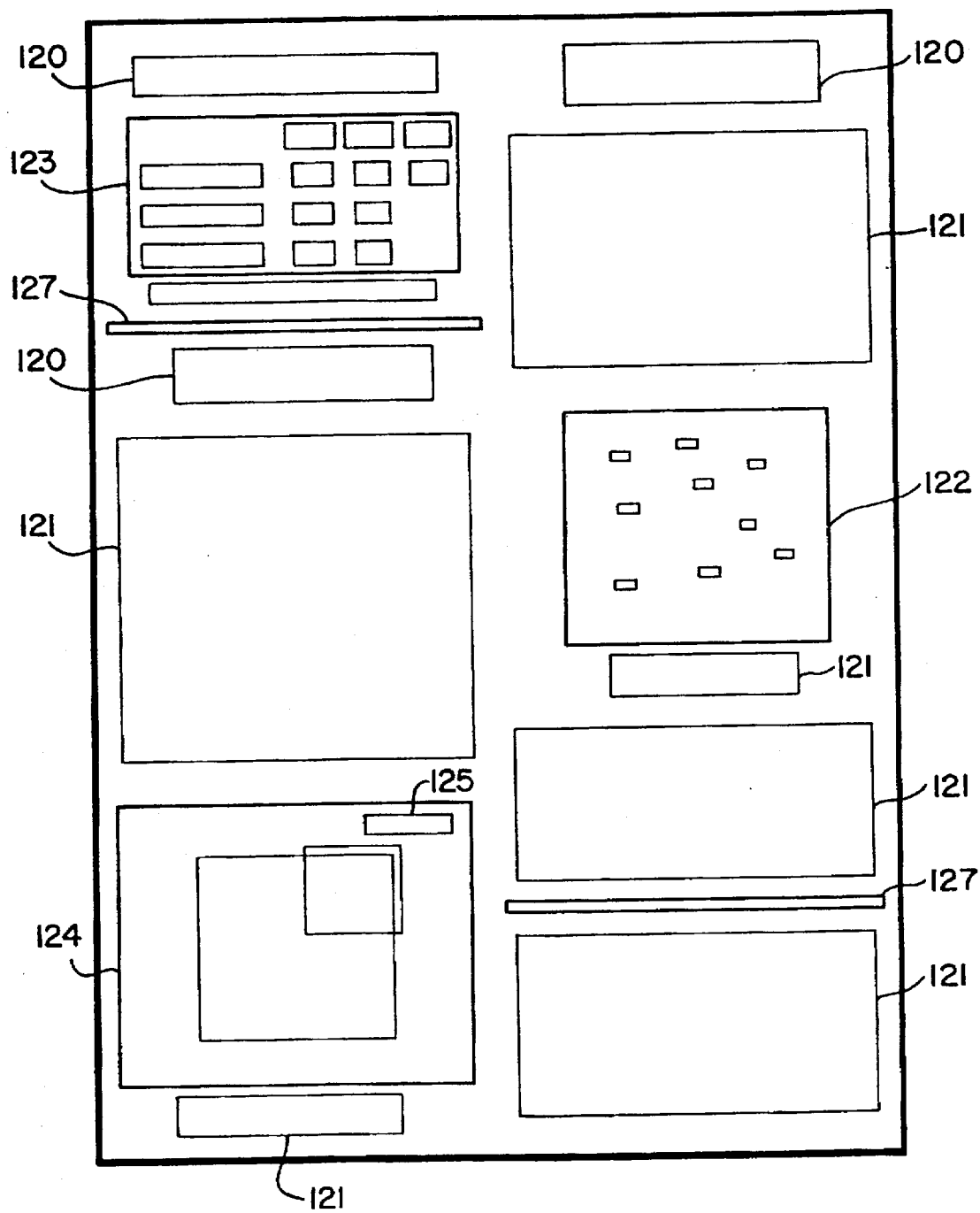
Figure 16:
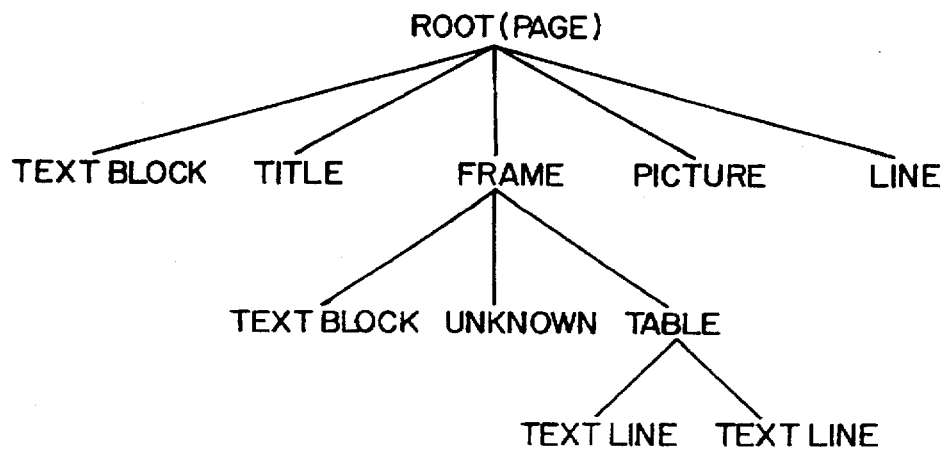

FIG. 13 shows the block structure resulting from FIG. 9 processing, and FIG. 16 is an example of the tree structure therein. In FIG. 13, the blocks include title block 120, text blocks 121 and picture data 122. Framed data is also included in which 123 designates a frame unit including tabularly organized data and 124 indicates a framed unit which includes text units 125. Non-text line images 127 separate various units shown in FIG. 13.

After block selection processing as shown above with respect to FIGS. 3 through 16 has been completed, character recognition processing reverts to step S204 in FIG. 2 as described hereinabove. Specifically, a first block in the hierarchical tree is selected for recognition processing. If the block is not a text block then flow advances through step S204 to step S205 where the next block in the tree is selected. Steps S204 and S205 are repeated until a text block is encountered at which point flow advances to step S206 for line segmentation.

Figure 17:
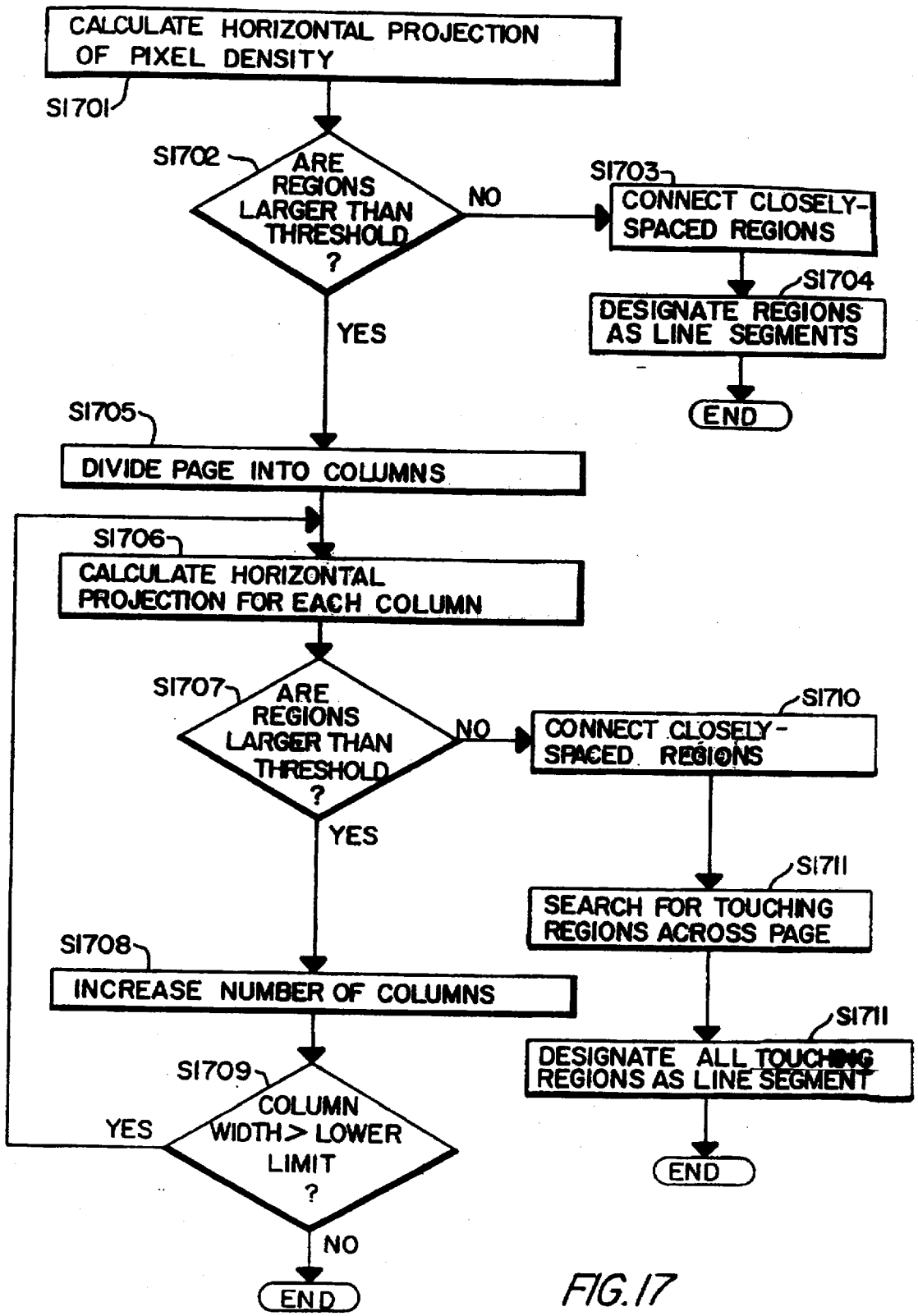
FIG. 17 is a flow chart showing line segmentation according to the invention.

FIG. 17 is a detailed flow diagram showing the process steps performed in line segmentation step S206 of FIG. 2. The process steps shown in FIG. 17 are executed by CPU 10 in accordance with the computer program stored in program ROM 17.

Before step S1701, image reduction processing may be performed. However, since line segmentation and character segmentation are sensitive to horizontal spacing, care must be exercised so as not to affect segmentation accuracy. Specifically, it is preferable to use different image reduction techniques in horizontal and vertical directions. In the vertical direction, pixels are combined based on "OR" logic whereby a black pixel results if any of the subject vertical pixels are black. Thus, for 2:1 image reduction in the vertical direction, a black pixel results if either of the two vertical pixels is black. In the horizontal direction, pixels are combined based on "AND" logic whereby a black pixel results only if all the subject pixels are black. Thus, for 3:1 image reduction in the horizontal direction, a black pixel results only if all three pixels are black.

The process is illustrated as follows where 3:1 vertical reduction and 2:1 horizontal reduction are employed ("O" represents a white pixel and "X" represents a black pixel):

| original | vertical ("OR") | horizontal ("AND") |
| --- | --- | --- |
| X O X O |  |  |
| X X X O |  |  |
| O O O O | X X X O | X O |
| O X O O | O X X X | O X |
| O X X X |  |  |
| O O X O |  |  |

If image reduction is performed, then line segmentation and character cutting are performed on the reduced image. However, so as not to affect recognition processing in the remainder of FIG. 2 (i.e., steps S208 through S213), at the end of line segmentation and character cutting, the cuts between characters are applied against the unreduced pixel image data.

In step S1701 a horizontal projection of pixel density is calculated for the block of text data supplied by step S204. The horizontal projection of pixel density is obtained by counting the number of black pixels across each row of the pixel image. Preferably, the horizontal projection of pixel density is obtained across the entire text block but this is not essential. In particular, it is possible to divide the text block into plural columns of pixels, for example, two or three columns, and to calculate a horizontal projection of pixel density for each column individually. Of course, if this is done, then all of the time saving benefits of the present invention will not be realized.

Step S1702 inspects the regions defined by non-zero values of the horizontal projection to determine if any of them are larger than a predetermined threshold which equals the maximum font size. If they are not too large, meaning that the horizontal projection uniformly segments between lines on the page, then flow advances to step S1703.

Figure 18A:
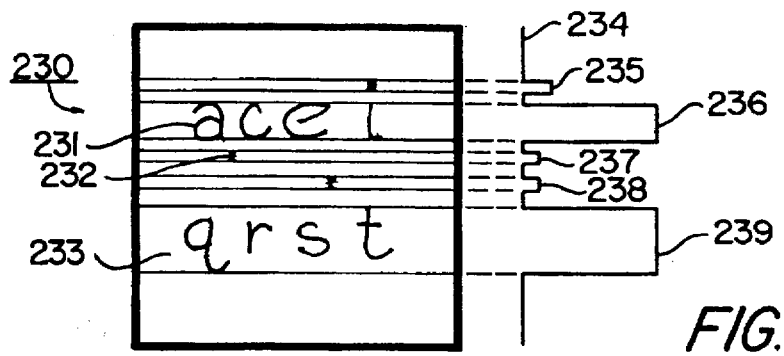
FIGS. 18(a) through 18(d) and FIGS. 19(a) through 19(d) are views for explaining line segmentation according to the invention.

In step S1703, closely spaced regions of the horizontal projection of pixel density are connected. This is explained with respect to FIG. 18 in which FIG. 18(a) shows a representative text block 230 containing lines of character images 231 and 233 and noise spots (that is, blackened pixels which do not represent any character information) 232. A corresponding horizontal projection of pixel density is shown at 234. As seen there, region 235 corresponds to the dot over the letter "i", region 236 corresponds to the remaining characters on line 231, regions 237 and 238 correspond to noise spots 232, and region 239 corresponds to characters on line 233. Each of these peaks defines regions whose boundaries correspond to zero values of the horizontal projection. In step S1703, it is desired to connect closely spaced regions corresponding to peaks 235 and 236 because such regions correspond to the same line of text while not connecting regions corresponding to peaks 237 and 238 because these regions are not associated with any lines of text.

Figure 18B:

To connect closely spaced regions as set forth in step S1703, the horizontal projection of pixel density is inspected from the top of the projection downwardly toward the bottom of the projection (corresponding to inspection from the top of the text block 230 to the bottom). When the first region is encountered, the horizontal projection is scanned downwardly for the next region, and the height of the two regions are compared. If the height of the tallest element in the upper region is smaller than the height of the lower region, and if the two regions are separated by a distance which is less than the height of the tallest element in the upper region, then the two regions are connected. It should be noted that this test for connecting closely spaced regions is scale-invariant, that is, closely spaced regions of text will be connected without any need to know in advance the size of the text, i.e., whether the text is 12-point, 8-point, etc. Thus, reverting to FIG. 18(a), the height of region 235 is compared with the height of region 236 and it is determined that the height of the upper region 235 is smaller than the height of the lower region. In addition, it is determined that the gap between the two regions is smaller than the height of the region 235. Accordingly, as shown in FIG. 18(b), regions 235 and 236 are connected into a single region 236'.

Figure 18C:

Inspection of the horizontal projection of pixel density continues downwardly until region 237 is encountered. In this case, it is determined that the height of region 236' is larger than the height of region 237 and the two are not combined. On the other hand, as inspection of the horizontal projection of pixel density is continued, the height of region 237 is determined to be no larger than the height of region 238 and in addition, the gap between the regions is not larger than the height of region 237. Thus, as shown in FIG. 18(c), regions 237 and 238 are combined into a single region 238'.

Inspection of the horizontal projection of pixel density continues until region 239 is encountered. In this case, the height of region 238' is determined to be less than the height of region 239, but the gap between the regions is greater than either of the heights of regions 237 and 238 which together comprise region 238'. Accordingly, the regions are not connected.

Figure 18D:
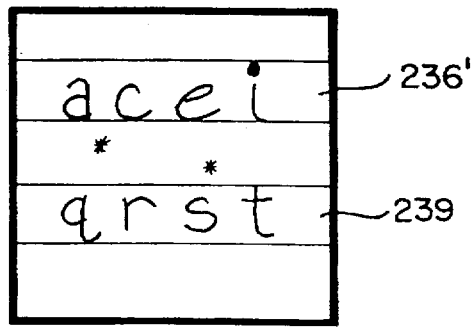

If desired, after closely spaced regions have been connected, the height of each of the regions can be inspected to determine whether each region is larger than a threshold which corresponds to the minimum height of a line. The threshold may, for example, be determined adaptively by averaging the heights of each of the regions detected thus far. If a region is not higher than the threshold, then the region may be ignored entirely as presumably caused by a noise spot in the pixel data. Thus, as shown in FIG. 18(d), region 238' has been ignored since it is smaller than a threshold defined by averaging the heights of regions 236', 238' and 239.

Reverting to FIG. 17, flow then advances to step S1704 where the regions are designated as separate line segments, whereupon flow advances to character cutting as shown in step S207 of FIG. 2.

Figure 19A:
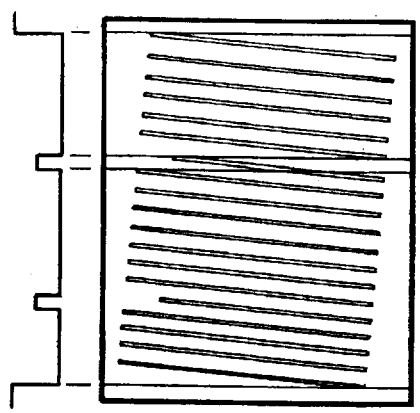
Figure 19B:
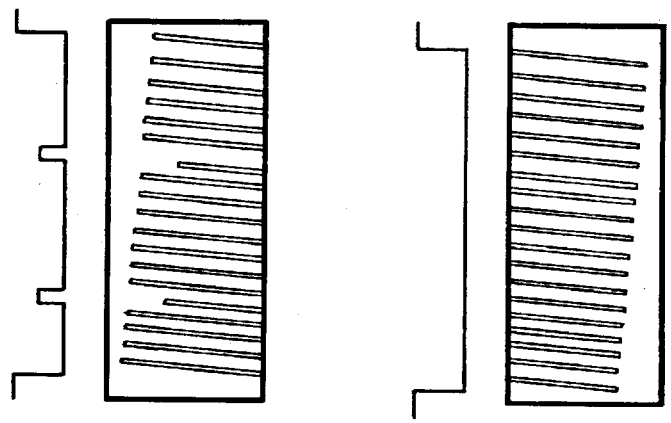

If step S1702 determines that the regions processed by step S1701 are too large, this may mean that the text lines are slanted. For example, as shown in FIG. 19(a), text block 240 includes plural lines 241 of slanted text. After processing in accordance with step S1701, horizontal projection of pixel density would be as shown at 242 because the text lines overlap each other in the horizontal direction as shown representatively at 244. Flow advances to step S1705 in which the text block is divided into columns. As shown in FIG. 19(b), the number of columns in text block 240 is doubled, that is, the text block 240 is divided into two columns. Preferably, the columns overlap by at least one common pixel. It is also possible to divide the text block into more than two blocks, for example, three or four.

Figure 19C:
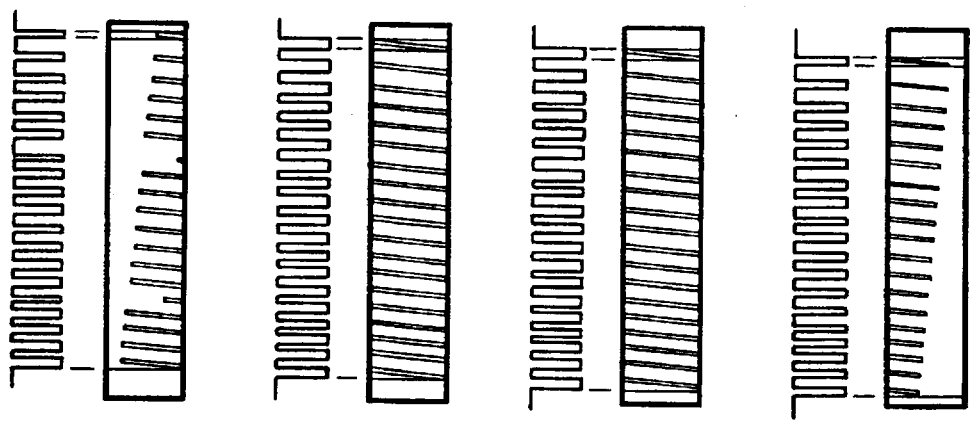

In step S1706, a horizontal projection of pixel density is calculated for each column as shown at 247 and 249 in FIG. 19(b). In step S1707, the regions are again inspected to determine if they are too large. If the regions are too large, then flow advances to step S1708 where the number of columns is again increased. For example, as shown in FIG. 19(c), the number of columns is doubled once again. Then, in step S1709, the width of the columns is inspected to ensure that the width is greater than a lower limit. The lower limit is representative of a point at which further increases in the number of columns is unlikely to provide proper line segmentation. In the preferred embodiment, the lower limit is sixteen pixels wide. If in step S1709, the lower limit has been reached then the process ends with an indication that line segmentation has not been achieved. On the other hand, if the lower limit has not yet been reached, then flow returns to step S1706 where horizontal projections for each of the new columns are again calculated.

Figure 19D:
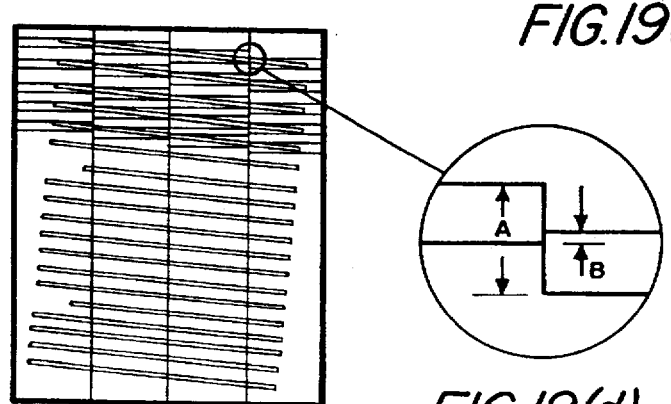

If in step S1707 it is determined that the regions are not too large, then flow advances to step S1710. Thus, for example, as shown in FIG. 19(c), regions no wider than line segments have been identified. Accordingly, flow advances to step S1710 in which closely spaced regions are connected as described above in step S1703. Then, in step S1711, a search is performed to identify regions from each of the columns that correspond to a single line segment. That is, for example, as shown in FIG. 19(d), regions 250, 251, 252 and 253 correspond to a single line segment. To determine whether regions from different columns are touching regions and therefore correspond to a single line segment, each column is inspected from the top downwardly until the first region of each column is encountered. Adjoining areas of each such region are inspected to calculate the two distances shown in FIG. 19(e): (1) distance A which is the span or union across which the two regions lie, and (2) distance B which is the region commonly occupied by the regions or the intersection of the two regions. Then, the ratio A/B is formed and the ratio is compared with a threshold value selected to ensure sufficient overlap (a threshold value of 5 has been found to yield acceptable results). If the ratio is less than the threshold, then the blocks are considered to overlap sufficiently so as to consider the blocks to form or to be part of a single line segment. Accordingly, in step S1712, the touching regions as found by the ratio are designated as a single line segment.

It should be observed that calculating the ratio of A/B (the union over the intercept) and comparing the ratio to a threshold yields a scale-invariant test, that is, overlapping and touching regions are designated as a single line segment regardless of the size of the text in the lines. Such a scale-invariant test is desirable since it does not require foreknowledge of the size of the text in the line segments.

Figure 20:
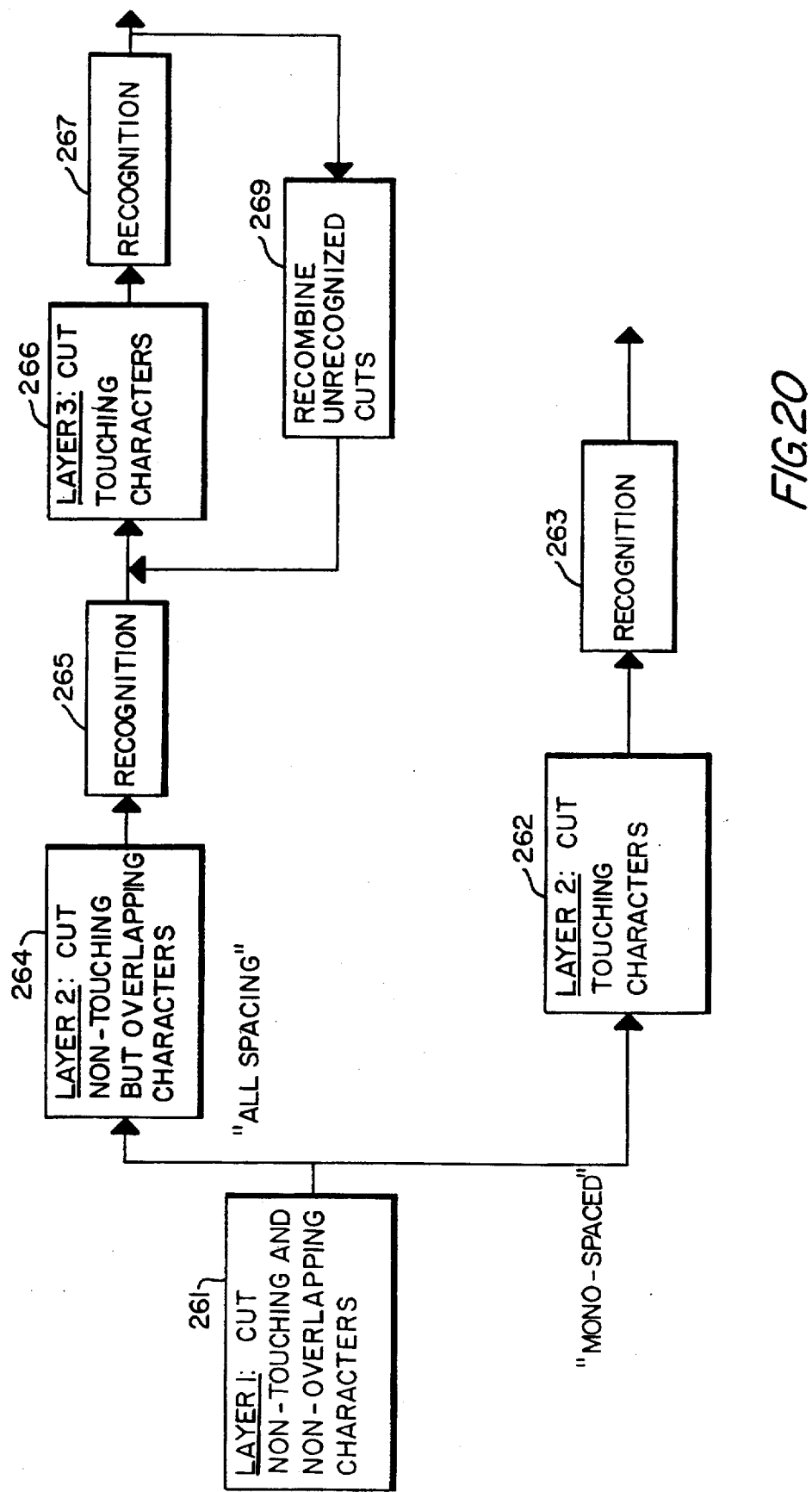
FIG. 20 is a functional block diagram showing character cutting according to the invention.

When line segmentation processing as set forth in FIG. 17 has been completed, flow advances to character segmentation or character cutting as set forth in step S207 in FIG. 2 and as detailed in FIG. 20.

Figure 34A:
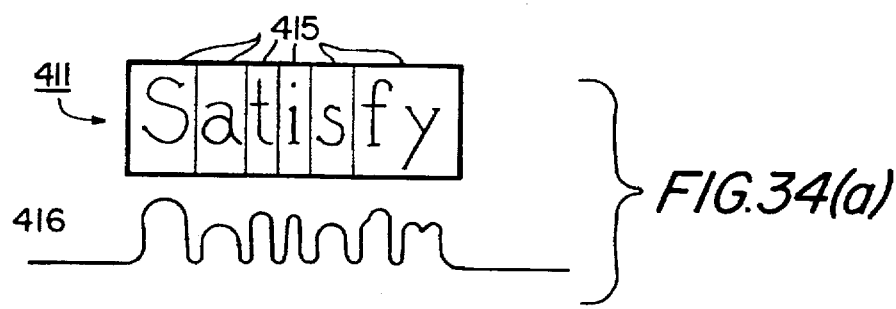
FIGS. 34(a) and 34(b) are views for explaining conventional character cutting techniques.
Figure 34B:
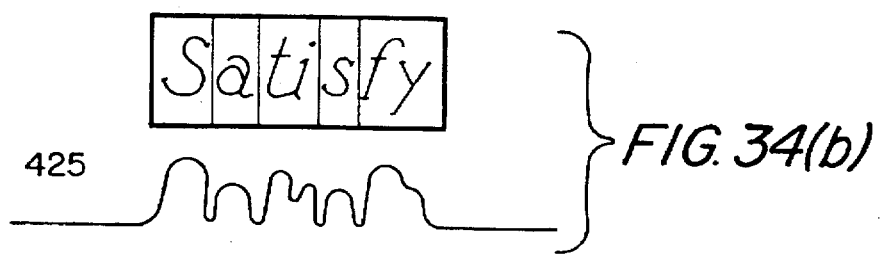

As shown in FIG. 20, character cutting is performed in a multi-layered process in which each layer is intended to perform increasingly complex character cutting operations. Specifically, character cutting operations can be classified into three categories: cutting between characters that do not touch and do not overlap each other, cutting between characters that do not touch but which overlap each other, and cutting between characters that touch. For example, as shown in FIG. 34(b), the characters "S" and "a" do not touch and do not overlap and thus fall into category one. On the other hand, characters "f" and "y", while they do not touch, overlap. Accordingly, these characters fall into category two. Finally, characters "t" and "i" touch each other and thus fall into category three.

As shown in FIG. 20, each layer is specifically designed to deal with one of the three categories. Thus, layer 1 (261) cuts between non-touching and non-overlapping characters. After layer 1, processing proceeds in accordance with whether there is knowledge about the nature and characteristics of the text under consideration. If it is known that the text is mono-spaced text, that is, if it is known that the characters are upright characters with equal spacing therebetween (such as "courier" font), then processing proceeds to layer 2 (262) which cuts between touching characters. (Even mono-spaced characters can touch because of image degradation as, for example, through repeated photocopying or facsimile transmission.) Processing then proceeds to character recognition 263 and thence to step S209 shown in FIG. 2.

On the other hand, if there is no information concerning the nature or characteristics of the text block, or if it is known that the text is not mono-spaced text, then processing proceeds to layer 2 shown at 264 which cuts non-touching but overlapping characters. Because the processing in layer 1 and layer 2 characters, recognition processing then proceeds as shown at 265. For all characters that are not recognizable in 265, layer 3 processing is then performed as shown at 266. Specifically, if characters cannot be recognized, then it is presumed that the reason for non-recognition is that complete character cutting has not been achieved and that the unrecognized character is in fact two or more touching characters. Thus, layer 3 cuts between touching characters. For cuts performed in layer 3, the cut characters are then subjected to character recognition at 267.

If character recognition is successful for those characters, then flow proceeds back to step S209 in FIG. 2. On the other hand, if recognition is again unsuccessful, then it is presumed that inappropriate cuts have been made in layer 3. Accordingly, unrecognized cuts are recombined as shown at 269, and layer 3 cutting and recognition are again performed until no more cuts can be made.

Whether to proceed in accordance with "mono-spaced" processing at 262 or "all-spacing" processing at 264 depends on an operator-input selection. In the absence of operator selection, default processing proceeds in accordance with "all-spacing" processing at 264 since this layer is able to process mono-spaced as well as non-mono-spaced characters.

Figure 21:
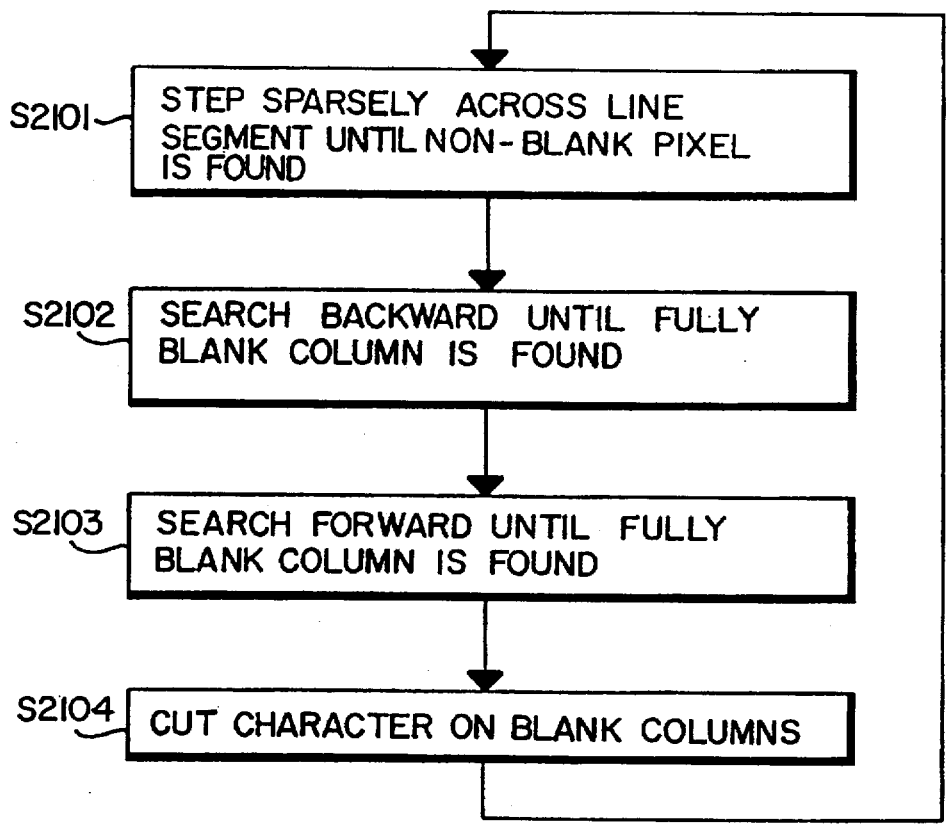
FIG. 21 is a flow chart showing character cutting according to layer 1 in FIG. 20.
Figure 22:
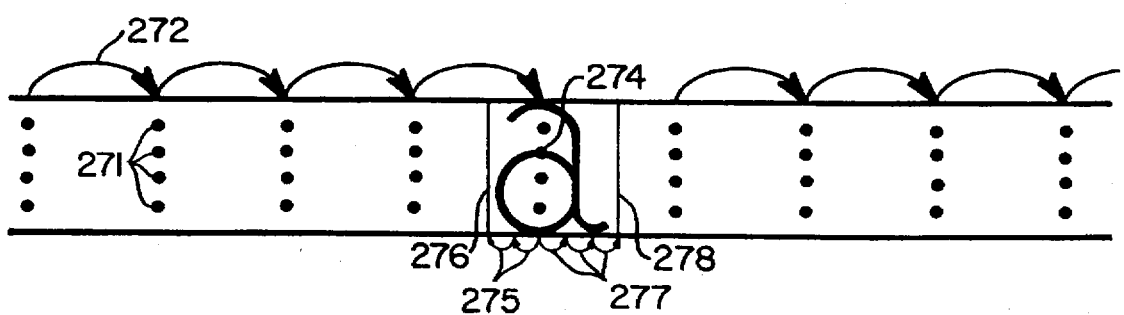
FIG. 22 is a view for explaining layer 1 character cutting.
Figure 30:
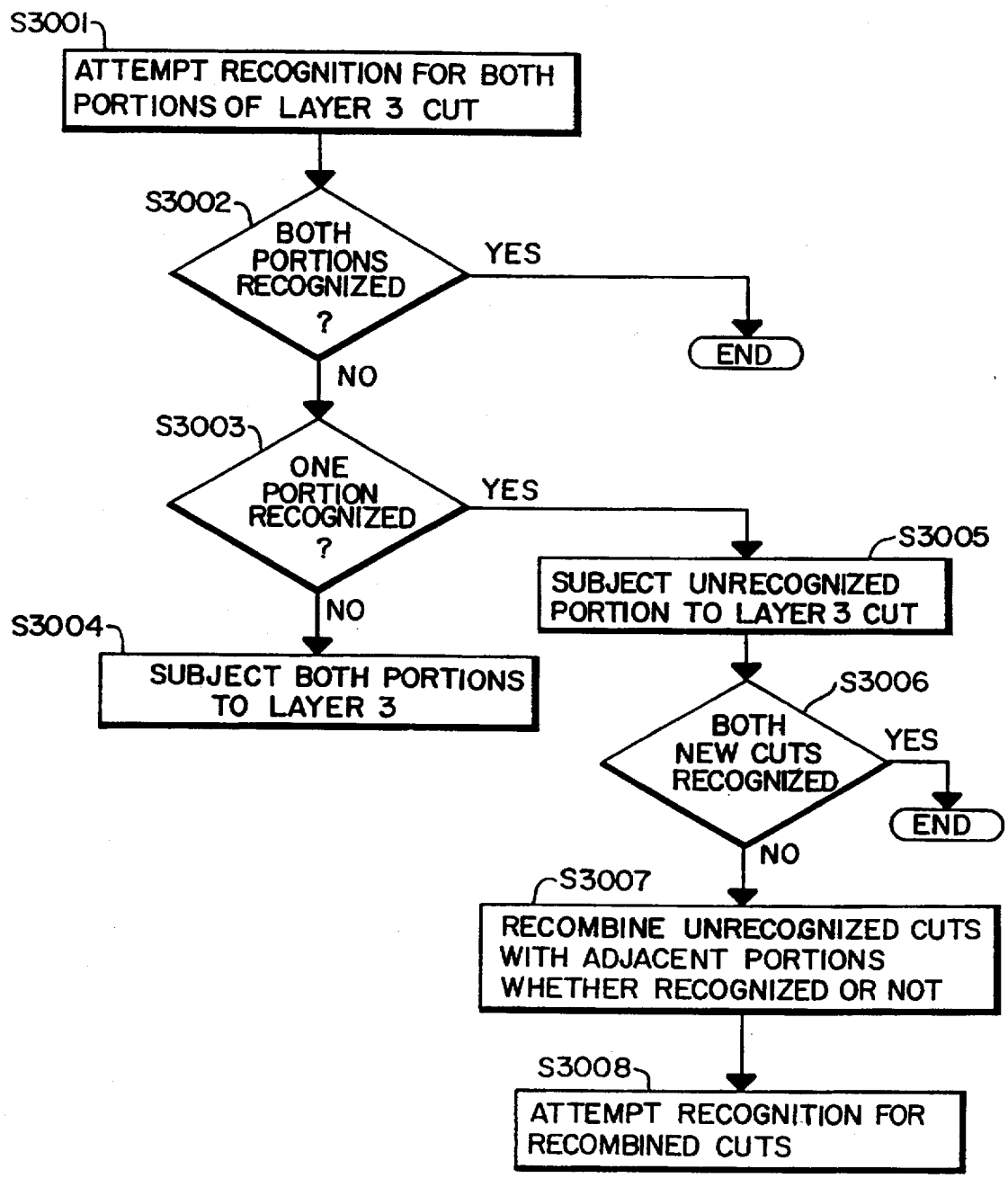
FIG. 30 is a flow chart showing recombination of cuts made in layer 3 processing of FIG. 20, and FIGS. 31(a) through 31(c) are views for explaining recombination.
Figure 32:
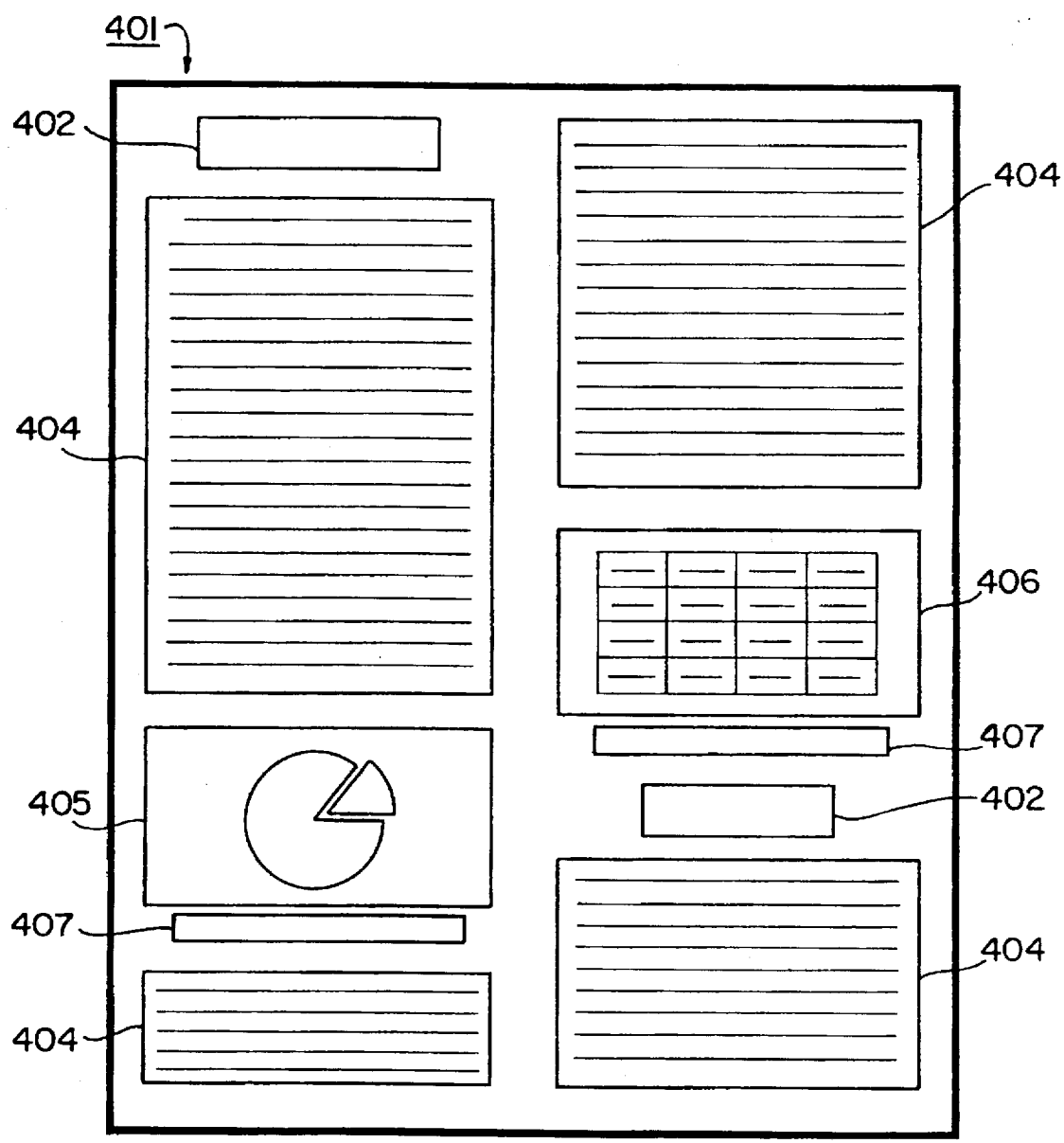
FIG. 32 is a representative page of a document to be character recognized.
Figure 33A:
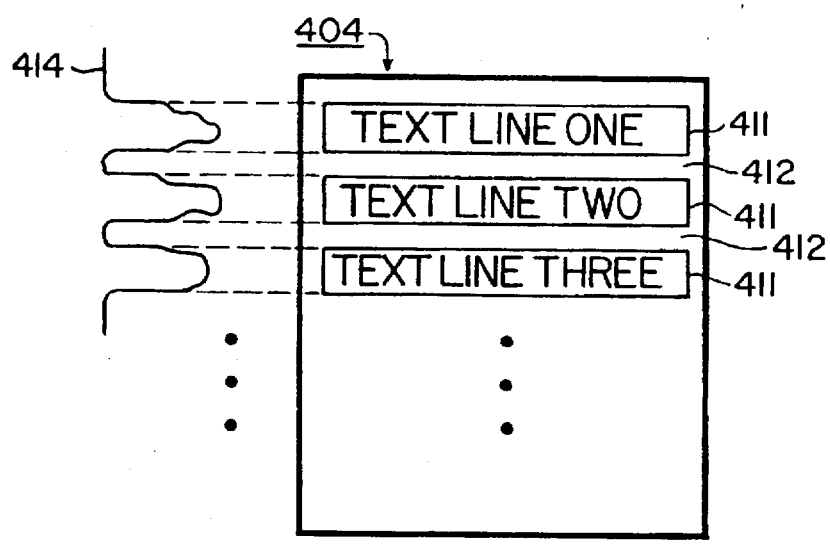
FIGS. 33(a) through 33(c) are views for explaining conventional line segmentation techniques.
Figure 33B:
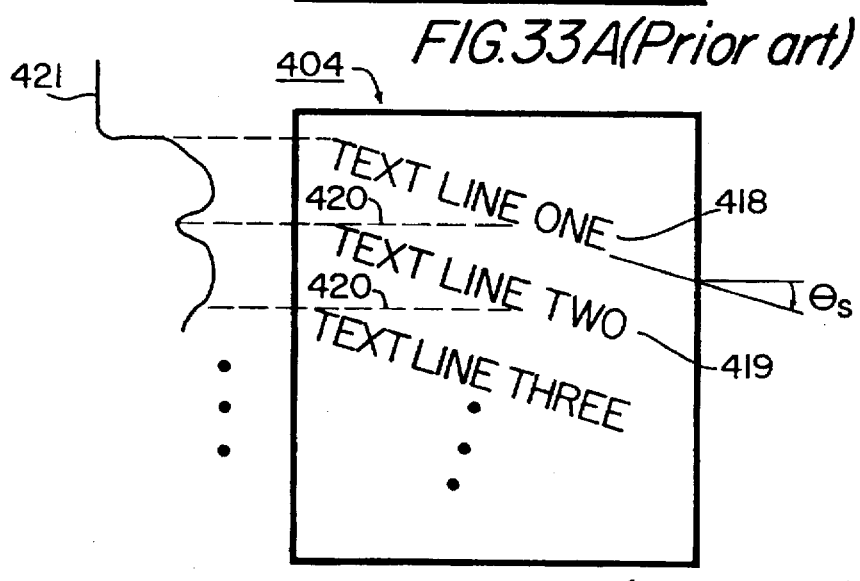
Figure 33C:
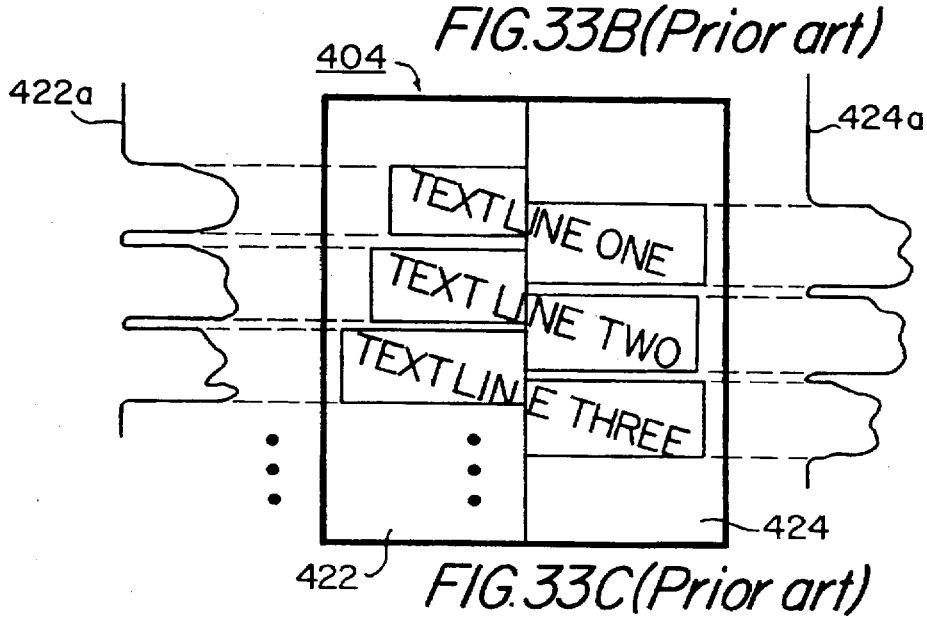

FIGS. 21 through 28 are views for explaining layer 1 through layer 3 processing, and FIGS. 30 and 31 are views for explaining the recombination designated at 269. Specifically, FIG. 21 is a flow chart for explaining layer 1 cuts in which non-touching and non-overlapping characters are cut. In layer 1, cuts between non-touching and non-overlapping characters are made by detecting white pixels or blank spaces between two characters. In particular, as shown at step S2101 in FIG. 21, white space between characters is searched for by stepping sparsely across a line segment until a non-blank or black pixel is found. Stepping sparsely means that all pixels in the line segment are not searched; rather, as shown in FIG. 22, only a few pixels 271 in any one column in the line segment are inspected. It has been found that only 1/3 of the total number of pixels in a column of the line segment need be inspected, that is, only every third pixel needs to be inspected. If a non-blank or black pixel is not found in any of pixels 271, then a few columns of pixels are skipped as shown at 272 and every third, for example, pixel in the new column is again inspected for a non-blank pixel. It has been found that three columns of pixels can be skipped without affecting the ability to detect non-touching and non-overlapping characters. Sparse stepping continues across the line segment until a first non-blank pixel has been found such as pixel 274 in FIG. 22.

When a first non-blank or black pixel is found, flow advances to step S2102 in which a search is made backward in the line segment until a fully blank column is found. This search, unlike the search in step S2101, is a full search with every pixel in each column being searched until a fully blank column is found. Thus, as shown in FIG. 22, backwards steps 275 are conducted until a first fully blank column 276 is found.

When a fully blank column is found, then flow advances to step S2103 in which a search forward is conducted from the column corresponding to pixel 274 until a fully blank column is found. Like step S2102, the search forward is conducted for every pixel in each column forward as shown at 277. The search continues until a fully blank column is found as shown at 278 in FIG. 22.

When a fully blank column is found in step S2103, flow advances to step S2104 in which the character is cut at the blank columns 276 and 278. Flow then returns to step S2101 in which sparse stepping is resumed across the line segment until a non-blank or black pixel is again found.

When layer 1 processing has been completed across the entire line segment, flow advances to layer 2 processing as shown at 261 or 264 in FIG. 20 in accordance with whether it is known if the text is uniformly or mono-spaced (such as courier font), or if it is not known whether the text is mono-spaced or it is known that the text is not mono-spaced (such as proportional font), respectively. If it is known that the text is mono-spaced, then flow advances to layer 2 cutting as shown at 261.

Figure 23:
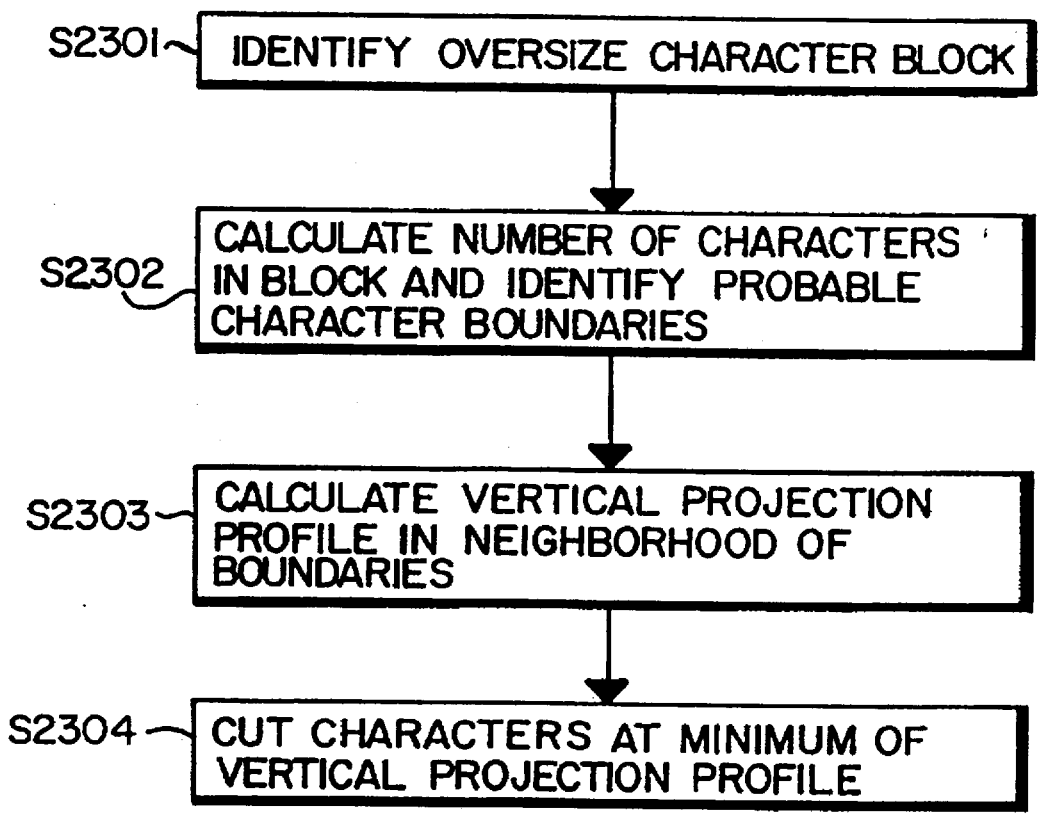
FIG. 23 is a flow chart of layer 2 character cutting for mono-spaced mode (e.g., courier font) according to FIG. 20.

FIG. 23 is a flow diagram showing layer 2 processing for mono-spaced text. The process steps shown in FIG. 23 are executed by CPU 10 in accordance with program steps stored in ROM 17.

Before layer 2 processing begins, the widths of the character segments are inspected to identify any undersized character segments. A character segment is undersized if it is less than half the width of the average character width. If an adjacent pair of undersized characters are identified, then it is probable that layer 1 inadvertently cut a single character in half and the undersized character pair is recombined.

In step S2301, oversized character blocks that have been cut by layer 1 are identified by comparing the width of each character block with the average width of all the character blocks. In general, comparing the size of each character block to the average size of all character blocks is effective in identifying oversized character blocks because since it is known that the characters are mono-spaced characters then it may be inferred that each character is more or less the same width. An oversized character block is detected if the width of the character block ("W") satisfies the following condition:

$$W > (1+c) * W_{avg}$$

where c is a constant and $W_{avg}$ is the average width of all character blocks in the line segment. It is noted that the above test is a scale-invariant test.

Figure 24:
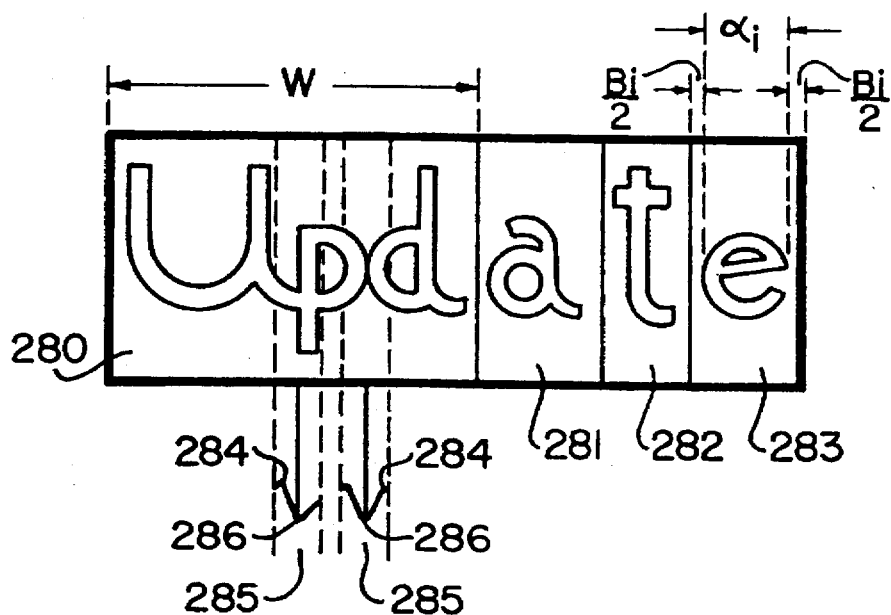
FIG. 24 is a view for explaining layer 2 character cutting.

The constant c is determined based on statistical information about the mono-spaced font as follows. Each letter in the mono-spaced alphabet, such as a courier alphabet is spaced evenly, and each such space consists of a fractional part $\alpha_i$ in which the character is located and a fractional part $\beta_i$ which is the blank space surrounding the character. For example, as shown in FIG. 24 for the letter "e", the space in which the letter "e" is located consists of a central area $\alpha_i$, where i corresponds to "e", surrounded by blank space $\beta_i$, where i corresponds to "e" ($\alpha_i + \beta_i = 1$ for every character i). $\alpha$'s and $\beta$'s can be measured for each character in the alphabet, including alphabetic characters, numeric characters, punctuation marks, etc., and the average of the $\alpha$'s and $\beta$'s ($\bar{\alpha}$ and $\bar{\beta}$, respectively) as well as the standard deviations ($\sigma_\alpha$ and $\sigma_\beta$, respectively) can be calculated. The constant c is calculated as follows:

$$c = \sigma_\beta / \bar{\alpha}$$

For the courier character set used in the FIG. 1 apparatus, $\bar{\alpha} = 25/35$, and $\sigma_\beta = 10/35$; therefore, $c = 0.4$ When an oversized character block is identified in step S2301, then flow advances to step S2302 in which the probable number of characters in the oversized block are calculated and the probable character boundaries are identified. Specifically, referring to FIG. 24, block 280 has been identified as an oversized character block because its width W is larger than a threshold calculated by averaging the widths of all of the blocks 280 through 283 and multiplying that average by (1+c). The probable number of characters in the oversized block 280 is determined by dividing width W by $\bar{\alpha}$ and rounding to the closest integer:

number of characters $N = [W/\bar{\alpha}]_{closest\ integer}$. Probable character boundaries are spaced equally across the oversized block in accordance with the probable number of touching characters "N" within the block as calculated above.

In step S2303, vertical projection profiles 284 of the pixels in the block are calculated in neighborhoods 285 of the probable character boundaries. The neighborhoods over which the vertical projection profile is calculated are defined by the distance $\sigma_\beta$; in particular, as shown in FIG. 24, vertical projection profiles are calculated in a neighborhood of $\pm\sigma_\beta/2$ around the probable character boundaries.

In step S2304, the minimums 286 in each of the vertical projection profiles 284 are located and characters are cut at those minimums.

After layer 2 processing as shown in FIG. 20 at 261, flow advances to character recognition as shown at 262, and thence to step S209 in FIG. 2 as described hereinabove.

In the case where it is not known if the characters in the line segment are mono-spaced, or if it is known that they are not mono-spaced, then it cannot be assumed that the characters are equally spaced within a line segment. Accordingly, layer 2 processing proceeds as shown at 264 in FIG. 20 and cuts between non-touching but overlapping characters. FIGS. 25 and 26 illustrate this process.

Specifically, as shown in step S2501 each character cut off in layer 1 is analyzed so as to trace out the outline of the contour of each image in the character block. Thus, as shown in FIG. 26(a), the character block containing the characters "fy" includes non-touching but overlapping characters "f" and "y" which are not cut by layer 1 processing because they overlap. As shown in FIG. 26(b), the character block is analyzed beginning at the lower right-hand portion of the block and proceeding leftwardly and upwardly until a black pixel is encountered. When a black pixel is encountered, the contour defined by black pixels connected to the black pixel is traced as shown at 287 in FIG. 26(c). When the entire contour has been traced for a first character, then scanning resumes until all contours for all black pixels in the character block have been traced as shown at 288. As each separate, non-touching character is identified, it is cut from the character block as shown in FIG. 26(d).

Figure 27:
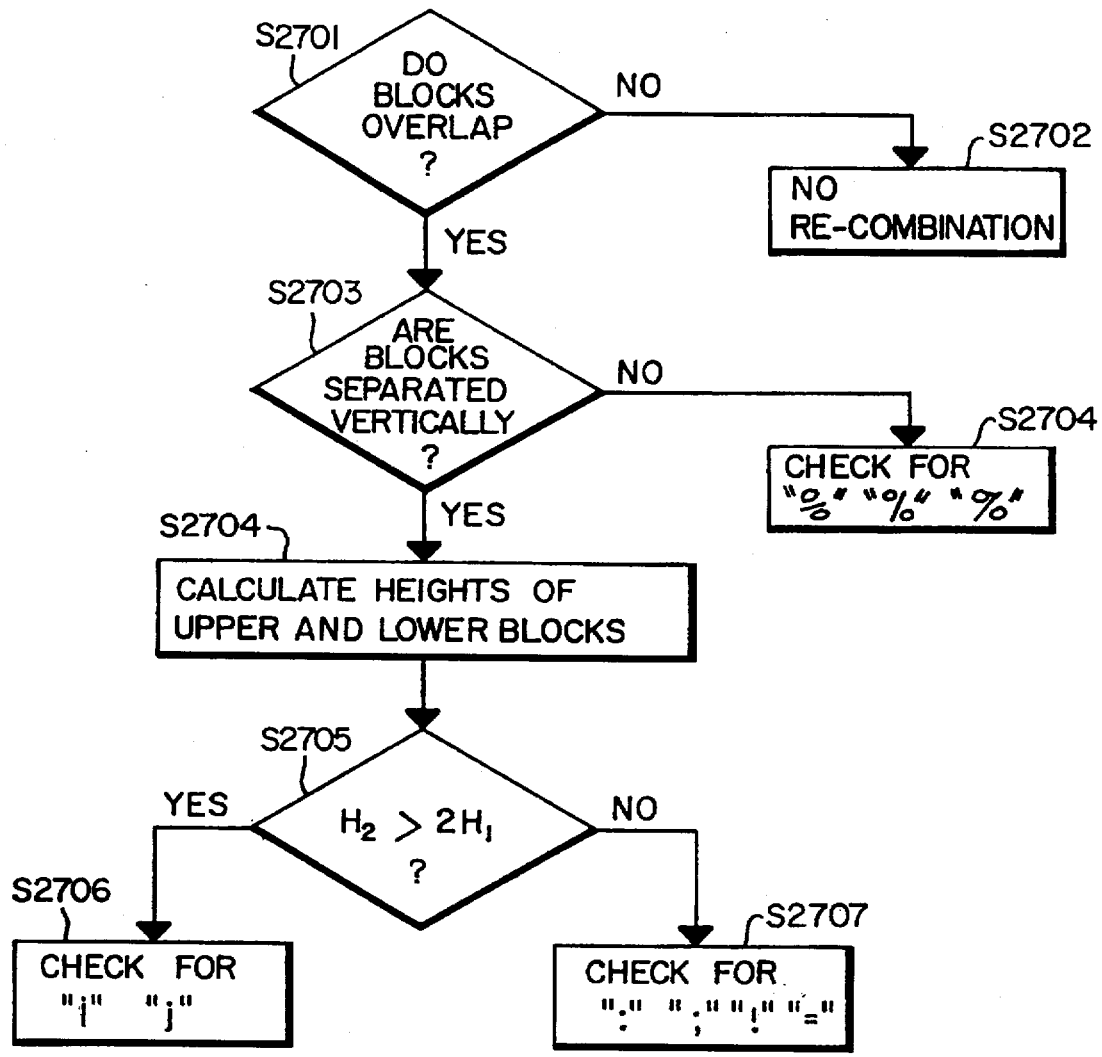
FIG. 27 is a flow chart showing recombination techniques for recombining multi-stroke characters that were cut in layer 2 processing.

Layer 2 processing, besides cutting non-touching but overlapping characters, also inadvertently cuts apart single characters that are composed of multiple strokes, for example, "i", "j", ":", ";", "!", "=", "%". Thus, in step S2502, such characters are recombined. FIG. 27 shows a detailed flow chart for this processing.

In general, only characters that are cut by layer 2 processing are subjected to recombination processing as shown in FIG. 27, and they are recombined only if they meet specific requirements. Specifically, blocks are recombined only if they overlap, that is, the right most pixel of the left hand character is under or over the left most pixel of the right hand character. Thus, step S2701 determines if the blocks overlap. If the blocks do not overlap, then recombination is not needed (step S2702) and recombination processing is terminated.

On the other hand, if the blocks overlap, then flow advances to step S2703 in which it is determined if the blocks are separated vertically. If the blocks are separated vertically, then it is possible for a multi-stroke character such as "i", "j", ":", ";", "!", or "=" to have inadvertently been cut by layer 2 processing, and testing ensues for one of these characters.

Specifically, because these blocks are separated vertically, there is an upper block whose height is H1 and a lower block whose height is H2. These heights are calculated in step S2704 and if in step S2705 H2 is greater than 2H1, then it is possible for characters "i" or "j" to have been separated. This is determined by testing the degree to which the characters overlap (step S2706): the location of the right most boundaries of four pixel rows immediately adjacent the two bodies are averaged and the distance between those average locations is calculated. (The right most boundaries are averaged rather than the overall locations because the dot over the characters "i" and "j" is not centered over the "i" and "j" but rather is displaced to the right of the upper serif.) To obtain a scale-invariant test, if the distance between the average locations is less than a constant times the width of the smaller of the bodies, then the blocks are recombined. This constant is selected to ensure that degraded images, whose separation is unpredictable, are recombined and in the present embodiment is equal to "9/8".

If, on the other hand, it is determined in step S2705 that H2 is not greater than 2H1, that is, the lower block is not twice as high as the upper body, then it is possible for characters such as ":", ";", "!", and "=" to have inadvertently been cut. Accordingly, flow advances to step S2707 where this possibility is tested. Specifically, the average midpoints of the four adjacent pixel rows in each body is measured and the difference between those midpoints is obtained. To obtain a scale invariant test, if the distance is less than a constant times the smaller of the widths of the two bodies, then the bodies are recombined since it is likely that it is one of the above-noted characters. As above, a constant of 9/8 has been found to yield satisfactory results.

If in step S2703 it is determined that the blocks are not separated vertically (i.e., there is no horizontally extending gap between the two blocks), then it is possible that the characters are a type 1 percent sign "%" ("type 1") a type 2 percent sign "%" ("type 2") or a type 3 percent sign "%" ("type 3"). Checks are made serially for each of these types as described below in which variables are defined as follows:

W1: the width of the first character (left to right)
W2: the width of the second character
H1: the height of the first character (top to bottom)
H2: the height of the second character (top to bottom)
L1: the column of the left most pixel of the first character
R1: the column of the right most pixel of the first character+1 pixel
L2: the column of the left most pixel of the second character
R2: the column of the right most pixel of the second character+1 pixel. Note: L1 is always less than L2.

First, type 1 percent signs are checked for. A type 1 percent sign is detected and the blocks are combined if both of the following two conditions are met:
i) $0.24 < \min(W1,W2)/\max(W1,W2) < 0.77$ which compares the width of the dot to the width of the line, and
ii) $[\min(R1,R2)-\max(L1,L2)]/\min(W1,W2) > 0.76$ which ensures that the blocks overlap horizontally by a large amount.

Second, type 2 percent signs are checked for. A type 2 percent sign is detected and the blocks are combined if all the following four conditions are met:
i) $(0.25)L2 < R1-L2$ which ensures that the blocks are sufficiently overlapping horizontally, and
ii) $0.50 < (W1/W2) < 1.10$ which ensures the proper ratio of dot width versus line width, and
iii) $0.43 < (H1/H2) < 0.70$ which ensures the proper ratio of dot height versus line height, and
iv) $(1/m) > 0.37$ where m is the slope of the line connecting points P1 and P2 on the "slash" portion of the percent signs. The points P1 and P2 are found according to the following methods:
P1: P1 is the position of the left most pixel containing printed text of the second character, in the row that is D rows from the top of the second character. The variable D is equal to $D=(0.1)W2$ P2: P2 is the position of the left most pixel containing printed text of the second character, in the row that is D rows from the bottom of the second character.

Third, type 3 percent signs are checked for. A type 3 percent sign is detected and the blocks are combined if all of the following conditions are met:

i) (0.25)L1<R2−L1 which ensures that the blocks are sufficiently overlapping horizontally, and ii) 0.50<(W2/W1)<1.10 which ensures the proper ratio of dot width versus line width, and iii) 0.43<(H2/H1)<0.70 which ensures the proper ratio of dot height versus line height, and iv) (1/m)>0.37 where m is the slope of the line connecting points P1 and P2 on the "slash" portion of the percent sign. The points P1 and P2 are found according to the following method:

P1: P1 is the position of the right most pixel containing printed text of the first character, in the row that is D rows from the top of the first character. The variable D is equal to D=(0.1)W1

P2: P2 is the position of the right most pixel containing printed text of the first character, in the row that is D rows from the bottom of the first character.

After layer 2 cutting and recombining as set forth at 264 in FIG. 20 (and as detailed in FIGS. 23 through 27), the cut characters are subjected to recognition processing at 265. Layer 1 cuts and layer 2 cuts are successful in cutting the great majority of characters in line segments, and accordingly, recognition processing at 265 will identify almost every character cut by layer 1 and layer 2. But to the extent that characters are not recognized at 265, it is presumed that the character block includes touching characters. For all such unrecognized character blocks, layer 3 cutting at 266 is performed so as to cut touching characters.

Figure 28:
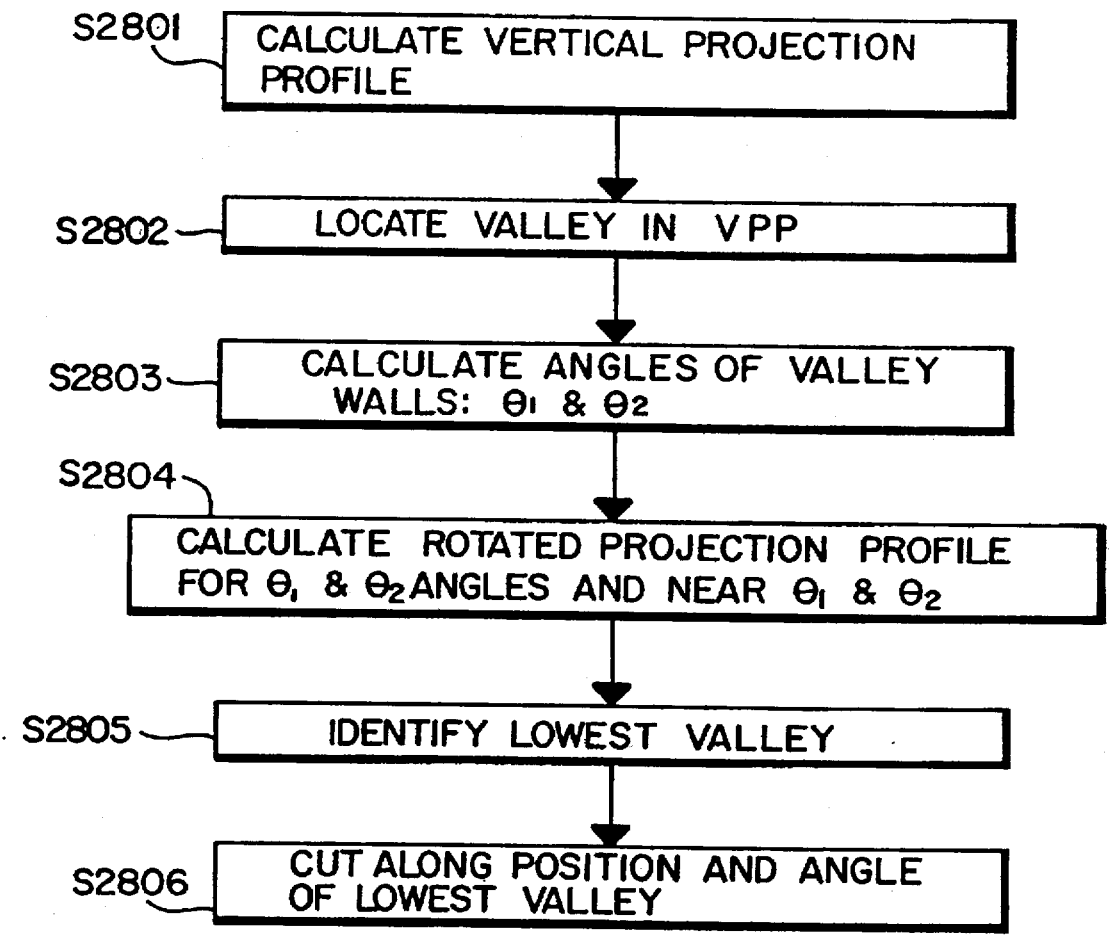
FIG. 28 is a flow chart showing layer 3 processing according to FIG. 20, and FIGS. 29(a) through 29(d) are views for explaining layer 3 character cutting.

FIG. 28 is a flow chart showing layer 3 cuts, and FIGS. 29(a) through 29(d) are views for explaining layer 3 cuts of touching characters. The process steps shown in FIG. 28 are stored in ROM 17 and executed by CPU 10.

In general, layer 3 cuts are performed by making an oblique cut in the character block. The angle and position of the oblique cut are determined by obtaining a vertical projection profile of pixel density in the block and by obtaining the angle of the walls of the deepest valley in the vertical projection profile. Pixel density is again projected but not vertically. Rather, pixel density is projected at rotated angles corresponding to the angles of the valley walls in the vertical pixel density projection. The overall minima of the several density projections is selected, and a cut is made at the angle from which the minimum is selected and at the position of the minimum. The process is explained in more detail below.

Thus, in step S2801, a vertical projection profile is calculated of pixel density. For example, as shown in FIG. 29(a), vertical projection profile 290 is obtained for touching characters "ti".

In step S2802, the first valley in the vertical projection profile is located and identified. Because the vertical projection profile is digital (i.e., it is the sum of discrete numbers of pixels), it is not smooth and valleys are located by ensuring that the minimum in the vertical projection profile is below a first, low threshold and by ensuring that the valley is surrounded on both sides by a local maximum which is higher than a second, upper threshold. Thus, as shown in FIG. 29(a), the vertical projection profile is inspected to determine whether there are any points that lie below lower threshold 291 and is surrounded on both sides by points that are above higher threshold 292. If a point is found that meets this criteria, then processing proceeds in step S2803. If a point is not found that meets this criteria, then the thresholds are altered as set forth below.

Initially, the lower threshold (291) is selected to be 10% of the maximum value of the vertical projection profile, and the upper threshold (292) is selected to be 20% of the maximum value of the vertical projection profile. If no point is found that meets the criteria for the upper and lower thresholds, then the upper and lower thresholds are both incremented by 2% of the maximum value of the vertical projection profile.

In FIG. 29(a), no point can be found that meets the criteria for the thresholds 291 and 292. Accordingly, the thresholds are incremented as shown in FIG. 29(b) until a point 294 is found which lies below lower threshold 291 and which is surrounded on both sides by points 295 and 296 which are greater than upper threshold 292.

When point 294 has been located, flow advances to step S2803 in which the angles of the valley walls surrounding point 294 are calculated. The angle of the right valley wall is the angle of a line between points 294 and 296 and is designated as angle θ1; likewise, the angle of the left valley wall is the slope of the line between points 294 and 295 and is designated as angle θ2.

Flow then advances to step S2804 in which rotated projection profiles are calculated at angles θ1 and θ2 as well as at angles near θ1 and θ2. Specifically, rotated projection profiles are calculated at angles θ1, θ1±3°, θ1±6°, θ2, θ2±3° and θ2±6°. The rotated projection profiles may be calculated through trigonometric manipulation of the pixels in the character block. More conveniently, however, the vertical projection profiles are calculated through a table look up in which, for each rotation angle (rounded to the nearest degree), a table is provided giving the locations of pixels that are summed to provide each point on the rotated projection profile.

A representative rotated projection profile is shown at 297 in FIG. 29(c). Each point on rotated projection profile 297 is obtained by summing the number of pixels in the direction of rotation, here angle θ1. As stated above, summation may be accomplished through trigonometric manipulation of the image in the character block, or more conveniently, by reference to a look up table provided for each angle of rotation.

After all rotated projection profiles have been calculated, as illustrated by the dashed lines in FIGS. 29(c) and 29(d), flow advances to step S2805 in which each of the rotated projection profiles (all 10 of them) as well as the vertical projection profile calculated in step S2801 are compared to identify the lowest minimum of all of the projection profiles. The angle of the projection profile from which the lowest minimum is selected corresponds to the angle of the cut; the position of the cut is the position of the lowest minimum. Thus, as shown in FIG. 29(c), assuming that point 299 is the lowest minimum of all 11 projection profiles, a cut of the character block is made at angle θ1 and at the position of minimum 299 (step S2806).

After layer 3 cutting, the cut characters are subjected to recognition processing at 267. If both character blocks cut in layer 3 processing are recognized, then processing proceeds in accordance with step S209 of FIG. 2. To the extent that there still remain unrecognized blocks, however, the possibility that inappropriate cuts have been made and that the cut character blocks should be recombined must be considered. This processing is performed in recombination block 269 and detailed in FIG. 30.

Thus, as shown in step S3001, recognition processing at 267 is attempted on both portions of a layer 3 cut. If in step S3002 both portions are recognized, then flow advances to step S209 of FIG. 2 as described above. If, on the other hand, both cuts have not been recognized, then step S3003 determines whether at least one portion has been recognized. If neither portion has been recognized, then in step S3004 both portions are subjected to further layer 3 cuts and the processing of step S3001, etc., is performed on each portion.

If, on the other hand, in step S3003 at least one portion is recognized, then flow advances to step S3005 where the unrecognized portion is subjected to an additional layer 3 cut. If in step S3006 both new cuts are recognized, then there are no remaining unrecognized blocks and flow advances to step S209 of FIG. 2. On the other hand, if both new cuts are not recognized in step S3006, then flow advances to step S3007 where the possibility of recombining inappropriately cut blocks is considered.

Figure 31A:
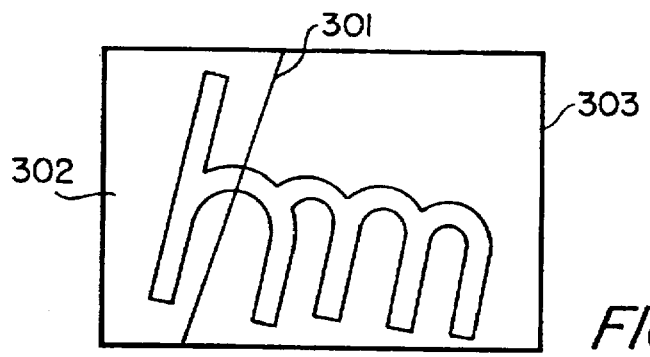

FIG. 31 is an illustration for explaining a situation in which it is possible that inappropriate cuts have been made in layer 3 processing. FIG. 31(a) shows badly degraded italic characters "hm". Layer 3 processing at 266 in FIG. 20 will make a first cut at 301 thereby separating the vertical leg of the character "h" from its looped body. Each cut segment will be passed to recognition processing at 267 where for purposes of illustration it is assumed that the first block 302 is recognized as a "1" and the second block 303 remains unrecognized.

Figure 31B:
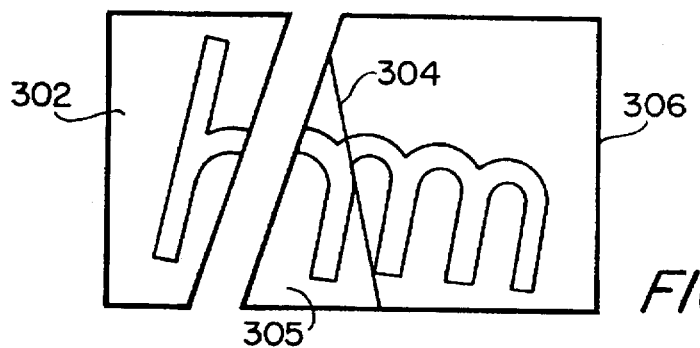

In this situation, processing proceeds in accordance with step S3005 and the unrecognized portion 303 is subjected to further layer 3 cuts as shown in FIG. 31(b). Layer 3 processing will make a further cut at 304 resulting in portions 305 and 306 which are passed to recognition processing at 267. Neither portion is recognizable as a character and it is therefore considered that recombination should be made.

Figure 31C:
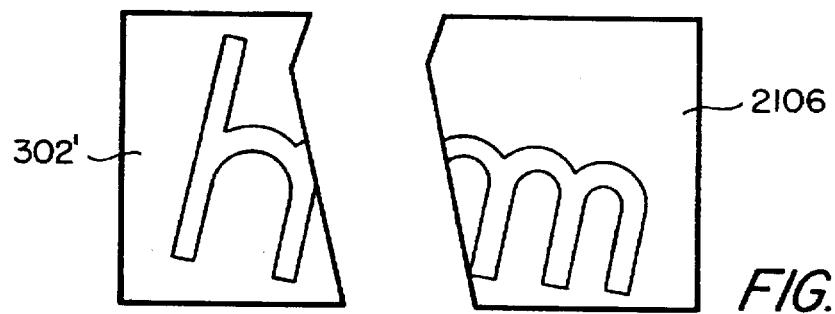

As shown at step S3007, unrecognized cuts are combined with adjacent portions that have previously been cut, whether those adjacent portions have been recognized or not. Thus, as shown in FIG. 31(c), portion 302 is recombined with portion 305 resulting in a new portion 302' which is predominantly the character "h". Portion 302' as well as portion 306 are fed to recognition processing at 267 (step S3008).

Flow then returns to step S3001 where it is determined if both portions have been recognized. In this particular instance, both portions are recognized as the characters "h" and "m", respectively, and processing then terminates. On the other hand, if both portions have not been recognized, then processing proceeds as described above.

What is claimed is:

1. A method for recognizing characters in pixel image data comprising the steps of:
    selecting blocks of pixels from the pixel image data, said selecting step including, in order, the steps of outlining contours of connected components in the pixel image data, determining whether the outlined connected components include text units or non-text units, forming a hierarchical tree based on the outlined connected components, a first connecting step of selectively connecting text units widthwisely to form text lines, a second connecting step of vertically connecting a plurality of text lines formed in the first connecting step to form text blocks, at least one formed text block including a plurality of formed horizontal text lines, modifying the hierarchical tree based on the first and second connecting steps and designating as a descendent a connected component which is within a rectangle formed around another connected component;
    segmenting text blocks into lines of pixel image data;
    cutting characters from the line segmented in said segmenting step;
    recognizing characters cut in said cutting step; and
    storing characters recognized in said recognizing step in accordance with an order established in said block selecting step.

2. A method according to claim 1, further comprising the step of recognizing character images in blocks of text units.

3. A method according to claim 1, further comprising a pre-processing step in which the pixel image data is pre-processed.

4. A method according to claim 3, wherein said pre-processing step includes the step of image compression.

5. A method according to claim 3, wherein said pre-processing step includes the step of filtering so as to enhance pixel image data.

6. A method according to claim 1, further comprising the step of post-processing the characters recognized in said recognizing step.

7. A method according to claim 6, wherein said post-processing includes context checking so as to check one recognized character within a context of other recognized characters.

8. A method according to claim 1, further comprising the step of inputting pixel image data, wherein said input step includes the step of converting the pixel image data into binary pixel image data in the event that the pixel image data is not binary pixel image data.

9. A method according to claim 1, wherein said block selecting step includes the step of forming a hierarchical tree based on the connected components outlined in said outlining step, said hierarchical tree defining the order with which characters are stored in said storing step.

10. A method according to claim 9, further comprising the step of forming a rectangle around the connected components outlined in said outlining step.

11. A method according to claim 10, wherein the hierarchical tree is formed based on the position of the rectangles formed in said forming step.

12. A method according to claim 9, further comprising the step of modifying the hierarchial tree based on the first and second connecting steps.

13. A method according to claim 9, further comprising the step of classifying the connected contours as text units or non-text units.

14. A method according to claim 13, wherein said first and second connecting steps connect text units but do not connect non-text units.

15. A method according to claim 13, further comprising the step of white-contour tracing the interior of non-text units.

16. A method according to claim 15, further comprising the step of designating non-text units as tables based on the number of white contours contained therein.

17. A method according to claim 15, further comprising the step of recombining white contours that are not arranged in a grid.

18. A method according to claim 17, wherein non-text units are designated as tables based on recombination in said recombining step.

19. A method according to claim 13, further comprising calculating the fill rate of white contours in non-text units.

20. A method according to claim 19, wherein the non-text unit is designated as a table in the event that the fill rate is high.

21. A method according to claim 1, further comprising the step of printing by a printer an image processed by said method.

22. A method according to claim 1, further comprising the step of inputting the pixel image data by a scanner.

23. A method according to claim 1, further comprising the step of classifying as text and non-text: (i) hierarchical tree components; and (ii) their descendents.

24. A method for forming a text file of characters in pixel image data comprising the steps of:

inputting pixel image data, wherein said inputting step includes the step of converting the pixel image data into binary pixel image data in the event that the pixel image data is not binary pixel image data;

selecting blocks of pixel image data, said selecting step including, in order, the steps of outlining contours of connected components in the pixel image data, determining whether the outlined connected components include text units or non-text units based on the size of the outlined connected components, selectively connecting text units widthwisely to form text lines based on proximity of adjacent text units, and vertically connecting a plurality of the formed text lines to form text blocks based on proximity of adjacent text lines and on the position of non-text units between text lines, at least one formed text block having a plurality of the formed text lines;

forming a hierarchical tree based on the connected components outlined in said outlining step and designating as a descendent a connected component which is within a rectangle formed around another connected component;

modifying the hierarchical tree based on the connecting steps;

segmenting text blocks into lines of pixel image data;

cutting characters from the line segmented in said segmenting step;

recognizing characters cut in said cutting step and deriving character codes based on said recognition; and storing the character codes in a computer text file in accordance with an order established by the modified hierarchical tree.

25. A method according to claim 24, further comprising a pre-processing step in which the pixel image data is pre-processed.

26. A method according to claim 25, wherein said pre-processing step includes the step of image compression.

27. A method according to claim 26, wherein said pre-processing step includes the step of enhancing pixel image data.

28. A method according to claim 24, further comprising the step of post-processing the characters recognized in said recognizing step, said post-processing including context checking so as to check on recognized character within a context of other recognized characters.

29. A method according to claim 24, further comprising the step of white-contour tracing the interior of non-text units.

30. A method according to claim 29, further comprising the step of appending a non-text designator to each non-text unit.

31. A method according to claim 30, further comprising the step of appending a table designator to a non-text unit, based on the number of white contours contained therein, so as to designate that the non-text unit is a table.

32. A method according to claim 30, further comprising the step of recombining white contours that are not arranged in a grid, wherein a table designator is appended to a non-text unit, based on the recombination rate in said recombining step, so as to designate that the non-text unit is a table.

33. A method according to claim 30, further comprising calculating the fill rate of white contours in non-text units, wherein a table designator is appended to a non-text unit, in the event that the fill rate is high, so as to designate that the non-text unit is a table.

34. A method according to claim 24, further comprising the step of printing by a printer an image processed by said method.

35. A method according to claim 24, further comprising the step of inputting the pixel image data by a scanner.

36. A method according to claim 24, further comprising the step of classifying as text and non-text: (i) hierarchical tree components; and (ii) their descendents.

37. An apparatus for recognizing characters in pixel image data, comprising:

selecting means for selecting blocks of pixels from the pixel image data, said selecting means including outlining means for outlining contours of connected components in the pixel image data, determining means for determining whether the outlined connected components include text units or non-text units, tree forming means for forming a hierarchical tree based on the outlined connected components, first connecting means for selectively connecting text units widthwisely to form text lines, second connecting means for vertically connecting the formed text lines to form text blocks, at least one formed text block having a plurality of the formed text lines, and modifying means for modifying the hierarchical tree based on the connections performed by said first and second connecting means, wherein said tree forming means includes means for designating as a descendent a connected component which is within a rectangle formed around another connected component;

segmenting means for segmenting text blocks into lines of pixel image data;

cutting means for cutting characters from the line segmented by said segmenting means;

recognizing means for recognizing characters cut by said cutting means; and storing means for storing characters recognized by said recognizing means in accordance with an order established by said block selecting means.

38. An apparatus according to claim 37, further comprising second recognizing means for recognizing character images in blocks of text units.

39. An apparatus according to claim 37, further comprising pre-processing means for pre-processing the pixel image data.

40. An apparatus according to claim 39, wherein said pre-processing means compresses the pixel image data.

41. An apparatus according to claim 39, wherein said pre-processing means includes filtering means which enhances pixel image data.

42. An apparatus according to claim 37, further comprising post-processing means for post-processing the characters recognized by said recognizing means.

43. An apparatus according to claim 42, wherein said post-processing means includes context checking means for checking one recognized character within a context of other recognized characters.

44. An apparatus according to claim 37, further comprising input means for inputting pixel image data, said input means including converting means for converting the pixel image data into binary pixel image data in the event that the pixel image data is not binary pixel image data.

45. An apparatus according to claim 37, wherein said block selecting means includes means for forming a hierarchical tree based on the connected components outlined by said outlining means, said hierarchical tree defining the order with which said storing means stores characters.

46. An apparatus according to claim 45, further comprising forming means for forming a rectangle around the connected components outlined by said outlining means.

47. An apparatus according to claim 46, wherein the hierarchical tree is formed based on the position of the rectangles formed by said forming means.

48. An apparatus according to claim 45, further comprising means for modifying the hierarchial tree based on said first connecting means and said second connecting means.

49. An apparatus according to claim 45, further comprising classifying means for classifying the connected contours as text units or non-text units.

50. An apparatus according to claim 49, wherein said first connecting means and said second connecting means connect text units but do not connect non-text units.

51. An apparatus according to claim 49, further comprising means for white-contour tracing the interior of non-text units.

52. An apparatus according to claim 51, further comprising designating means for designating non-text units as tables based on the number of white contours contained therein.

53. An apparatus according to claim 51, further comprising recombining means for recombining white contours that are not arranged in a grid.

54. An apparatus according to claim 53, wherein non-text units are designated as tables based on recombination by said recombining means.

55. An apparatus according to claim 49, further comprising calculating means for calculating the fill rate of white contours in non-text units.

56. An apparatus according to claim 55, wherein the non-text unit is designated as a table in the event that the fill rate is high.

57. An apparatus according to claim 37, further comprising a printer engine for printing an image processed by said apparatus.

58. An apparatus according to claim 37, further comprising a scanner for inputting the pixel image data.

59. Apparatus according to claim 37, further comprising means for classifying as text and non-text: (i) hierarchical tree components; and (ii) their descendents.

60. An apparatus for forming a text file of characters in pixel image data comprising:
    input means for inputting pixel image data, said input means including converting means for converting the pixel image data into binary pixel image data in the event that the pixel image data is not binary pixel data;
    selecting means for selecting blocks of pixel image data, said selecting means including outlining means for outlining contours of connected components in the pixel image data, determining means for determining whether the outlined connected components include text units or non-text units based on the size of the outlined connected components, first connecting means for selectively text units widthwisely to form text lines based on proximity of adjacent text units, and second connecting means for vertically connecting the formed text lines to form text blocks based on proximity of adjacent text lines and on the position of non-text units between text lines, at least one formed text block including a plurality of the formed text lines;
    forming means for forming a hierarchical tree based on the connected components outlined by said outlining means, and for designating as a descendent a connected component which is within a rectangle formed around another connected component;
    modifying means for modifying the hierarchical tree based on the connections performed by said first and second connecting means;
    segmenting means for segmenting text blocks into lines of pixel image data;
    cutting means for cutting characters from the line segmented by said segmenting means;
    recognizing means for recognizing characters cut by said cutting means and for deriving character codes based on said recognition; and
    storing means for storing the character codes in a computer text file in accordance with an order established by the modified hierarchical tree.

61. An apparatus according to claim 60, further comprising means for pre-processing the pixel image data.

62. An apparatus according to claim 61, wherein said pre-processing means compresses the pixel image data.

63. An apparatus according to claim 62, wherein said pre-processing means enhances the pixel image data.

64. An apparatus according to claim 60, further comprising post-processing means for post-processing the characters recognized by said recognizing means, said post-processing means including context checking means for checking one recognized character within a context of other recognized characters.

65. An apparatus according to claim 60, further comprising means for white-contour tracing the interior of non-text units.

66. An apparatus according to claim 65, further comprising appending means for appending a non-text designator to each non-text unit.

67. An apparatus according to claim 66, wherein a table designator is appended to a non-text unit, based on the number of white contours contained therein, so as to designate that the non-text unit is a table.

68. An apparatus according to claim 66, further comprising recombining means for recombining white contours that are not arranged in a grid, wherein a table designator is appended to a non-text unit, based on the recombination rate of said recombining means, so as to designate that the non-text unit is a table.

69. An apparatus according to claim 66, further comprising calculating means for calculating the fill rate of white contours in non-text units, wherein a table designator is appended to a non-text unit in the event that the fill rate is high, so as to designate that the non-text unit is a table.

70. An apparatus according to claim 60, further comprising a printer engine for printing an image processed by said apparatus.

71. An apparatus according to claim 60, further comprising a scanner for inputting the pixel image data.

72. Apparatus according to claim 60, further comprising means for classifying as text and non-text: (i) hierarchical tree components; and (ii) their descendents.

73. A method for recognizing characters in pixel image data comprising the steps of:
    selecting blocks of pixels from the pixel image data, said selecting step including the steps of outlining connected components in the pixel image data, forming a hierarchical tree based on the outlined connected components, connecting the outlined connected components to form text lines and text blocks, and modifying the hierarchical tree based on the connected and outlined connected components, wherein said forming step comprises the step of designating as a descendent a connected component which is within a rectangle formed around another connected component;

segmenting text blocks into lines of pixel data by adaptively dividing the text blocks into at least one column based on a horizontal projection of pixel density across said at least one column;

cutting characters from the line segmented in said segmenting step, said cutting step including a first cutting layer step in which non-touching and non-overlapping characters are cut from the line segment and at least one additional cutting layer step in which touching characters are cut, said additional cutting layer step being carried out in accordance with whether or not the line characters are monospaced;

recognizing the characters cut in said cutting step; and storing characters recognized in said recognizing step in accordance with an order established in said block selecting step.

74. A method according to claim 73, further comprising the step of inputting pixel image data, wherein said input step includes the step of converting the pixel image data into binary pixel image data in the event that the pixel image data is not binary pixel image data.

75. A method according to claim 73, further comprising a pre-processing step in which said pixel image data is pre-processed.

76. A method according to claim 75, wherein said pre-processing step includes the step of image compression.

77. A method according to claim 75, wherein said pre-processing step includes the step of filtering so as to enhance the pixel image data.

78. A method according to claim 73, further comprising the step of post-processing the characters recognized in said recognizing step.

79. A method according to claim 78, wherein said post-processing includes context checking so as to check one recognized character within a context of other recognized characters.

80. A method according to claim 73, wherein said first cutting layer step includes the step of sparsely stepping through the line segment.

81. A method according to claim 73, wherein said additional cutting layer step is selectable in accordance with whether characteristics are known about the characters in the pixel image data.

82. A method according to claim 81, wherein said additional cutting layer step cuts based on statistics of a known character set.

83. A method according to claim 81, wherein said additional cutting layer step cuts in accordance with a rotated projection of pixel density.

84. A method according to claim 83, wherein the rotated projection of pixel density is obtained at an angle determined based on a vertical projection of pixel density.

85. A method according to claim 83, further comprising an intermediate cutting layer step between said first cutting layer and said at least one additional cutting layer step.

86. A method according to claim 85, wherein said intermediate cutting layer step includes the step of outlining overlapping pixel images in the line segment.

87. A method according to claim 86, further comprising the step of recombining characters cut in said intermediate cutting layer step in the event that the characters were cut inadvertently.

88. A method according to claim 87, wherein said recognizing step recognizes characters cut in said first cutting layer step before said additional cutting layer step, and wherein said additional cutting layer step is applied to characters that are not recognized in said recognizing step.

89. A method according to claim 88, further comprising the step of recombining the characters cut in said at least one additional cutting layer step in the event that characters are not recognized in said recognizing step.

90. A method according to claim 73, further comprising the step of printing by a printer an image processed by said method.

91. A method according to claim 73, further comprising the step of inputting the pixel image data by a scanner.

92. A method according to claim 73, further comprising the step of classifying as text and non-text: (i) hierarchical tree components; and (ii) their descendents.

93. A method for forming a text file of characters in pixel image data comprising the steps of:

inputting pixel image data, wherein said inputting step includes the step of converting the pixel image data into binary pixel image data in the event that the pixel image data is not binary pixel image data;

selecting blocks of pixel image data in accordance with whether the blocks of pixel image data are text blocks or non-text blocks;

forming a hierarchical tree of the text and non-text blocks, wherein said forming step comprises the step of designating as a descendent a connected component in the pixel image data which is within a rectangle formed around another connected component;

grouping together connected components in the pixel image data to form text lines and text blocks;

modifying the hierarchical tree based on the grouped-together connected components;

segmenting text blocks into lines of pixel image data by adaptively dividing the text blocks into a least one column based on a horizontal projection of pixel density across said at least one column;

cutting characters from the line segmented in said segmenting step, said cutting step including a first cutting layer step in which non-touching and non-overlapping characters are cut from the line segment and at least one additional cutting layer step in which touching characters are cut, said additional cutting layer step being carried out in accordance with whether or not the line characters are monospaced;

recognizing characters cut in said cutting step and deriving character codes based on said recognition; and storing the character codes in a computer text file in accordance with an order established by the modified hierarchical tree.

94. A method according to 93, further comprising a pre-processing step in which the pixel image data is pre-processed.

95. A method according to claim 94, wherein said pre-processing step includes the step of image compression.

96. A method according to claim 94, wherein said pre-processing step includes the step of enhancing pixel image data.

97. A method according to claim 93, further comprising the step of post-processing the characters recognized in said recognizing step, said post-processing including context checking so as to check one recognized character within a context of other recognized characters.

98. A method according to claim 93, wherein said first cutting layer step includes the step of sparsely stepping through the line segment.

99. A method according to claim 93, wherein said additional cutting layer step is selectable in accordance with whether characteristics are known about the characters in the pixel image data.

100. A method according to claim 99, wherein said additional cutting layer step cuts based on spacing statistics of a known character set.

101. A method according to claim 99, wherein said additional cutting layer step cuts in accordance with a rotated projection of pixel density.

102. A method according to claim 101, wherein the rotated projection of pixel density is obtained at an angle determined based on a vertical projection of pixel density.

103. A method according to claim 93, further comprising an intermediate cutting layer step between said first cutting layer and said at least one additional cutting layer step.

104. A method according to claim 103, wherein said intermediate cutting layer step includes the step of outlining overlapping pixel images in the line segment.

105. A method according to claim 104, further comprising the step of recombining characters cut in said intermediate cutting layer step in the event that the characters were cut inadvertently.

106. A method according to claim 105, wherein said recognizing step recognizes characters cut in said first cutting layer step before said additional cutting layer step, and wherein said additional cutting layer step is applied to characters that are not recognized in said recognizing step.

107. A method according to claim 106, further comprising the step of recombining the characters cut in said at least one additional cutting layer step in the event that characters are not recognized in said recognizing step.

108. A method according to claim 93, further comprising the step of printing by a printer an image processed by said method.

109. A method according to claim 93, further comprising the step of inputting the pixel image data by a scanner.

110. A method according to claim 93, further comprising the step of classifying as text and non-text: (i) the hierarchical tree components; and (ii) their descendents.

111. A method for forming a text file of characters in pixel image data, comprising the steps of:

inputting pixel image data, wherein said inputting step includes the step of converting the pixel image data into binary pixel image data in the event that the pixel image data is not binary image data;

selecting blocks of pixel image data, said selecting step including the steps of outlining contours of connected components in the pixel image data, determining whether the outlined connected components include text units or non-text units based on the size of the outlined connected components, selectively connecting text units widthwisely to form text lines based on proximity of adjacent text units, and vertically connecting the formed text lines to form text blocks based on proximity of adjacent text lines and on the position of non-text units between text lines, at least one formed text block including a plurality of the formed text lines;

forming a hierarchical tree based on the connected components outlined in said outlining step, and designating as a descendent a connected component which is within a rectangle formed around another connected component;

modifying the hierarchical tree based on the connected text units and text lines;

segmenting text blocks into lines of pixel data by adaptively dividing text blocks into at least one column based on a horizontal projection of pixel density across said at least one column;

cutting characters from the lines segmented in said segmenting step, said cutting step including a first cutting layer step in which non-touching and non-overlapping characters are cut from the line segment and at least one additional cutting layer step in which touching characters are cut;

recognizing the characters cut in said cutting step and deriving character codes based on said recognition; and storing the character codes in a computer text file in accordance with an order established by the modified hierarchical tree.

112. A method according to claim 111, further comprising a pre-processing step in which the pixel image data is pre-processed.

113. A method according to claim 112, wherein said pre-processing step includes the step of image compression.

114. A method according to claim 113, wherein said pre-processing step includes the step of enhancing pixel image data.

115. A method according to claim 111, further comprising the step of post-processing the characters recognized in said recognizing step, said post-processing including context checking so as to check one recognized character within a context of other recognized characters.

116. A method according to claim 111, wherein said first cutting layer step includes the step of sparsely stepping through the line segment.

117. A method according to claim 111, wherein said additional cutting layer step is selectable in accordance with whether characteristics are known about the characters in the pixel image data.

118. A method according to claim 117, wherein said additional cutting layer step cuts based on spacing statistics of a known character set.

119. A method according to claim 117, wherein said additional cutting layer step cuts in accordance with a rotated projection of pixel density.

120. A method according to claim 119, wherein the rotated projection of pixel density is obtained at an angle determined based on a vertical projection of pixel density.

121. A method according to claim 111, further comprising an intermediate cutting layer step between said first cutting layer and said at least one additional cutting layer step.

122. A method according to claim 121, wherein said intermediate cutting layer step includes the step of outlining overlapping pixel images in the line segment.

123. A method according to claim 122, further comprising the step of recombining characters cut in said intermediate cutting layer step in the event that the characters were cut inadvertently.

124. A method according to claim 123, wherein said recognizing step recognizes characters cut in said first cutting layer step before said additional cutting layer step, and wherein said additional cutting layer step is applied to characters that are not recognized in said recognizing step.

125. A method according to claim 124, further comprising the step of recombining the characters cut in said at least one additional cutting layer step in the event that characters are not recognized in said recognizing step.

126. A method according to claim 111, further comprising the step of white-contour tracing the interior of non-text units.

127. A method according to claim 126, further comprising the step of appending a non-text designator to each non-text unit.

128. A method according to claim 127, wherein a table designator is appended to a non-text unit, based on the number of white contours contained therein, so as to designate that the non-text unit is a table.

129. A method according to claim 127, further comprising the step of recombining white contours that are not arranged in a grid, wherein a table designator is appended to a non-text unit, based on the recombination rate in said recombining step, so as to designate that the non-text unit is a table.

130. A method according to claim 127, further comprising the step of calculating the fill rate of white contours in non-text units, wherein a table designator is appended to a non-text unit, in the event that the fill rate is high, so as to designate that the non-text unit is a table.

131. A method according to claim 111, further comprising the step of printing by a printer an image processed by said method.

132. A method according to claim 111, further comprising the step of inputting the pixel image data by a scanner.

133. A method according to claim 111, further comprising the step of classifying as text and non-text: (i) hierarchical tree components; and (ii) their descendents.

134. An apparatus for recognizing characters in pixel image data comprising:

selecting means for selecting blocks of pixels from the pixel image data, said selecting means including means for outlining connected components in the pixel image data, means for forming a hierarchical tree based on the outlined connected components, means for connecting the outlined connected components to form text lines and text blocks, and means for modifying the hierarchical tree based on the connected outlined connected components, wherein said forming means comprises means for designating as a descendent a connected component which is within a rectangle formed around another connected component;

segmenting means for segmenting text blocks into lines of pixel data by adaptively dividing the text blocks into at least one column based on a horizontal projection of pixel density across said at least one column;

cutting means for cutting characters from the line segmented by said segmenting means, said cutting means including a first cutting means for cutting a first layer of non-touching and non-overlapping characters from the line segment and at least one additional cutting means for cutting touching characters, said additional cutting layer step being carried out in accordance with whether or not the line characters are monospaced;

recognizing means for recognizing the characters cut by said cutting means; and storing means for storing characters recognized by said recognizing means in accordance with an order established by said block selecting means.

135. An apparatus according to claim 134, further comprising input means for inputting pixel image data, said input means including converting means for converting the pixel image data into binary pixel image data in the event that the pixel image data is not binary pixel image data.

136. An apparatus according to claim 134, further comprising pre-processing means for pre-processing pixel image data.

137. An apparatus according to claim 136, wherein said pre-processing compresses said pixel image data.

138. An apparatus according to claim 136, wherein said pre-processing means includes filtering means which enhances the pixel image data.

139. An apparatus according to claim 134, further comprising post-processing means for post-processing the characters recognized by said recognizing means.

140. An apparatus according to claim 139, wherein said post-processing means includes context checking means for checking one recognized character within a context of other recognized characters.

141. An apparatus according to claim 134, wherein said first cutting means includes sparsely stepping means for sparsely stepping through the line segment.

142. An apparatus according to claim 134, wherein said additional cutting means is selectable in accordance with whether characteristics are known about the characters in the pixel image data.

143. An apparatus according to claim 142, wherein said additional cutting means makes cuts based on statistics of a known character set.

144. An apparatus according to claim 142, wherein said additional cutting means makes cuts in accordance with a rotated projection of pixel density.

145. An apparatus according to claim 144, wherein the rotated projection of pixel density is obtained at an angle determined based on a vertical projection of pixel density.

146. An apparatus according to claim 144, further comprising intermediate cutting means for cutting an intermediate layer after said first cutting means and before said at least one additional cutting means is employed.

147. An apparatus according to claim 146, wherein said intermediate cutting means includes outlining means for outlining overlapping pixel images in the line segment.

148. An apparatus according to claim 147, further comprising recombining means for recombining characters cut by said intermediate cutting means in the event that the characters were cut inadvertently.

149. An apparatus according to claim 148, wherein said recognizing means recognizes characters cut by said first cutting means before characters cut by said additional cutting means, and wherein said additional cutting means cuts characters that are not recognized by said recognizing means.

150. An apparatus according to claim 149, further comprising second recombining means for recombining the characters cut by said at least one additional cutting means in the event that characters are not recognized by said recognizing means.

151. An apparatus according to claim 134, further comprising a printer engine for printing an image processed by said apparatus.

152. An apparatus according to claim 134, further comprising a scanner for inputting the pixel image data.

153. Apparatus according to claim 134, further comprising means for classifying as text and non-text: (i) hierarchical tree components; and (ii) their descendents.

154. An apparatus for forming a text file of characters in pixel image data, comprising:

input means for inputting pixel image data, said input means including converting means for converting the pixel image data into binary pixel image data in the event that the pixel image data is not binary pixel image data;

selecting means for selecting blocks of pixel image data in accordance with whether the blocks of pixel image data are text blocks or non-text blocks;

forming means for obtaining a hierarchical tree of the text and non-text blocks, wherein said forming means comprises means for designating as a descendent a connected component which is within a rectangle formed around another connected component;

grouping means for grouping together connected components in the pixel image data to form text lines and text blocks;

modifying means for modifying the hierarchical tree based on the grouped-together connected components;

segmenting means for segmenting text blocks into lines of pixel image data by adaptively dividing the text blocks into at least one column based on a horizontal projection of pixel density across said at least one column;

cutting means for cutting characters from the line segmented by said segmenting means, said cutting means including first cutting means for cutting a first layer of non-touching and non-overlapping characters from the line segment and at least one additional cutting means for cutting touching characters, said additional cutting layer step being carried out in accordance with whether or not the line characters are monospaced;

recognizing means for recognizing characters cut by said cutting means and deriving character codes based on said recognition;

and a computer text file in which the character codes are stored in accordance with an order established by the modified hierarchical tree.

155. An apparatus according to 154, further comprising pre-processing means for pre-processing the pixel image data.

156. An apparatus according to claim 155, wherein said pre-processing means compresses the pixel image data.

157. An apparatus according to claim 155, wherein said pre-processing means enhances the pixel image data.

158. An apparatus according to claim 154, further comprising post-processing means for post-processing the characters recognized by said recognizing means, said post-processing means including context checking means for checking one recognized character within a context of other recognized characters.

159. An apparatus according to claim 154, wherein said first cutting means includes sparsely stepping means for sparsely stepping through the line segment.

160. An apparatus according to claim 154, wherein said additional cutting means is employed based on whether characteristics are known about the characters in the pixel image data.

161. An apparatus according to claim 160, wherein said additional cutting means cuts based on spacing statistics of a known character set.

162. An apparatus according to claim 160, wherein said additional cutting means cuts in accordance with a rotated projection of pixel density.

163. An apparatus according to claim 162, wherein the rotated projection of pixel density is obtained at an angle determined based on a vertical projection of pixel density.

164. An apparatus according to claim 154, further comprising intermediate cutting means for cutting an intermediate layer between said first layer and said at least one additional layer.

165. An apparatus according to claim 164, wherein said intermediate cutting means includes outlining means for outlining overlapping pixel images in the line segment.

166. An apparatus according to claim 165, further comprising recombining means for recombining characters cut by said intermediate cutting means in the event that the characters were cut inadvertently.

167. An apparatus according to claim 166, wherein said recognizing means recognizes characters cut by said first cutting means before recognizing characters cut by said additional cutting means, and wherein said additional cutting means is applied to characters that are not recognized by said recognizing means.

168. An apparatus according to claim 167, further comprising second recombining means for recombining the characters cut by said at least one additional cutting means in the event that characters are not recognized by said recognizing means.

169. An apparatus according to claim 154, further comprising a printer engine for printing an image processed by said apparatus.

170. An apparatus according to claim 154, further comprising a scanner for inputting the pixel image data.

171. Apparatus according to claim 154, further comprising means for classifying as text and non-text: (i) hierarchical tree components; and (ii) their descendents.

172. An apparatus for forming a text file of characters in pixel image data, comprising:

input means for inputting pixel image data, said input means including converting means for converting the pixel image data into binary pixel image data in the event that the pixel image data is not binary image data;

selecting means for selecting blocks of pixel image data, said selecting means including outlining means for outlining contours of connected components in the pixel image data, determining means for determining whether the outlined connected components include text units or non-text units based on the size of the outlined connected components, first connecting means for selectively connecting text units widthwisely to form text lines based on proximity of adjacent text units, and second connecting means for vertically connecting formed text lines to form text blocks based on proximity of adjacent text lines and on the position of non-text units between text lines, at least one formed text block including a plurality of the formed text lines;

forming means for forming a hierarchical tree based on the connected components outlined by said outlining means, wherein said forming means comprises means for designating as a descendent a connected component which is within a rectangle formed around another connected component;

modifying means for modifying the hierarchical tree based on the connected text units and text lines;

segmenting means for segmenting text blocks into lines of pixel data by adaptively dividing text blocks into at least one column based on a horizontal projection of pixel density across said at least one column;

cutting means for cutting characters from the lines segmented by said segmenting means, said cutting means including first cutting means for cutting a first layer of non-touching and non-overlapping characters from the line segment and at least one additional cutting means for cutting an additional layer of touching characters;

recognizing means for recognizing the characters cut by said cutting means and deriving character codes based on said recognition; and a computer text file for storing the character codes in accordance with an order established by the modified hierarchical tree.

173. An apparatus according to 172, further comprising pre-processing means for pre-processing the pixel image data.

174. An apparatus according to claim 173, wherein said pre-processing means compresses the pixel image data.

175. An apparatus according to claim 174, wherein said pre-processing means enhances the pixel image data.

176. An apparatus according to claim 172, further comprising post-processing means for post-processing the characters recognized by said recognizing means, said post-processing means including context checking means for checking one recognized character within a context of other recognized characters.

177. An apparatus according to claim 172, wherein said first cutting means includes sparsely stepping means for sparsely stepping through the line segment.

178. An apparatus according to claim 172, wherein said additional cutting means is employed based on whether characteristics are known about the characters in the pixel image data.

179. An apparatus according to claim 178, wherein said additional cutting means cuts based on spacing statistics of a known character set.

180. An apparatus according to claim 178, wherein said additional cutting means cuts in accordance with a rotated projection of pixel density.

181. An apparatus according to claim 180, wherein the rotated projection of pixel density is obtained at an angle determined based on a vertical projection of pixel density.

182. An apparatus according to claim 172, further comprising intermediate cutting means for cutting an intermediate layer after said first cutting means and before said at least one additional cutting means.

183. An apparatus according to claim 182, wherein said intermediate cutting means includes outlining means for outlining overlapping pixel images in the line segment.

184. An apparatus according to claim 183, further comprising first recombining means for recombining characters cut by said intermediate cutting means in the event that the characters were cut inadvertently.

185. An apparatus according to claim 184, wherein said recognizing means recognizes characters cut by said first cutting means before recognizing characters cut by said additional cutting means, and wherein said additional cutting means is applied to characters that are not recognized by said recognizing means.

186. An apparatus according to claim 185, further comprising second recombining means for recombining the characters cut by said at least one additional cutting means in the event that characters are not recognized by said recognizing means.

187. An apparatus according to claim 172, further comprising means for white-contour tracing the interior of non-text units.

188. An apparatus according to claim 187, further comprising appending means for appending a non-text designator to each non-text unit.

189. An apparatus according to claim 188, wherein a table designator is appended to a non-text unit, based on the number of white contours contained therein, so as to designate that the non-text unit is a table.

190. An apparatus according to claim 188, further comprising means for recombining white contours that are not arranged in a grid, wherein a table designator is appended to a non-text unit, based on the recombination rate of said recombining means, so as to designate that the non-text unit is a table.

191. An apparatus according to claim 188, further comprising calculating means for calculating the fill rate of white contours in non-text units, wherein a table designator is appended to a non-text unit, in the event that the fill rate is high, so as to designate that the non-text unit is a table.

192. An apparatus according to claim 172, further comprising a printer engine for printing an image processed by said apparatus.

193. An apparatus according to claim 172, further comprising a scanner for inputting the pixel image data.

194. Apparatus according to claim 172, further comprising means for classifying as text and non-text: (i) hierarchical tree components; and (ii) their descendents.

195. Computer executable process steps stored on a computer readable medium, said process steps for recognizing characters in pixel image data, said process steps comprising:

a selecting step to select blocks of pixels from the pixel image data, the selecting step including, in order, (i) an outlining step to outline contours of connected components in the pixel image data, (ii) a determining step to determine whether the outlined connected components include text units or non-text units, (iii) a forming step to form a hierarchical tree based on the outlined connected components, (iv) a first connecting step to selectively connect text units widthwisely to form text lines, (v) a second connecting step to vertically connect a plurality of text lines formed in the first connecting step to form text blocks, at least one formed text block including a plurality of formed horizontal text lines, and (vi) a modifying step to modify the hierarchical tree based on the first and second connecting steps, wherein said forming step comprises a designating step to designate as a descendent a connected component which is within a rectangle formed around another connected component;

a segmenting step to segment text blocks into lines of pixel image data;

a cutting step to cut characters from the line segmented in said segmenting step;

a recognizing step to recognize characters cut in said cutting step; and a storing step to store characters recognized in said recognizing step in accordance with an order established in said block selecting step.

196. A computer executable process according to claim 195, further comprising a classifying step to classify as text and non-text: (i) hierarchical tree components; and (ii) their descendents.

* * * * *

UNITED STATES PATENT AND TRADEMARK OFFICE
CERTIFICATE OF CORRECTION

PATENT NO. : 5,680,478

DATED : October 21, 1997

INVENTORS : Shin-Ywan Wang, et al.

It is certified that error appears in the above-identified patent and that said Letters Patent is hereby corrected as shown below:

COLUMN 18

Line 67, delete "a" (first occurrence).

COLUMN 35

Line 61, "selectively" should read --selectively connecting--.

COLUMN 38

Line 36, "a" should read --at--.

COLUMN 41

Line 32, delete "connected" (first occurrence).

COLUMN 42

Line 49, "Apparatus" should read --An apparatus--.

UNITED STATES PATENT AND TRADEMARK OFFICE
CERTIFICATE OF CORRECTION

PATENT NO. : 5,680,478

DATED : October 21, 1997

INVENTORS : Shin-Ywan Wang, et al.

It is certified that error appears in the above-identified patent and that said Letters Patent is hereby corrected as shown below:

COLUMN 44

Line 13, "Apparatus" should read --An Apparatus--.

COLUMN 46

Line 15, "Apparatus" should read --An Apparatus--.

Signed and Sealed this

Twenty-sixth Day of May, 1998

Attest:

BRUCE LEHMAN

Attesting Officer

Commissioner of Patents and Trademarks